United States Patent
Turney et al.

(10) Patent No.: US 12,196,437 B2
(45) Date of Patent: Jan. 14, 2025

(54) SYSTEMS AND METHODS FOR MONITORING AND CONTROLLING AN ENERGY PLANT

(71) Applicant: Johnson Controls Technology Company, Auburn Hills, MI (US)

(72) Inventors: Robert D. Turney, Watertown, WI (US); Tricia J. Valentine, Glendale, WI (US); Nicole A. Madison, Milwaukee, WI (US); Collin W. Eggert, Milwaukee, WI (US); Carol T. Tumey, Wauwatosa, WI (US); Michael F. Jaeger, Thiensville, WI (US); Peter A. Craig, Pewaukee, WI (US)

(73) Assignee: Tyco Fire & Security GmbH, Schaffhausen (CH)

( * ) Notice: Subject to any disclaimer, the term of this patent is extended or adjusted under 35 U.S.C. 154(b) by 1282 days.

(21) Appl. No.: 15/939,238

(22) Filed: Mar. 28, 2018

(65) Prior Publication Data
US 2018/0216842 A1   Aug. 2, 2018
US 2018/0340702 A9   Nov. 29, 2018

Related U.S. Application Data

(63) Continuation-in-part of application No. 15/387,512, filed on Dec. 21, 2016, now Pat. No. 11,181,875.
(Continued)

(51) Int. Cl.
G05B 15/02     (2006.01)
F24F 11/30     (2018.01)
(Continued)

(52) U.S. Cl.
CPC .............. F24F 11/30 (2018.01); F24F 11/46 (2018.01); F24F 11/54 (2018.01); F24F 11/58 (2018.01);
(Continued)

(58) Field of Classification Search
CPC .............. G05B 15/02; G05B 19/042; G05B 19/41865; G05B 2219/25011;
(Continued)

(56) References Cited

U.S. PATENT DOCUMENTS 5,301,109 A   4/1994   Landauer et al.
5,446,677 A   8/1995   Jensen et al.
(Continued)

FOREIGN PATENT DOCUMENTS

CA   2957726 A1   3/2016
CA   3043996 A1   2/2018
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

Primary Examiner — M. N. Von Buhr
(74) Attorney, Agent, or Firm — Foley & Lardner LLP

(57) ABSTRACT

An energy plant includes a plurality of subplants, a high level optimizer, a low level optimizer, and a controller. The plurality of subplants include a cogeneration subplant configured to generate steam and electricity and a chiller subplant electrically coupled to the cogeneration subplant and configured to consume the electricity generated by the cogeneration subplant. The high level optimizer is configured to determine recommended subplant loads for each of the plurality of subplants. The recommended subplant loads include a rate of steam production and a rate of electricity production of the cogeneration subplant and a rate of electricity consumption of the chiller subplant. The low level optimizer is configured to determine recommended equip-
(Continued)

ment setpoints for equipment of the plurality of subplants based on the recommended subplant loads. The controller is configured to operate the equipment of the plurality of subplants based on the recommended equipment setpoints.

20 Claims, 43 Drawing Sheets

Related U.S. Application Data

(60) Provisional application No. 62/476,510, filed on Mar. 24, 2017, provisional application No. 62/286,287, filed on Jan. 22, 2016.

(51) Int. Cl.
| | | |
|---|---|---|
| *F24F 11/46* | (2018.01) | |
| *F24F 11/54* | (2018.01) | |
| *F24F 11/58* | (2018.01) | |
| *F24F 11/62* | (2018.01) | |
| *G05B 19/418* | (2006.01) | |
| *G06F 3/04847* | (2022.01) | |
| *F24F 11/47* | (2018.01) | |
| *F24F 11/52* | (2018.01) | |
| *F24F 110/10* | (2018.01) | |
| *F24F 110/20* | (2018.01) | |
| *F24F 110/40* | (2018.01) | |
| *F24F 140/50* | (2018.01) | |

(52) U.S. Cl.
CPC .............. *F24F 11/62* (2018.01); *G05B 15/02* (2013.01); *G06F 3/04847* (2013.01); *F24F 11/47* (2018.01); *F24F 11/52* (2018.01); *F24F 2110/10* (2018.01); *F24F 2110/20* (2018.01); *F24F 2110/40* (2018.01); *F24F 2140/50* (2018.01); *F24F 2221/54* (2013.01); *G05B 19/41865* (2013.01); *G05B 2219/25011* (2013.01); *Y02P 80/10* (2015.11)

(58) Field of Classification Search
CPC . G05B 2219/32252; F24F 11/30; F24F 11/46; F24F 11/47; F24F 11/52; F24F 11/54; F24F 11/58; F24F 11/62; F24F 2110/10; F24F 2110/20; F24F 2110/40; F24F 2221/54; F24F 2140/50; G06F 3/04847; F28F 27/00; Y02P 80/114; Y02P 80/10
See application file for complete search history.

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,220,223 | B1* | 4/2001 | Weisman, II ......... F02D 41/222 123/436 |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,580,775 | B2 | 8/2009 | Kulyk et al. |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,894,946 | B2 | 2/2011 | Kulyk et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,527,108 | B2 | 9/2013 | Kulyk et al. |
| 8,527,109 | B2 | 9/2013 | Kulyk et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,762,942 | B2 | 6/2014 | Langworthy et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,903,554 | B2 | 12/2014 | Stagner |
| 8,918,223 | B2 | 12/2014 | Kulyk et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,110,647 | B2 | 8/2015 | Kulyk et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,429,923 | B2 | 8/2016 | Ward et al. |
| 9,447,985 | B2 | 9/2016 | Johnson |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,623,562 | B1* | 4/2017 | Watts ..................... B25J 9/1689 |
| 9,652,813 | B2 | 5/2017 | Gifford et al. |
| 9,703,339 | B2 | 7/2017 | Kulyk et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,139,877 | B2 | 11/2018 | Kulyk et al. |
| 10,169,454 | B2 | 1/2019 | Ait-Mokhtar et al. |
| 10,171,586 | B2 | 1/2019 | Shaashua et al. |
| 10,187,258 | B2 | 1/2019 | Nagesh et al. |

(56) References Cited

U.S. PATENT DOCUMENTS

| | | |
|---|---|---|
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0055798 A1 | 3/2003 | Hittle et al. |
| 2003/0073432 A1 | 4/2003 | Meade, II |
| 2003/0105984 A1* | 6/2003 | Masuyama ............... G06F 1/26 713/330 |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0137018 A1* | 6/2006 | Herschaft ............... H04N 5/76 726/26 |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0236248 A1 | 10/2006 | Eischeid et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0208682 A1 | 9/2007 | Mancisidor et al. |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0167756 A1 | 7/2008 | Golden et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0070089 A1 | 3/2010 | Harrod et al. |
| 2010/0131533 A1 | 5/2010 | Ortiz |
| 2010/0262298 A1 | 10/2010 | Johnson et al. |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0035071 A1* | 2/2011 | Sun ............................ H02J 3/00 700/291 |
| 2011/0047418 A1 | 2/2011 | Drees et al. |
| 2011/0061015 A1 | 3/2011 | Drees et al. |
| 2011/0066258 A1 | 3/2011 | Torzhkov et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083927 A1 | 4/2012 | Nakamura et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0286051 A1* | 11/2012 | Lyle ................... G05D 23/1902 236/47 |
| 2012/0296480 A1 | 11/2012 | Raman et al. |
| 2012/0310418 A1 | 12/2012 | Harrod et al. |
| 2012/0310560 A1 | 12/2012 | Ozaki |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0307702 A1* | 11/2013 | Pal ........................ A47L 15/0047 340/870.02 |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0163759 A1 | 6/2014 | Anderson et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0249876 A1 | 9/2014 | Wu et al. |

(56) References Cited

U.S. PATENT DOCUMENTS

| | | |
|---|---|---|
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0234409 A1* | 8/2015 | Griner .................. G05B 15/02 700/291 |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0256549 A1 | 9/2015 | Spurlock et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0309495 A1 | 10/2015 | Delorme et al. |
| 2015/0316902 A1 | 11/2015 | Wenzel et al. |
| 2015/0316903 A1 | 11/2015 | Asmus et al. |
| 2015/0316907 A1 | 11/2015 | Elbsat et al. |
| 2015/0316918 A1 | 11/2015 | Schleiss et al. |
| 2015/0324422 A1 | 11/2015 | Elder |
| 2015/0331689 A1 | 11/2015 | Blahaerath et al. |
| 2015/0341212 A1 | 11/2015 | Hsiao et al. |
| 2015/0348417 A1 | 12/2015 | Ignaczak et al. |
| 2015/0369503 A1 | 12/2015 | Flaherty et al. |
| 2015/0379080 A1 | 12/2015 | Jochimski |
| 2016/0011753 A1 | 1/2016 | McFarland et al. |
| 2016/0020608 A1 | 1/2016 | Carrasco et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0102881 A1 | 4/2016 | Kim et al. |
| 2016/0105023 A1* | 4/2016 | De Ridder ................ H02J 3/24 700/295 |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0210180 A1* | 7/2016 | Muttur .................. G06F 11/004 |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350080 A1 | 12/2016 | Ravindran et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0370814 A1* | 12/2016 | Hanley .................... G05F 1/66 |
| 2016/0377306 A1 | 12/2016 | Drees et al. |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0031962 A1 | 2/2017 | Turney et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103327 A1 | 4/2017 | Penilla et al. |
| 2017/0103403 A1 | 4/2017 | Chu et al. |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0123389 A1 | 5/2017 | Baez et al. |
| 2017/0134415 A1 | 5/2017 | Muddu et al. |
| 2017/0171215 A1* | 6/2017 | Brucker ................ H04L 63/102 |
| 2017/0177715 A1 | 6/2017 | Chang et al. |
| 2017/0180147 A1 | 6/2017 | Brandman et al. |
| 2017/0185133 A1* | 6/2017 | Browning ............... G06F 1/329 |
| 2017/0188216 A1 | 6/2017 | Koskas et al. |
| 2017/0212482 A1 | 7/2017 | Boettcher et al. |
| 2017/0212488 A1 | 7/2017 | Kummer et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |

(56) References Cited

U.S. PATENT DOCUMENTS

| | | |
|---|---|---|
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 101072629 | 11/2007 |
| CN | 101415011 A | 4/2009 |
| CN | 201827989 | 5/2011 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104633829 | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 1 156 286 A2 | 11/2001 |
| EP | 2 528 033 A1 | 11/2012 |
| EP | 2 344 959 B1 | 5/2017 |
| EP | 3 186 687 A4 | 7/2017 |
| EP | 3 324 306 A1 | 5/2018 |
| EP | 3 497 377 A1 | 6/2019 |
| GB | 2 541 170 A | 2/2017 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| JP | 6144346 B2 | 6/2017 |
| KR | 2016/0102923 A | 8/2016 |
| WO | WO-2009/020158 A1 | 2/2009 |
| WO | WO-2011/100255 A2 | 8/2011 |
| WO | WO-2012/161804 A1 | 11/2012 |
| WO | WO-2013/050333 A1 | 4/2013 |
| WO | WO-2013/130956 A1 | 9/2013 |
| WO | WO-2015/106702 A1 | 7/2015 |
| WO | WO-2015/145648 A1 | 10/2015 |
| WO | WO-2017/007990 A1 | 1/2017 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

https://developers.google.com/protocol-buffers/docs/csharptutorial, updated May 12, 2017. (8 pages).

International Search Report and Written Opinion on International Patent Application No. PCT/US2018/021288 dated Aug. 13, 2018. 20 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 10 pages. 2018.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

U.S. Appl. No. 15/405,234, filed Jan. 12, 2017, Johnson Controls Technology Company.

U.S. Appl. No. 15/405,236, filed Jan. 12, 2017, Johnson Controls Technology Company.

(56) References Cited

OTHER PUBLICATIONS

U.S. Appl. No. 15/426,962, filed Feb. 7, 2017, Johnson Controls Technology Company.
Extended European Search Reported on EP Patent Application No. 18176474 dated Sep. 5, 2018. 8 pages.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Office Action on CN 201710045507.2, dated Oct. 23, 2020, 28 pages with English translation.
CN Notice of Allowance on CN Appl. Ser. No. 201710045507.2 dated Jan. 26, 2022 (7 pages).
Office Action on CN 201710045507.2, dated Jul. 22, 2021, 11 pages.
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, the Bad and the Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Chinese Office Action on CN Appl. Ser. No. 201780003995.9 dated Apr. 8, 2021 (21 pages).
Chinese Office action on CN Appl. Ser. No. 201780043400.2 dated Apr. 25, 2021 (15 pages).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 22) (172 pages total).
Digital Platform Litigation Documents Part 3, includes IPR2023-00085 (documents filed Oct. 20, 22) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
Drgona et al., "All you Need to Know about Model Predictive Control for Buildings," Annual Reviews in Control, 2020, vol. 50 (pp. 190-232).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," Data'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).

(56) References Cited

OTHER PUBLICATIONS

Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Hackner, J.R., "HVAC system dynamics and energy use in existing buildings," Doctoral Dissertation, University of Madison, Wisconsin, 1984 (174 pages).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Hu, S. et al., "Building performance optimisation: A hybrid architecture for the integration of contextual information and time-series data," Automation in Construction, 2016, 70 (pp. 51-61).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

(56) References Cited

OTHER PUBLICATIONS

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation Gui," Url: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Li et al., "Event Stream Processing with Out-of-Order Data Arrival," International Conferences on Distributed Computing Systems, 2007, (8 pages).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of Hva C&R Research, vol. 11, No. 3 (pp. 459-486).
Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing Ltd., Birmingham, UK, Oct. 2014 (170 pages).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
The Virtual Nuclear Tourist, "Calvert Cliffs Nuclear Power Plant," URL: http://www.nucleartourist.com/us/calvert.htm, Jan. 11, 2006 (2 pages).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

(56) References Cited

OTHER PUBLICATIONS

W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

Zhou, Q. et al., "Knowledge-infused and Consistent Complex Event Processing over Real-time and Persistent Streams," Further Generation Computer Systems, 2017, 76 (pp. 391-406).

\* cited by examiner

| Optimize ▼ | Campus ▼ |                                                                    Next Dispatch: 12:32   | Advisory Mode ▼ |
                                                                                              🔔 ❓ ⚙️     👤 xxx***▼

Plant Summaries ▼   Dispatch ▼   Input Data ▼   Reporting   Scheduling   Audit Log Home > Reporting        ─ 3500

┌──────────────────────┐  ┌──────────────────────┐  ┌──────────────────────┐  ┌──────────────────────┐
│ Total Utility Cost   │  │ Peak Demand          │  │ Performance          │  │ Unmet Chilled Water Load │  │ System Efficiency │
│        3502          │  │        3504          │  │        3506          │  │        3508          │  │        3510       │
│      2,817       │  │     11,789       │  │      1.07        │  │    114,192       │  │    67.213     │
│         $            │  │        kW            │  │        COP           │  │       tons/hr        │  │         %         │
│ ▼ 14% decrease this week │ ▼ 21% decrease this week │ ▼ 17% decrease this week │ ▲ 9% increase this week │ ▼ 14% decrease this week │

My Reports (7)

| Name ▼ | Last Viewed ⇅ |   |
|---|---|---|
| Chiller Cold Water | 04/17/2016 | [View] |
| Chiller Hot Water Rejection | 04/17/2016 | [View] |
| Cold Water Storage | 04/17/2016 | [View] |
| Excess Heat Exchange Electric | 04/17/2016 | [View] |
| Hot Water Storage Distribution | 04/17/2016 | [View] |
| Tower Assembly Electrical | 04/17/2016 | [View] |
| Tower Assembly Water | 04/17/2016 | [View] |

Recommended Reports (7)

| Name ▼ | Last Viewed ⇅ |   |
|---|---|---|
| Dispatch Gas | 04/17/2016 | [View] |
| Dispatch Electric | 04/17/2016 | [View] |
| Dispatch Steam | 04/17/2016 | [View] |
| Dispatch Summary | 04/17/2016 | [View] |
| Dispatch Water | 04/17/2016 | [View] |
| Performance Monitoring | 04/17/2016 | [View] |
| Site Summary | 04/17/2016 | [View] |

FIG. 35A

| | | Energy Optimization Solution | | | Next Dispatch: 12:32 | Advisory Mode ▼ |

Plant Summaries ▼    Dispatch    Input Data ▼    Reporting    Audit Log

Home > Dispatch

From: 11/03/2016    To: 11/05/2016

∨ Cost/Revenue

| Electric Usage Cost ($) | Demand Cost ($) | Gas Cost ($) | ELDR Revenue ($) | Total ($) |
|---|---|---|---|---|
| 808,577 | 1,712,755 | 3,604,121 | +871,623 | 5,253,851 |

∨ Chilled Water

| | Production (Tons) |
|---|---|
| Loop B | 3,890,355 |
| Electric Chiller 1 | 1,238,793 |
| Electric Chiller 2 | 1,238,793 |
| Electric Chiller 3 | 1,238,794 |
| Steam Chiller 1 | 173,955 |
| Loop A | 2,855,538 |
| Plant F | 831,235 |
| Steam Chiller 1 | 415,617 |
| Steam Chiller 2 | 415,618 |
| Plant E | 825,700 |
| Electric Chiller 1 | 412,850 |
| Electric Chiller 2 | 412,850 |
| Plant D | 1,198,603 |
| Electric Chiller 1 | 1,184,189 |
| Steam Chiller 1 | 14,414 |
| Loop B | 8,836,470 |
| Plant A | 29,996 |
| Plant C | 277,574 |
| Plant B | 8,528,900 |
| Electric Chiller 1 | 3,551,029 |
| Electric Chiller 2 | 3,551,029 |
| Steam Chiller 1 | 1,426,842 |
| Loop B | 15,582,363 |

∨ Electrical

Electrical

| Production (kWh) | |
|---|---|
| Plant B | 38,169,221 |
| Combustion Turbine 1 | 9,094,069 |
| Combustion Turbine 2 | 29,075,152 |
| Utility Import | 45,235,997 |
| Total | 83,405,219 |

| Consumption (kWh) | |
|---|---|
| Campus | 75,241,320 |
| Loop C | 1,850,981 |
| Electric Chiller 1 | 616,472 |
| Electric Chiller 2 | 616,473 |
| Electric Chiller 3 | 616,473 |
| Steam Chiller 1 | 1,563 |
| Loop A | 1,184,483 |
| Plant F | 28,185 |
| Steam Chiller 1 | 14,093 |
| Steam Chiller 2 | 14,092 |
| Plant E | 825,700 |
| Electric Chiller 1 | 412,850 |
| Electric Chiller 2 | 412,850 |
| Plant D | 643,570 |
| Electric Chiller 1 | 643,570 |
| Steam Chiller 1 | 0 |
| Loop B | 4,542,591 |
| Plant A | 3,078 |
| Plant C | 146,952 |
| Plant B | 4,392,561 |
| Electric Chiller 1 | 2,141,951 |
| Electric Chiller 2 | 2,141,952 |
| Steam Chiller 1 | 108,659 |
| Plant B | 562,380 |
| Boiler 6 | 281,190 |
| Boiler 7 | 281,190 |

Steam

| Production (KPPH) | |
|---|---|
| Plant B | 137,057,825 |
| Boiler 4 | 82,430,785 |
| Boiler 5 | 22,276,759 |
| Boiler 6 | 16,200,141 |
| Boiler 7 | 16,200,140 |
| Total | 137,057,825 |

| Consumption (KPPH) | |
|---|---|
| Campus | 128,979,389 |
| Loop C | 842,246 |
| Steam Chiller 1 | 842,246 |
| Loop A | 4,061,450 |
| Plant F | 3,991,020 |
| Steam Chiller 1 | 1,995,510 |
| Steam Chiller 2 | 1,995,510 |
| Plant D | 70,430 |
| Steam Chiller 1 | 70,430 |
| Loop B | 3,174,741 |
| Plant A | 150,145 |
| Plant B | 3,024,596 |
| Steam Chiller 1 | 3,024,596 |
| Total | 137,057,826 |

FIG. 36B

Example of Add a Note Dialog

Add A Note

Type your note here.

[Cancel] [Confirm]

3700

[Add Schedule]    From [05/26/2016] 🗓  To [05/26/2016] 🗓  ⊞

| Date & Time ⇅ | Username ▾ | Note ⇅ | Type: Input ▾ ⇅ |
|---|---|---|---|
| February 9, 2016 4:22 PM | John Smith | Corrected rate schedule per provider agreement | General<br>Input<br>Schedule<br>Mode |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |
| February 9, 2016 4:22 PM | John Smith | Corrected rate schedule per provider agreement | Input - Natural Gas |

1-10 of 20  Show [10 ▾]   [◂] [1] [▸]  of 2 [▴]

FIG. 37

SYSTEMS AND METHODS FOR MONITORING AND CONTROLLING AN ENERGY PLANT

CROSS-REFERENCE TO RELATED PATENT APPLICATIONS

This application is a continuation-in-part of U.S. patent application Ser. No. 15/387,512 filed Dec. 21, 2016, which claims the benefit of and priority to U.S. Provisional Patent Application No. 62/286,287 filed Jan. 22, 2016. This application also claims the benefit of and priority to U.S. Provisional Patent Application No. 62/476,510 filed Mar. 24, 2017. The entire disclosures of each of these patent applications are incorporated by reference herein.

BACKGROUND

The present disclosure relates generally to an plant that includes multiple subplants configured to serve the energy loads of a building or campus. The present disclosure relates more particularly to systems and methods for monitoring and controlling multiple subplants and the equipment within each of the subplants.

An energy plant may include a number of subplants configured to serve the heating, cooling, electric, and other energy loads of a building or campus. For example, the energy plant may include a heater subplant, a chiller subplant, a heat recovery chiller subplant, a cogeneration subplant, a steam subplant, a hot thermal energy storage (TES) subplant, and/or a cold TES subplant. The subplants may include a variety of HVAC equipment configured to serve heating, cooling, and electric loads (e.g., heaters, boilers, chillers, heat recovery chillers, electric generators, cooling towers, etc.). The energy plant may be controlled by an energy plant controller that distributes a requested or predicted energy load (e.g., a heating load, a cooling load, an electric load, etc.) across the plurality of subplants. It can be difficult and challenging to monitor and control the operation of an energy plant.

SUMMARY

One implementation of the present disclosure is an energy plant. The energy plant includes a plurality of subplants, a high level optimizer, a low level optimizer, and a controller. The plurality of subplants are configured to serve energy loads of a campus and include a cogeneration subplant and a chiller subplant. The cogeneration subplant is configured to generate steam and electricity. The chiller subplant is electrically coupled to the cogeneration subplant and configured to consume the electricity generated by the cogeneration subplant. The high level optimizer is configured to determine recommended subplant loads for each of the plurality of subplants. The recommended subplant loads include a rate of steam production and a rate of electricity production of the cogeneration subplant and a rate of electricity consumption of the chiller subplant. The low level optimizer is configured to determine recommended equipment setpoints for equipment of the plurality of subplants based on the recommended subplant loads. The controller is configured to operate the equipment of the plurality of subplants based on the recommended equipment setpoints.

In some embodiments, the chiller subplant is fluidly coupled to the cogeneration subplant and configured to chill the steam generated by the cogeneration subplant. The recommended subplant loads may include a rate of steam consumption and a rate of chilled steam production of the chiller subplant.

In some embodiments, the energy plant includes a user interface configured to receive manual subplant loads specified by a user. The low level optimizer can be configured to determine the recommended equipment setpoints for the equipment of the plurality of subplants based on the manual subplant loads.

In some embodiments, the energy plant includes a dispatch graphical user interface (GUI) generator configured to generate a dispatch GUI and present the dispatch GUI via the user interface. The dispatch GUI may include the recommended subplant loads and the manual subplant loads.

In some embodiments, the dispatch GUI includes an operating mode selector configured to display a plurality of operating modes and to receive a user selection of one of the operating modes. The plurality of operating modes may include an automatic operating mode, an advisory operating mode, and a manual operating mode.

In some embodiments, the low level optimizer is configured to operate in (1) an automatic operating mode in which the low level optimizer determines a first set of recommended equipment setpoints to achieve the recommended subplant loads and (2) a manual operating mode in which the low level optimizer determines a second set of recommended equipment setpoints to achieve the manual subplant loads.

In some embodiments, the high level optimizer is configured to determine an amount of overproduction or underproduction resulting from the manual subplant loads by comparing the manual subplant loads to a campus energy load.

In some embodiments, the plurality of subplants include an energy storage subplant. The user interface may include an indication of an amount of time until the energy storage subplant is (1) fully depleted based on the amount of underproduction or (2) filled to capacity based on the amount of overproduction.

In some embodiments, the energy plant includes a subplant monitor configured to monitor the energy plant and identify actual subplant loads for each of the plurality of subplants. In some embodiments, the energy plant includes a dispatch graphical user interface (GUI) generator configured to generate a dispatch GUI comprising the recommended subplant loads and the actual subplant loads.

Another implementation of the present disclosure is a method for monitoring and controlling an energy plant including a plurality of subplants that operate to serve energy loads of a campus. The method includes operating a cogeneration subplant of the plurality of subplants to generate steam and electricity, operating a chiller subplant of the plurality of subplants to consume the electricity generated by the cogeneration subplant, and determining recommended subplant loads for each of the plurality of subplants. The recommended subplant loads include a rate of steam production and a rate of electricity production of the cogeneration subplant and a rate of electricity consumption of the chiller subplant. The method includes determining recommended equipment setpoints for equipment of the plurality of subplants based on the recommended subplant loads and operating the equipment of the plurality of subplants based on the recommended equipment setpoints.

In some embodiments, the method includes operating the chiller subplant to chill the steam generated by the cogeneration subplant. The recommended subplant loads may include a rate of steam consumption and a rate of chilled steam production of the chiller subplant.

In some embodiments, the method includes receiving manual subplant loads specified by a user via a user interface and determining the recommended equipment setpoints for the equipment of the plurality of subplants based on the manual subplant loads.

In some embodiments, the method includes generating a dispatch GUI and presenting the dispatch GUI via the user interface. The dispatch GUI may include the recommended subplant loads and the manual subplant loads.

In some embodiments, the method includes receiving a user selection of one of a plurality of operating modes via an operating mode selector of the dispatch GUI. The plurality of operating modes may include an automatic operating mode, an advisory operating mode, and a manual operating mode.

In some embodiments, the method includes operating in an automatic operating mode to determine a first set of recommended equipment setpoints to achieve the recommended subplant loads and operating in a manual operating mode to determine a second set of recommended equipment setpoints to achieve the manual subplant loads.

In some embodiments, the method includes determining an amount of overproduction or underproduction resulting from the manual subplant loads by comparing the manual subplant loads to a campus energy load.

In some embodiments, the plurality of subplants include an energy storage subplant. The user interface may include an indication of an amount of time until the energy storage subplant is (1) fully depleted based on the amount of underproduction or (2) filled to capacity based on the amount of overproduction.

In some embodiments, the method includes monitoring the energy plant to identify actual subplant loads for each of the plurality of subplants. In some embodiments, the method includes generating a dispatch GUI comprising the recommended subplant loads and the actual subplant loads.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 31 is a drawing of an override interface which may be generated by the EOS of FIG. 3, according to an exemplary embodiment.

FIG. 32 is a drawing of a utility pricing forecast input interface which may be generated by the EOS of FIG. 3, according to an exemplary embodiment.

FIG. 33 is a drawing of an out-of-service schedule interface which may be generated by the EOS of FIG. 3, according to an exemplary embodiment.

FIG. 34 is a drawing of a campus schedule interface which may be generated by the EOS of FIG. 3, according to an exemplary embodiment.

FIG. 35A is a drawing of a reporting interface which may be generated by the EOS of FIG. 3, according to an exemplary embodiment.

FIGS. 36A and 36B are drawings of a site summary report which may be generated by the EOS of FIG. 3, according to an exemplary embodiment.

FIG. 37 is a drawing of an audit log interface which may be generated by the EOS of FIG. 3, according to an exemplary embodiment.

DETAILED DESCRIPTION

Figure 1:
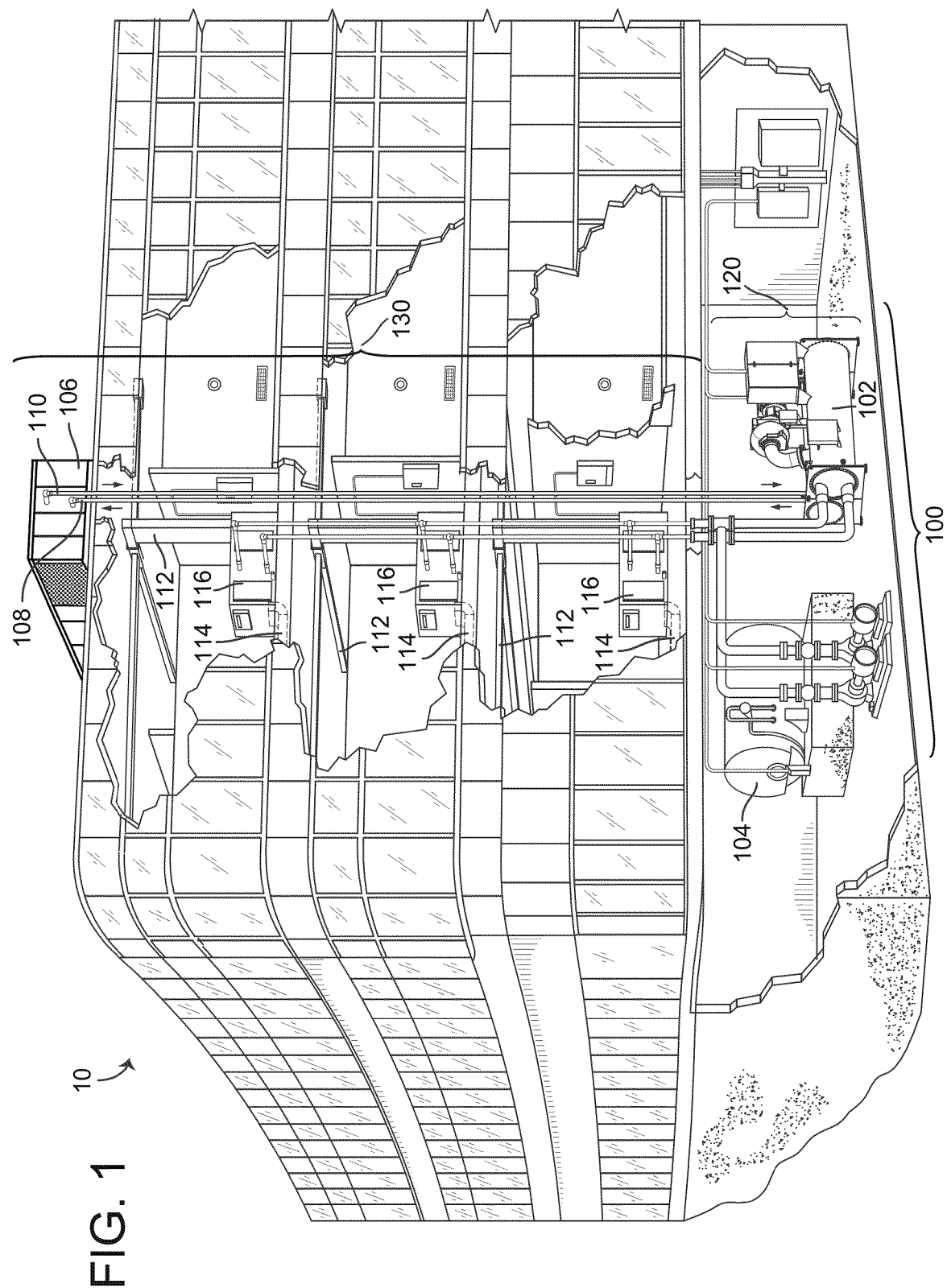
FIG. 1 is a drawing of a building equipped with a building automation system and served by an energy plant, according to an exemplary embodiment.

Referring generally to the FIGURES, systems and methods for monitoring and controlling an energy plant are shown, according to an exemplary embodiment. The energy plant may include a plurality of subplants configured to serve the heating, cooling, and electric loads of a building or campus. For example, the energy plant may include a heater subplant, one or more chiller subplants, a heat recovery chiller subplant, a cogeneration subplant, a steam subplant, a hot thermal energy storage (TES) subplant, and/or a cold TES subplant. The subplants may be located within the same building or distributed across multiple buildings. The energy plant may be controlled by an energy optimization system (EOS) that distributes a requested or predicted energy load (e.g., a heating load, a cooling load, an electric load, etc.) across the plurality of subplants. In some embodiments, the EOS performs an optimization process to determine an optimal load distribution across the plurality of subplants for each of a plurality of time steps within a prediction window.

The EOS may predict the loads on each of the subplants throughout the prediction window. In some embodiments, the predicted subplant loads include a heating load served by the heating subplant, a heating load served by the heat recovery chiller subplant, a heating load served by the steam subplant, a cooling load served by the heat recovery chiller subplant, a cooling load served by the chiller subplant(s), an electric load served by the cogeneration subplant, a heating load served or stored by the hot TES subplant (e.g., a predicted rate at which the hot TES subplant will be charging or discharging), and/or a cooling load served or stored by the cold TES subplant (e.g., a predicted rate at which the cold TES subplant will be charging or discharging). In some embodiments, the EOS predicts a charge state for the TES subplants defining an amount of thermal energy stored in each of the TES subplants during each of the dispatch intervals. The predicted subplant loads and TES charge states for each of the future time steps may be stored in a subplant utilization database. The actual operation of the energy plant may be monitored to determine the actual subplant loads and TES charge stages during each of the time steps. The actual subplant loads and TES charge states may be stored in the subplant utilization database for each of the past and current dispatch intervals.

A dispatch graphical user interface (GUI) generator may access the data stored in the subplant utilization database and use the stored data to generate a dispatch GUI. The dispatch GUI may be a graph or chart that illustrates the actual subplant utilization data (e.g., past and current subplant loads) and the predicted subplant utilization data (e.g., future subplant loads) in a graphical format. In some embodiments, the dispatch GUI indicates the actual and predicted subplant loads for each of the subplants at each of the dispatch intervals represented in the dispatch GUI. The dispatch GUI may be configured to receive manual subplant loads specified by a user.

The dispatch GUI generator may provide the dispatch GUI to a user interface of a client device (e.g., a computer terminal, a workstation, a laptop, a tablet, a smartphone, etc.). In some embodiments, the dispatch GUI generator is a component of the energy plant controller. In other embodiments, the dispatch GUI generator may be a component of the client device. For example, the dispatch GUI generator may be a web browser or a specialized application running on the client device. In some embodiments, the dispatch GUI is rendered using specialized viewing software (e.g., an energy plant monitoring application) installed on the client device. In other embodiments, the dispatch GUI is provided via a web interface which allows the dispatch GUI to be rendered and viewed using a web browser without requiring any specialized applications or software to be installed on the client device.

The dispatch GUI may present recommended (i.e., optimal) subplant loads, manual subplant loads, and actual subplant loads in a variety of visual formats (e.g., diagrams, charts, graphs, etc.) that illustrate the operation of the energy plant. The dispatch GUI may include a first set of recommended equipment setpoints that result from the recommended subplant loads, a second set of recommended equipment setpoints that result from the manual subplant loads, and the actual equipment setpoints to provide details regarding the operation of each subplant. The dispatch GUI may include past dispatch data (e.g., past subplant loads, past equipment setpoints) and current dispatch data (e.g., current subplant loads, current equipment setpoints) to allow a user to view a history of energy plant operations. The dispatch GUI may also include future dispatch data (e.g., planned subplant loads, planned equipment setpoints) to allow the user to view planned energy plant operations into the future. Additional features and advantages of the dispatch GUI are described in detail below.

In some embodiments, the dispatch GUI generator and/or the dispatch GUI include some or all of the features described in U.S. Design patent application No. 29/515,801 filed Jan. 27, 2015, U.S. Provisional Patent Application No. 62/286,287 filed Jan. 22, 2017, and/or U.S. patent application Ser. No. 15/387,512 filed Dec. 21, 2016. The entire disclosure of each of these patent applications is incorporated by reference herein.

Building with HVAC System

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as energy plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as an energy plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Energy Plant and Control System

Figure 2:
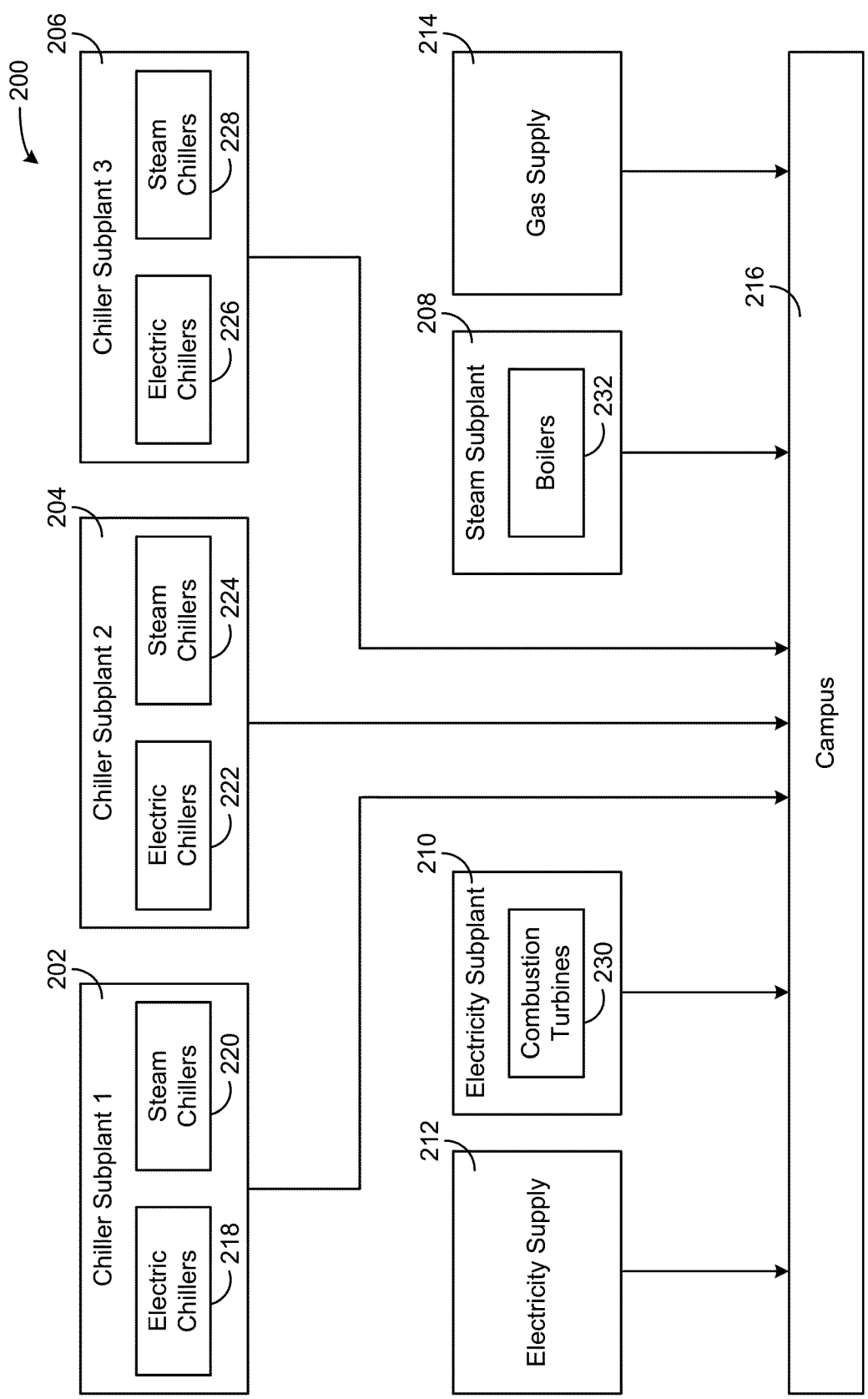
FIG. 2 is a schematic diagram of an energy plant including a number of subplants configured to serve the energy loads of the building of FIG. 1, according to an exemplary embodiment.

Referring now to FIG. 2, a block diagram of an energy plant 200 is shown, according to an exemplary embodiment. In brief overview, energy plant 200 may include various types of equipment configured to serve the thermal and electrical energy loads of a building or campus (i.e., a system of buildings). For example, energy plant 200 may include heaters, chillers, heat recovery chillers, cooling towers, or other types of equipment configured to serve the heating and/or cooling loads of a building or campus. Energy plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, energy plant 200 may supplement or replace waterside system 120 in building 10 or may be implemented separate from building 10 (e.g., at an offsite location, distributed across multiple buildings, etc.).

Energy plant 200 is shown to include a plurality of subplants 202-210 including a first chiller subplant 202, a second chiller subplant 204, a third chiller subplant 206, a steam subplant 208, and a cogeneration subplant 210. Subplants 202-210 consume resources from utilities to serve the thermal and electrical energy loads (e.g., hot water, cold water, heating, cooling, steam, electricity, etc.) of a building or campus. For example, chiller subplants 202-206 may be configured to chill water in a cold water loop that circulates the cold water between chiller subplants 202-206 campus 216. Steam subplant 208 may be configured to generate steam and circulate the steam in a steam loop between steam subplant 208 and campus 216. Cogeneration subplant 210 can be configured to cogenerate both steam and electricity (e.g., by operating one or more combustion turbines 230).

Each of subplants 202-210 may include a variety of equipment configured to facilitate the functions of the subplant. For example, chiller subplants 202-206 are shown to include a plurality of electric chillers 218, 222, and 226 and steam chillers 220, 224, and 228. Electric chillers 218, 222, and 226 can be configured to remove heat from the cold water in the cold water loop, whereas steam chillers 220, 224, and 228 can be configured to cool the steam generated by boilers 232 and/or combustion turbines 230. Steam subplant 208 may include one or more boilers 232 configured to boil water to produce steam. Cogeneration subplant 210 may include one or more combustion turbines 230 configured to generate both steam and electricity. In some embodiments, steam subplant 208 burns gas from a gas supply 214. Chiller subplants 202-206 may consume electricity from an electricity supply 212 to generate the chilled water.

Figure 3:
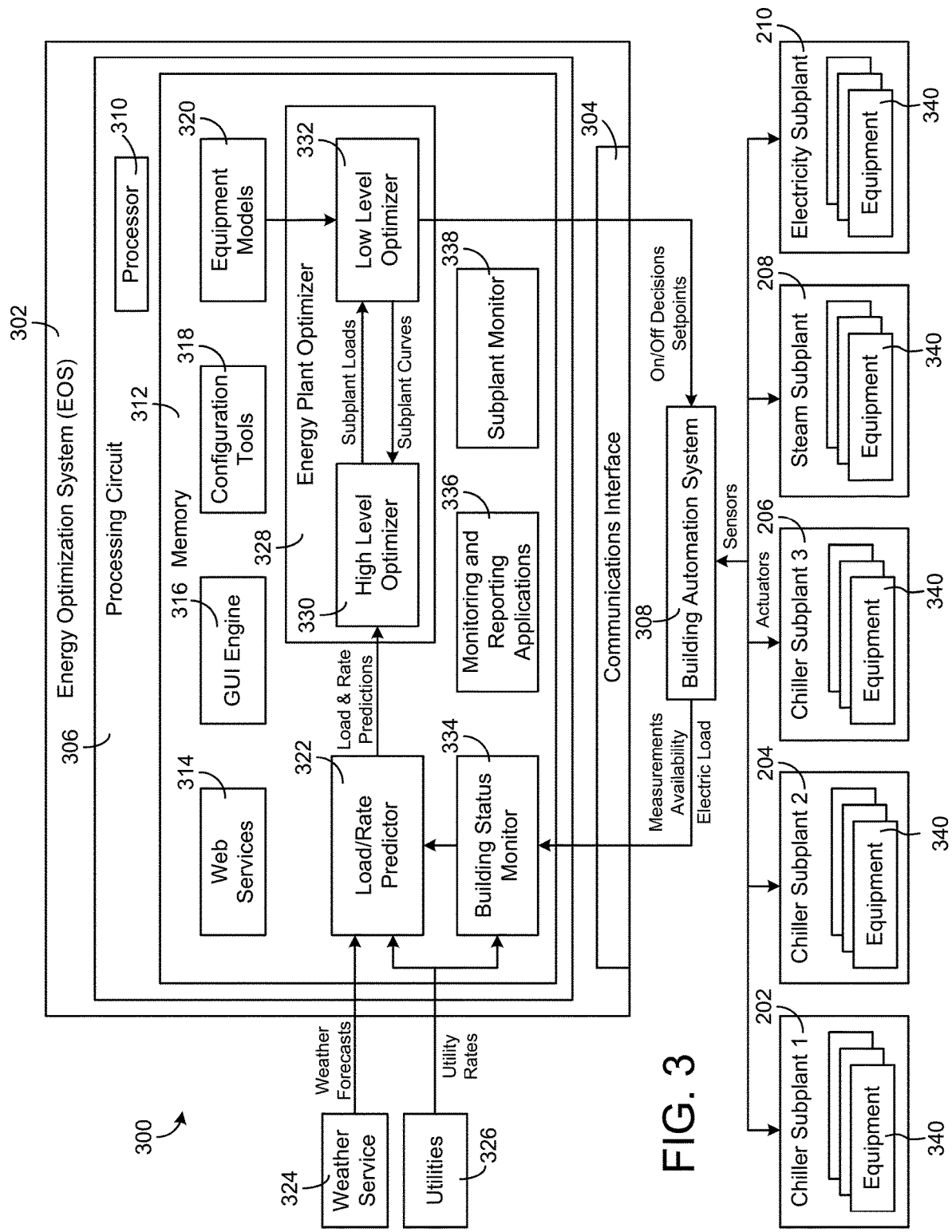
FIG. 3 is a block diagram of an energy optimization system (EOS) configured to monitor and control the energy plant of FIG. 2, according to an exemplary embodiment.

Referring now to FIG. 3, a block diagram illustrating an energy plant system 300 is shown, according to an exemplary embodiment. System 300 is shown to include an energy optimization system (EOS) 302, a building automation system (BAS) 308, and a plurality of subplants 202-210. Subplants 202-210 may be the same as previously described with reference to FIG. 2. For example, subplants 202-210 are shown to include a first chiller subplant 202, a second chiller subplant 204, a third chiller subplant 206, a steam subplant 208, and a cogeneration subplant 210.

Each of subplants 202-210 is shown to include equipment 340 that can be controlled by EOS 302 and/or building automation system 308 to optimize the performance of energy plant 200. Equipment 340 may include, for example, heating devices, chillers, heat recovery heat exchangers, cooling towers, thermal energy storage devices, pumps, valves, and/or other devices of subplants 202-210 (e.g., electric chillers 218, 222, and 226, steam chillers 220, 224, and 228, combustion turbines 230, and/or boilers 232). Individual devices of equipment 340 can be turned on or off to adjust the thermal or electrical energy load served by each of subplants 202-210. In some embodiments, individual devices of equipment 340 can be operated at variable capacities (e.g., operating a chiller at 10% capacity or 60% capacity) according to an operating setpoint received from EOS 302.

In some embodiments, one or more of subplants 202-210 includes a subplant level controller configured to control the equipment 340 of the corresponding subplant. For example, EOS 302 may determine an on/off configuration and global operating setpoints for equipment 340. In response to the on/off configuration and received global operating setpoints, the subplant controllers may turn individual devices of equipment 340 on or off, and implement specific operating setpoints (e.g., damper position, vane position, fan speed, pump speed, etc.) to reach or maintain the global operating setpoints.

In some embodiments, the subplant level controllers receive subplant load setpoints from EOS 302. Each subplant level controller may use the subplant load setpoint for the corresponding subplant to select one or more devices of the equipment 340 within the subplant to activate or deactivate in order to meet the subplant load setpoint in an energy-efficient manner. In other embodiments, the equipment selection and staging decisions (i.e., deciding which devices to turn on/off) are performed by a low level optimizer 332 within EOS 302.

BAS 308 may be configured to monitor conditions within a controlled building or building zone. For example, BAS 308 may receive input from various sensors (e.g., temperature sensors, humidity sensors, airflow sensors, voltage sensors, etc.) distributed throughout the building and may report building conditions to EOS 302. Building conditions may include, for example, a temperature of the building or a zone of the building, a power consumption (e.g., electric load) of the building, a state of one or more actuators configured to affect a controlled state within the building, or other types of information relating to the controlled building. BAS 308 may operate subplants 202-210 to affect the monitored conditions within the building and/or to serve the thermal/electrical energy loads of the building.

BAS 308 may receive control signals from EOS 302 specifying on/off states and/or setpoints for equipment 340. BAS 308 may control equipment 340 (e.g., via actuators, power relays, etc.) in accordance with the control signals provided by EOS 302. For example, BAS 308 may operate equipment 340 using closed loop control to achieve the setpoints specified by EOS 302. In various embodiments, BAS 308 may be combined with EOS 302 or may be part of a separate building automation system. According to an exemplary embodiment, BAS 308 is a METASYS® brand building automation system, as sold by Johnson Controls, Inc. In some embodiments, BAS 308 is a controller that operates to control equipment 340 and/or operates equipment 340 to achieve the setpoints specified by EOS 302 (i.e., the setpoints generated by low level optimizer 332).

EOS 302 may monitor the status of the controlled building using information received from BAS 308. EOS 302 may be configured to predict the thermal/electrical energy loads (e.g., heating loads, cooling loads, electric, etc.) of the building for plurality of time steps in a prediction window (e.g., using weather forecasts from a weather service 324). EOS 302 may generate on/off decisions and/or setpoints for equipment 340 to minimize the cost of energy consumed by subplants 202-210 to serve the predicted heating and/or cooling loads for the duration of the prediction window. In various embodiments, EOS 302 may be integrated within a single computer (e.g., one server, one housing, etc.) or distributed across multiple servers or computers. In some embodiments, EOS 302 is integrated with a smart building manager that manages multiple building systems and/or combined with BAS 308.

EOS 302 may be configured to operate in multiple different operating modes including an automatic mode, an advisory mode, and a manual mode. In the automatic mode, EOS 302 may automatically control energy plant 200. For example, EOS 302 may automatically determine optimal subplant loads for each of subplants 202-210. EOS 302 may use the optimal subplant loads to determine optimal on/off decisions and operating setpoints for individual devices of equipment 340. In the automatic mode, EOS 302 may provide the control signals to BAS 308 and/or equipment 340 to control equipment 340 without requiring user intervention or input. BAS 308 may relay the control signals to subplants 202-210 or may be bypassed entirely. In other words, EOS 302 may automatically control energy plant 200 in accordance with the optimized load setpoints and/or equipment setpoints when operated in the automatic mode. The automatic mode is described in greater detail with reference to FIGS. 5-6.

In the advisory mode, BAS 308 may control energy plant 200, whereas EOS 302 may provide advice. EOS 302 may still determine optimal subplant loads for each of subplants 202-210 and optimal on/off decisions and operating setpoints for equipment 340. However, the optimal values determined by EOS 302 may be provided to BAS 308 as recommended subplant loads and recommended setpoints. The recommended loads and setpoints may also be presented to a user via a user interface. BAS 308 may determine whether to use the recommended loads and setpoints to control energy plant 200. In some embodiments, BAS 308 uses input from a user to determine whether to apply the recommended loads and setpoints provided by EOS 302. In some embodiments, EOS 302 displays the recommended loads/setpoints to a user and the user enters the recommended loads/setpoints as an input to BAS 308. In other embodiments, BAS 308 receives the recommended loads/setpoints directly from EOS 302. The advisory mode is described in greater detail with reference to FIGS. 7-8.

In the manual mode, EOS 302 may control energy plant 200 based on user input. Similar to the advisory mode, EOS 302 may determine optimal subplant loads for each of subplants 202-210 and optimal on/off decisions and operating setpoints for equipment 340. The optimal values determined by EOS 302 may be presented to a user (e.g., via a user interface) as recommended subplant loads and recommended setpoints. A user can accept the optimized values or enter user-defined (i.e., "manual") values for the subplant loads, equipment on/off decisions, and/or operating setpoints via the user interface. In some embodiments, the user-defined values override the optimized values when EOS 302 is operated in the manual mode. For example, EOS 302 may determine on/off decisions and control setpoints for equipment 340 based on the user-defined load setpoints for each of subplants 302-312. The manual mode is described in greater detail with reference to FIGS. 9-10.

Still referring to FIG. 3, EOS 302 is shown to include a communications interface 304 and a processing circuit 306. Communications interface 304 may include wired or wireless interfaces (e.g., jacks, antennas, transmitters, receivers, transceivers, wire terminals, etc.) for conducting data communications with various systems, devices, or networks. For example, communications interface 304 may include an Ethernet card and port for sending and receiving data via an Ethernet-based communications network and/or a Wi-Fi transceiver for communicating via a wireless communications network. Communications interface 304 may be configured to communicate via local area networks or wide area networks (e.g., the Internet, a building WAN, etc.) and may use a variety of communications protocols (e.g., BACnet, IP, LON, etc.).

Communications interface 304 may be a network interface configured to facilitate electronic data communications between EOS 302 and various external systems or devices (e.g., BAS 308, subplants 202-210, etc.). For example, EOS 302 may receive information from BAS 308 indicating one or more measured states of the controlled building (e.g., temperature, humidity, electric loads, etc.) and one or more states of subplants 202-210 (e.g., equipment status, power consumption, equipment availability, etc.). Communications interface 304 may receive inputs from BAS 308 and/or subplants 202-210 and may provide operating parameters (e.g., on/off decisions, setpoints, etc.) to subplants 202-210 via BAS 308. The operating parameters may cause subplants 202-210 to activate, deactivate, or adjust a setpoint for various devices of equipment 340.

Still referring to FIG. 3, processing circuit 306 is shown to include a processor 310 and memory 312. Processor 310 may be a general purpose or specific purpose processor, an application specific integrated circuit (ASIC), one or more field programmable gate arrays (FPGAs), a group of processing components, or other suitable processing components. Processor 310 may be configured to execute computer code or instructions stored in memory 312 or received from other computer readable media (e.g., CDROM, network storage, a remote server, etc.).

Memory 312 may include one or more devices (e.g., memory units, memory devices, storage devices, etc.) for storing data and/or computer code for completing and/or facilitating the various processes described in the present disclosure. Memory 312 may include random access memory (RAM), read-only memory (ROM), hard drive storage, temporary storage, non-volatile memory, flash memory, optical memory, or any other suitable memory for storing software objects and/or computer instructions. Memory 312 may include database components, object code components, script components, or any other type of information structure for supporting the various activities and information structures described in the present disclosure. Memory 312 may be communicably connected to processor 310 via processing circuit 306 and may include computer code for executing (e.g., by processor 310) one or more processes described herein.

Still referring to FIG. 3, memory 312 is shown to include a building status monitor 334. EOS 302 may receive data regarding the overall building or building space to be heated or cooled with energy plant 200 via building status monitor 334. In an exemplary embodiment, building status monitor 334 may include a graphical user interface component configured to provide graphical user interfaces to a user for selecting building requirements (e.g., overall temperature parameters, selecting schedules for the building, selecting different temperature levels for different building zones, etc.).

EOS 302 may determine on/off configurations and operating setpoints to satisfy the building requirements received from building status monitor 334. In some embodiments, building status monitor 334 receives, collects, stores, and/or transmits cooling load requirements, building temperature setpoints, occupancy data, weather data, energy data, schedule data, and other building parameters. In some embodiments, building status monitor 334 stores data regarding energy costs, such as pricing information available from utilities 326 (energy charge, demand charge, etc.).

Still referring to FIG. 3, memory 312 is shown to include a load/rate predictor 322. Load/rate predictor 322 may be configured to predict the energy loads ($\hat{l}_k$) of the building or campus for each time step k (e.g., k=1 . . . n) of an optimization period. Load/rate predictor 322 is shown receiving weather forecasts from a weather service 324. In some embodiments, load/rate predictor 322 predicts the energy loads $\hat{l}_k$ as a function of the weather forecasts. In some embodiments, load/rate predictor 322 uses feedback from BAS 308 to predict loads $\hat{l}_k$. Feedback from BAS 308 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 322 receives a measured electric load and/or previous measured load data from BAS 308 (e.g., via building status monitor 334). Load/rate predictor 322 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 322 uses a deterministic plus stochastic model trained from historical load data to predict loads $\hat{l}_k$. Load/rate predictor 322 may use any of a variety of prediction methods to predict loads $\hat{l}_k$ (e.g., linear regression for the deterministic portion and an AR model for the stochastic portion). Load/rate predictor 322 may predict one or more different types of loads for the building or campus. For example, load/rate predictor 322 may predict a hot water load $\hat{l}_{Hot,k}$ and a cold water load $\hat{l}_{Cold,k}$ for each time step k within the prediction window.

Load/rate predictor 322 is shown receiving utility rates from utilities 326. Utility rates may indicate a cost or price per unit of a resource (e.g., electricity, natural gas, water, etc.) provided by utilities 326 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 326 or predicted utility rates estimated by load/rate predictor 322.

In some embodiments, the utility rates include demand charges for one or more resources provided by utilities 326. A demand charge may define a separate cost imposed by utilities 326 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, energy plant optimizer 328 may be configured to account for demand charges in the high level optimization process performed by high level optimizer 330. Utilities 326 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 322 may store the predicted loads $\hat{l}_k$ and the utility rates in memory 312 and/or provide the predicted loads $\hat{l}_k$ and the utility rates to energy plant optimizer 328. Energy plant optimizer 328 may use the predicted loads $\hat{l}_k$ and the utility rates to determine an optimal load distribution for subplants 202-210 and to generate on/off decisions and setpoints for equipment 340.

Still referring to FIG. 3, memory 312 is shown to include an energy plant optimizer 328. Energy plant optimizer 328 may perform a cascaded optimization process to optimize the performance of energy plant 200. For example, energy plant optimizer 328 is shown to include a high level optimizer 330 and a low level optimizer 332. High level optimizer 330 may control an outer (e.g., subplant level) loop of the cascaded optimization. High level optimizer 330 may determine an optimal distribution of energy loads across subplants 202-210 for each time step in the prediction window in order to optimize (e.g., minimize) the cost of energy consumed by subplants 202-210. Low level optimizer 332 may control an inner (e.g., equipment level) loop of the cascaded optimization. Low level optimizer 332 may determine how to best run each subplant at the load setpoint determined by high level optimizer 330. For example, low level optimizer 332 may determine on/off states and/or operating setpoints for various devices of equipment 340 in order to optimize (e.g., minimize) the energy consumption of each subplant while meeting the energy load setpoint for the subplant. The cascaded optimization process is described in greater detail with reference to FIG. 4.

Still referring to FIG. 3, memory 312 is shown to include a subplant monitor 338. Subplant monitor 338 may collect and store information regarding the past, current, and future (e.g., planned) utilization of subplants 202-210. For example, subplant monitor 338 may receive actual utilization data from BAS 308 and/or energy plant 200 indicating the actual energy loads served by subplants 202-210. The actual utilization data may be current utilization data (e.g., the actual energy loads currently being served) or past utilization data (e.g., the actual energy loads served at a previous time). In some embodiments, the actual utilization data indicates a total heating load and/or a total cooling load requested to be served by energy plant 200 at a past or current time. The actual utilization data may also indicate any unmet heating and/or cooling load that is requested but not met by energy plant 200 at a past or current time. In some embodiments, the actual utilization data indicates a past or current rate of utility consumption (e.g., water consumption, electricity consumption, natural gas consumption, photovoltaic energy consumption, etc.).

The actual utilization data may be provided at various levels of granularity. For example, the actual utilization data for a given subplant (e.g., chiller subplant 202) may include an aggregate value that represents the total energy load served by the subplant (e.g., the total load served by all of the chillers). In other embodiments, the actual utilization data may be provided for each of the individual devices within subplants 202-210 (e.g., the cooling load served by each of the chillers individually).

In some embodiments, subplant monitor 338 receives the actual utilization data as a continuous data signal. In other embodiments, subplant monitor 338 receives the actual utilization data at regular intervals (e.g., every minute, every fifteen minutes, every hour, etc.). Subplant monitor 338 may store the actual utilization data in memory 312 or in a separate subplant utilization database. In some embodiments, subplant monitor 338 stores the actual utilization data at regular intervals such that the stored utilization data represents a history of the relevant operating information for energy plant 200 over time.

Subplant monitor 338 may receive predicted future utilization data indicating the thermal and electrical energy loads to be served by subplants 202-210 at a future time. In some embodiments, the predicted utilization data for subplants 202-210 is generated by energy plant optimizer 328 for multiple time steps during a prediction window. For example, the predicted utilization data may include the optimal subplant loads predicted by high level optimizer 330 and/or the optimal equipment on/off states predicted by low level optimizer 332 for each time step during the prediction window.

In some embodiments, the predicted utilization data indicates a total heating load and/or a total cooling load predicted by load/rate predictor 322. The predicted utilization data may also indicate any unmet heating and/or cooling load that is predicted to be requested but not met by energy plant 200. In some embodiments, the predicted utilization data indicates a predicted rate of utility consumption (e.g., water consumption, electricity consumption, natural gas consumption, photovoltaic energy consumption, etc.).

The predicted utilization data may be provided at various levels of granularity. For example, the predicted utilization data for a given subplant (e.g., chiller subplant 202) may include an aggregate value that represents the total energy load estimated to be served by the subplant (e.g., the total predicted load served by all of the chillers). In other embodiments, the predicted utilization data may be provided for each of the individual devices within subplants 202-210 (e.g., the predicted cooling load served by each of the chillers individually).

In some embodiments, subplant monitor 338 receives the predicted utilization data for each of a plurality of time steps during a prediction window. For example, energy plant optimizer 328 may perform an optimization process (described in greater detail with reference to FIG. 4) to generate subplant load values for each time step during a prediction window that extends from the current time to a predetermined prediction horizon. Each time step may have a defined duration (e.g., fifteen minutes, one hour, etc.). The predicted subplant load values may be updated each time the optimization process is performed. Subplant monitor 338 may store the predicted utilization data in memory 312 or in a separate subplant utilization database. In some embodiments, subplant monitor 338 stores the predicted utilization data at regular intervals (e.g., hourly intervals) such that the stored utilization data represents a planned dispatch schedule for energy plant 200 over time.

Data and processing results from energy plant optimizer 328, subplant monitor 338, or other modules of EOS 302 may be accessed by (or pushed to) monitoring and reporting applications 336. Monitoring and reporting applications 336 may be configured to generate real time system health dashboards that can be viewed and navigated by a user (e.g., an energy plant engineer). For example, monitoring and reporting applications 336 may include a web-based monitoring application with several graphical user interface (GUI) elements (e.g., widgets, dashboard controls, windows, etc.) for displaying key performance indicators (KPI) or other information to users of a GUI. In some embodiments, the GUI elements include a chart or graph (e.g., a dispatch bar chart) that represents the actual and predicted utilization data provided by subplant monitor 338. GUI elements or reports may be generated and shown based on actual and predicted utilization data that allow users to monitor the performance of subplants 202-210 and energy plant 200 as a whole using a single screen. An exemplary dispatch GUI that may be generated by monitoring and reporting applications 336 is described in greater detail with reference to FIGS. 11-37.

Still referring to FIG. 3, EOS 302 may include one or more GUI servers, web services 314, or GUI engines 316 to support monitoring and reporting applications 336. In various embodiments, applications 336, web services 314, and GUI engine 316 may be provided as separate components outside of EOS 302 (e.g., as part of a smart building manager). EOS 302 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. EOS 302 may be configured to provide the results of any such processing to other databases, tables, XML files, or other data structures for further querying, calculation, or access by, for example, external monitoring and reporting applications.

EOS 302 is shown to include configuration tools 318. Configuration tools 318 can allow a user to define (e.g., via graphical user interfaces, via prompt-driven wizards, etc.) how EOS 302 should react to changing conditions in the energy plant subsystems. In an exemplary embodiment, configuration tools 318 allow a user to build and store condition-response scenarios that can cross multiple energy plant devices, multiple building systems, and multiple enterprise control applications (e.g., work order management system applications, entity resource planning applications, etc.). For example, configuration tools 318 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 318 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 4:
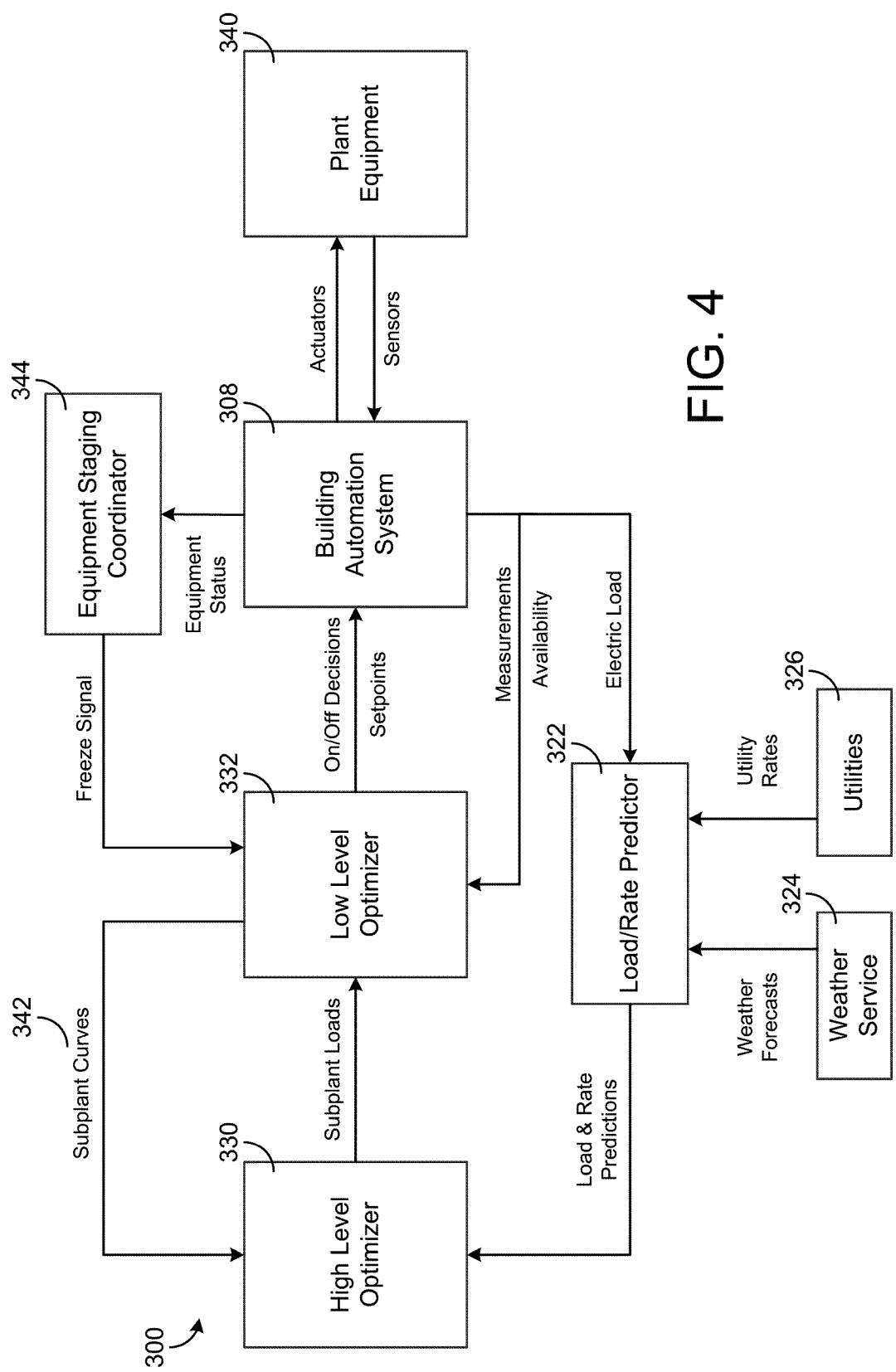
FIG. 4 is a block diagram of a plant system illustrating a cascaded optimization process which may be performed by the EOS of FIG. 3, according to an exemplary embodiment.

Referring now to FIG. 4, a block diagram illustrating a portion of energy plant system 300 in greater detail is shown, according to an exemplary embodiment. FIG. 4 illustrates the cascaded optimization process performed by energy plant optimizer 328 to optimize the performance of energy plant 200. In the cascaded optimization process, high level optimizer 330 performs a subplant level optimization that determines an optimal distribution of thermal and electrical energy loads across subplants 202-210 for each time step in the prediction window in order to minimize the cost of energy consumed by subplants 202-210. Low level optimizer 332 performs an equipment level optimization that determines how to best run each subplant at the subplant load setpoint determined by high level optimizer 330. For example, low level optimizer 332 may determine on/off states and/or operating setpoints for various devices of equipment 340 in order to optimize the energy consumption of each subplant while meeting the thermal and/or electrical energy load setpoint for the subplant.

One advantage of the cascaded optimization process performed by energy plant optimizer 328 is the optimal use of computational time. For example, the subplant level optimization performed by high level optimizer 330 may use a relatively long time horizon due to the operation of the thermal energy storage. However, the equipment level optimization performed by low level optimizer 332 may use a much shorter time horizon or no time horizon at all since the low level system dynamics are relatively fast (compared to the dynamics of the thermal energy storage) and the low level control of equipment 340 may be handled by BAS 308. Such an optimal use of computational time makes it possible for energy plant optimizer 328 to perform the energy plant optimization in a short amount of time, allowing for real-time predictive control. For example, the short computational time enables energy plant optimizer 328 to be implemented in a real-time planning tool with interactive feedback.

Another advantage of the cascaded optimization performed by energy plant optimizer 328 is that the energy plant optimization problem can be split into two cascaded subproblems. The cascaded configuration provides a layer of abstraction that allows high level optimizer 330 to distribute the energy loads across subplants 202-210 without requiring high level optimizer 330 to know or use any details regarding the particular equipment configuration within each subplant. The interconnections between equipment 340 within each subplant may be hidden from high level optimizer 330 and handled by low level optimizer 332. For purposes of the subplant level optimization performed by high level optimizer 330, each subplant may be completely defined by one or more subplant curves 342.

Low level optimizer 332 may generate and provide subplant curves 342 to high level optimizer 330. Subplant curves 342 may indicate the rate of utility use by each of subplants 202-210 (e.g., electricity use measured in kW, water use measured in L/s, etc.) as a function of the subplant load. In some embodiments, low level optimizer 332 generates subplant curves 342 based on equipment models 320 (e.g., by combining equipment models 320 for individual devices into an aggregate curve for the subplant). Low level optimizer 332 may generate subplant curves 342 by running the low level optimization process for several different loads and weather conditions to generate multiple data points. Low level optimizer 332 may fit a curve to the data points to generate subplant curves 342. In other embodiments, low level optimizer 332 provides the data points to high level optimizer 330 and high level optimizer 330 generates the subplant curves using the data points.

High level optimizer 330 may receive the load and rate predictions from load/rate predictor 322 and the subplant curves 342 from low level optimizer 332. The load predictions may be based on weather forecasts from weather service 324 and/or information from building automation system 308 (e.g., a current electric load of the building, measurements from the building, a history of previous loads, a setpoint trajectory, etc.). The utility rate predictions may be based on utility rates received from utilities 326 and/or utility prices from another data source. High level optimizer 330 may determine the optimal load distribution for subplants 202-210 (e.g., a subplant load for each subplant) for each time step the prediction window and may provide the subplant loads as setpoints to low level optimizer 332. In some embodiments, high level optimizer 330 determines the subplant loads by minimizing the total operating cost of energy plant 200 over the prediction window. In other words, given a predicted load and utility rate information from load/rate predictor 322, high level optimizer 330 may distribute the predicted load across subplants 202-210 over the optimization period to minimize operating cost.

In some instances, the optimal load distribution may include using thermal energy storage to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by thermal energy storage. The high level optimization may be described by the following equation:

$$\theta^*_{HL} = \underset{\theta_{HL}}{\operatorname{argmin}} J_{HL}(\theta_{HL})$$

where $\theta^*_{HL}$ contains the optimal high level decisions (e.g., the optimal load for each of subplants 202-210) for the entire optimization period and $J_{HL}$ is the high level cost function.

To find the optimal high level decisions $\theta^*_{HL}$, high level optimizer 330 may minimize the high level cost function $J_{HL}$. The high level cost function $J_{HL}$ may be the sum of the economic (e.g., monetary) costs of each utility consumed by each of subplants 202-210 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \underset{n_h}{\max}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \underset{n_h}{\max}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the energy loads for the building or campus are met. These restrictions may lead to both equality and inequality constraints on the high level optimization problem.

In some embodiments, the high level optimization performed by high level optimizer 330 is the same or similar to the high level optimization process described in U.S. patent application Ser. No. 14/634,609 filed Feb. 27, 2015 and titled "High Level Energy plant Optimization," the entire disclosure of which is incorporated by reference herein. High level optimizer 330 may include some or all of the features and/or functionality of the high level optimization module described in U.S. patent application Ser. No. 14/634,609.

Still referring to FIG. 4, low level optimizer 332 may use the subplant loads determined by high level optimizer 330 to determine optimal low level decisions $\theta^*_{LL}$ (e.g. binary on/off decisions, flow setpoints, temperature setpoints, etc.) for equipment 340. The low level optimization process may be performed for each of subplants 202-210. In various embodiments, the low level optimization process may be performed by centralized low level optimizer 332 that performs a separate low level optimization for each of subplants 202-210 or by a set of subplant level controllers that operate within each subplant (e.g., each subplant controller running an instance of low level optimizer 332). Low level optimizer 332 may be responsible for determining which devices of the subplant to use and/or the operating setpoints for such devices that will achieve the subplant load setpoint while minimizing energy consumption. The low level optimization may be described using the following equation:

$$\theta^*_{LL} = \underset{\theta_{LL}}{\operatorname{argmin}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimizer 332 may minimize the low level cost function $J_{LL}$. The low level cost function $J_{LL}$ may represent the total energy consumption for all of equipment 340 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 340 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 332 may minimize the low level cost function $J_{LL}$ subject to inequality constraints based on the capacities of equipment 340 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimizer 332 performs the equipment level optimization without considering system dynamics. The optimization process may be slow enough to safely assume that the equipment control has reached its steady-state. Thus, low level optimizer 332 may determine the optimal low level decisions $\theta^*_{LL}$ at an instance of time rather than over a long horizon.

In some embodiments, the optimal low level decisions $\theta^*_{LL}$ are constrained by an equipment staging coordinator 344 that prevents two or more of subplants 202-210 from reacting to a change in the subplant load too quickly after a change in another of subplants 202-210 has occurred. For example, equipment staging coordinator 344 is shown receiving equipment status information from BAS 308. Equipment staging coordinator 344 may use the equipment status information to determine when the equipment 340 within a given subplant has been staged (e.g., turned on/off). Equipment staging coordinator 344 may prevent multiple subplants from staging their equipment 340 simultaneously or within a predetermined time period after another subplant has staged its equipment 340. Advantageously, this functionality reduces the peak energy consumption for energy plant 200 at any instant in time and results in a lower demand charge.

In some embodiments, equipment staging coordinator 344 causes low level optimizer 332 to halt its efficiency calculations and hold the optimal low level decisions $\theta^*_{LL}$ for a given subplant at previously-determined values shortly after the equipment 340 for another subplant has been staged (e.g., by providing a freeze signal to low level optimizer 332). Once a threshold time has passed since the equipment 340 for the other subplant has been staged, equipment staging coordinator 344 may allow low level optimizer 332 to resume its efficiency calculations and to determine new values for the optimal low level decisions $\theta^*_{LL}$ (e.g., by withdrawing the freeze signal).

Low level optimizer 332 may determine optimum operating statuses (e.g., on or off) for a plurality of devices of equipment 340. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 332 may also determine optimum operating setpoints for equipment using nonlinear optimization. Nonlinear optimization may identify operating setpoints that further minimize the low level cost function $J_{LL}$. Low level optimizer 332 may provide the on/off decisions and setpoints to building automation system 308 for use in controlling the energy plant equipment 340.

In some embodiments, the low level optimization performed by low level optimizer 332 is the same or similar to the low level optimization process described in U.S. patent application Ser. No. 14/634,615 filed Feb. 27, 2015 and titled "Low Level Energy plant Optimization," the entire disclosure of which is incorporated by reference herein. Low level optimizer 332 may include some or all of the features and/or functionality of the low level optimization module described in U.S. patent application Ser. No. 14/634,615.

Automatic, Advisory, and Manual Operating Modes

Referring now to FIGS. 5-10, several block diagrams and flow diagrams illustrating the operation of energy optimization system (EOS) 302 in an automatic operating mode (FIGS. 5-6), advisory operating mode (FIGS. 7-8), and manual operating mode (FIGS. 9-10) are shown, according to an exemplary embodiment. In brief overview, EOS 302 may determine optimal subplant loads and optimal equipment setpoints in each of the operating modes. In the automatic operating mode, EOS 302 may provide the optimal equipment setpoints to energy plant 200. In the advisory operating mode, EOS 302 may provide the optimal subplant loads and equipment setpoints to a user interface as recommended setpoints for energy plant 200. A user may view the recommended setpoints and provide user-defined setpoints for building automation system 308, which may or may not be based on the recommended setpoints. In the manual operating mode, EOS 302 may control energy plant 200 based on manual (i.e., user-defined) subplant loads received via a user interface of EOS 302. EOS 302 may use the manual subplant loads to generate recommended equipment setpoints and equipment control signals that achieve the manual subplant loads. The equipment control signals may then be provided to energy plant 200. Each of these operating modes is discussed in greater detail below.

Automatic Operating Mode

Figure 5:
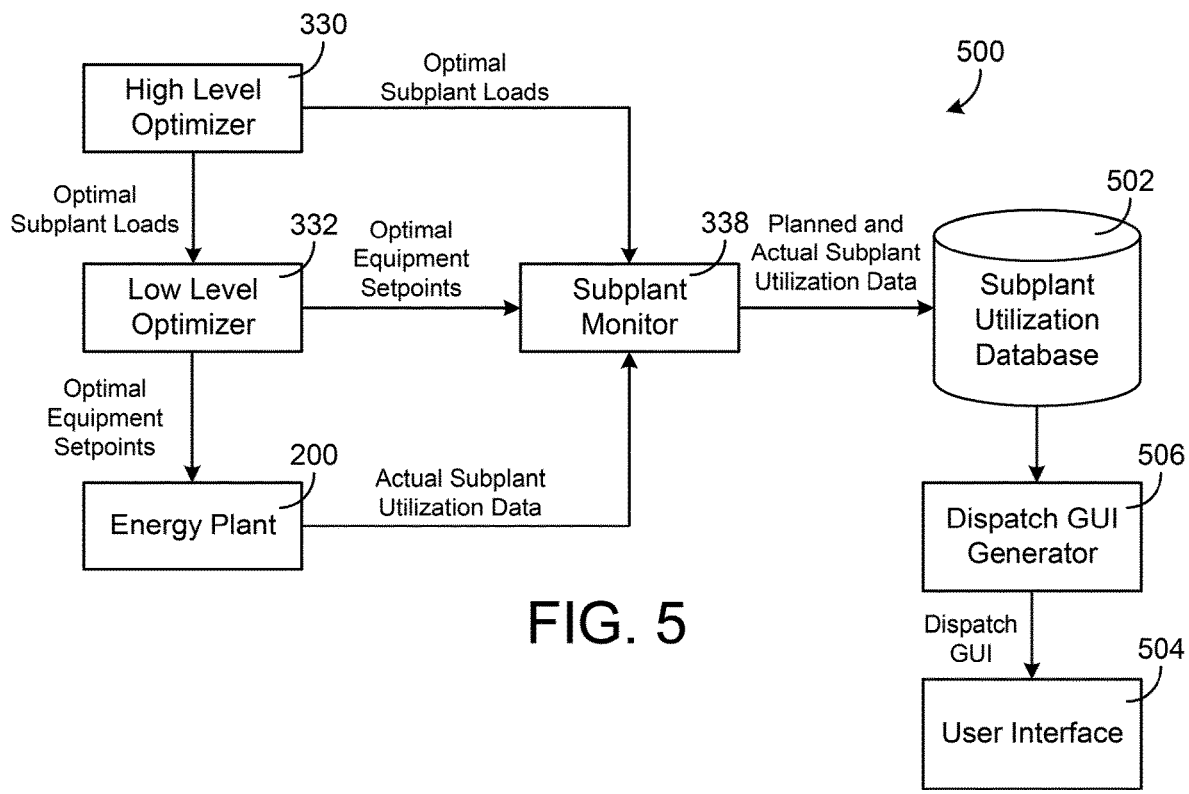
FIG. 5 is a block diagram illustrating the operation of the EOS of FIG. 3 in an automatic operating mode, according to an exemplary embodiment.

Referring now to FIG. 5, a block diagram illustrating a system 500 for monitoring and controlling an energy plant in an automatic operating mode is shown, according to an exemplary embodiment. In the automatic operating mode, EOS 302 automatically determines optimal subplant loads for each of subplants 202-210 and optimal equipment setpoints for the energy plant equipment 340. EOS 302 provides the optimal equipment setpoints to energy plant 200, which uses the optimal equipment setpoints to control the energy plant equipment 340. EOS 302 monitors actual subplant utilization via subplant monitor 338 and stores planned and actual subplant utilization data in a subplant utilization database 502. A dispatch GUI generator 506 uses the planned and actual subplant utilization data to generate a dispatch GUI 902. Dispatch GUI 902 may be presented to a user via a user interface 504 to allow the user to monitor the operation of energy plant 200.

System 500 is shown to include high level optimizer 330, low level optimizer 332, and energy plant 200, which may be the same or similar as described with reference to FIGS. 2-4. For example, high level optimizer 330 may perform an optimization process to generate a set of optimal subplant loads for each of subplants 202-210. In some embodiments, the optimal subplant loads include a total cold requested load and a total hot requested load. In some embodiments, the optimal subplant loads include an unmet heating load and/or an unmet cooling load. The unmet heating load may be defined as the amount by which the total requested heating load exceeds the sum of the heating loads produced by subplants 202-210. Similarly, the unmet cooling load may be defined as the amount by which the total requested cooling load exceeds the sum of the cooling loads produced by subplants 202-210. In some embodiments, the optimal subplant loads include an optimal amount of one or more resources (e.g., water, electricity, natural gas, etc.) consumed by subplants 202-210 to generate the optimal subplant loads.

High level optimizer 330 may determine the optimal subplant loads for a plurality of time steps between the current time and a future time horizon. Each of the time steps may have a defined or predetermined duration (e.g., fifteen minutes, one hour, etc.). The optimal subplant loads may be updated with each iteration of the high level optimization process. High level optimizer 330 may provide the optimal subplant loads to low level optimizer 332 and to subplant monitor 338. Subplant monitor 338 may store the optimal subplant loads as planned subplant utilization data in a subplant utilization database 502.

Low level optimizer 332 may use the optimal subplant loads to generate a set of optimal equipment setpoints for the equipment of subplants 202-210. The optimal equipment setpoints may include on/off states, operating setpoints, and/or other setpoints defining the utilization of individual devices of the subplants 202-210. The optimal equipment setpoints may include setpoints for individual devices of subplants 202-210 in order for each subplant to meet the optimal subplant load. In some embodiments, low level optimizer 332 performs an optimization process to generate the optimal equipment setpoints. Low level optimizer 332 may provide the optimal equipment setpoints to energy plant 200 and to subplant monitor 338. Subplant monitor 338 may store the optimal equipment setpoints as planned subplant utilization data in subplant utilization database 502. In various embodiments, subplant utilization database 502 may be a component of EOS 302 (e.g., memory 312) or a separate database outside EOS 302.

Energy plant 200 may use the optimal equipment setpoints to operate the equipment of subplants 202-210. Energy plant 200 may monitor the utilization of subplants 202-210 and generate a set of actual subplant utilization data. The actual subplant utilization data may include actual values (rather than optimal values) for each of the subplant loads optimized by high level optimizer 330. In some embodiments, the actual subplant utilization data include a total cold requested load and a total hot requested load. In some embodiments, the actual subplant utilization data include an actual unmet heating load and/or unmet cooling load. In some embodiments, the actual subplant utilization data include an actual amount of one or more resources (e.g., water, electricity, natural gas, etc.) consumed by subplants 202-210 to generate the actual subplant loads.

Energy plant 200 may report the actual subplant utilization data to subplant monitor 338. In some embodiments, energy plant 200 reports the actual subplant utilization data at regular intervals (e.g., once every fifteen minutes, once per hour, etc.) Subplant monitor 338 may store the actual subplant utilization data in subplant utilization database 502. In some embodiments, subplant monitor 338 overwrites or replaces the planned subplant utilization data for a given time step with the actual subplant utilization data for the time step once the actual subplant utilization data for the time step is available (e.g., once the current time advances to the time step). Similarly, subplant monitor 338 may overwrite or replace the planned subplant data for a given time step with an updated optimal value for the time step each time a new set of optimal subplant utilization data is generated by high level optimizer 330. In other embodiments, subplant monitor 338 supplements the existing planned subplant utilization data with the updated optimal subplant utilization data and/or the actual subplant utilization data without replacing or overwriting the exiting subplant utilization data. For example, the existing subplant utilization data may be stored as a first version of the subplant utilization data and the updated subplant utilization data may be stored as a second version of the subplant utilization data.

Still referring to FIG. 5, system 500 is shown to include a dispatch GUI generator 506. Dispatch GUI generator 506 may access the data stored in subplant utilization database 502 and use the stored data to generate a dispatch GUI. Dispatch GUI 902 may include various graphics (e.g., graphs, charts, flow diagrams, etc.) that illustrate the actual subplant utilization data (e.g., past and current subplant loads) and the planned subplant utilization data (e.g., future subplant loads) in a graphical format. Exemplary dispatch GUIs which may be generated by dispatch GUI generator 506 are described in greater detail with reference to FIGS. 11-37. Dispatch GUI generator 506 may provide dispatch GUI 902 to a user interface 504 for presentation to a user.

In various embodiments, dispatch GUI generator 506 and user interface 504 may be components of BAS 308 or components of EOS 302 (e.g., monitoring and reporting applications 336). Dispatch GUI generator 506 may generate dispatch GUI 902 and provide dispatch GUI 902 to user interface 504 via a communications network. In other embodiments, dispatch GUI generator 506 and user interface 504 are components of a user device (e.g., a computer terminal, a workstation, a laptop, a tablet, a smartphone, etc.). For example, dispatch GUI generator 506 may be a web browser or a specialized application running on the user device. In some embodiments, dispatch GUI 902 is rendered using specialized viewing software (e.g., an energy plant monitoring application) installed on the user device. In other embodiments, dispatch GUI 902 is provided via a web interface which allows dispatch GUI 902 to be rendered and viewed using a web browser without requiring any specialized applications or software to be installed on the user device.

Figure 6:
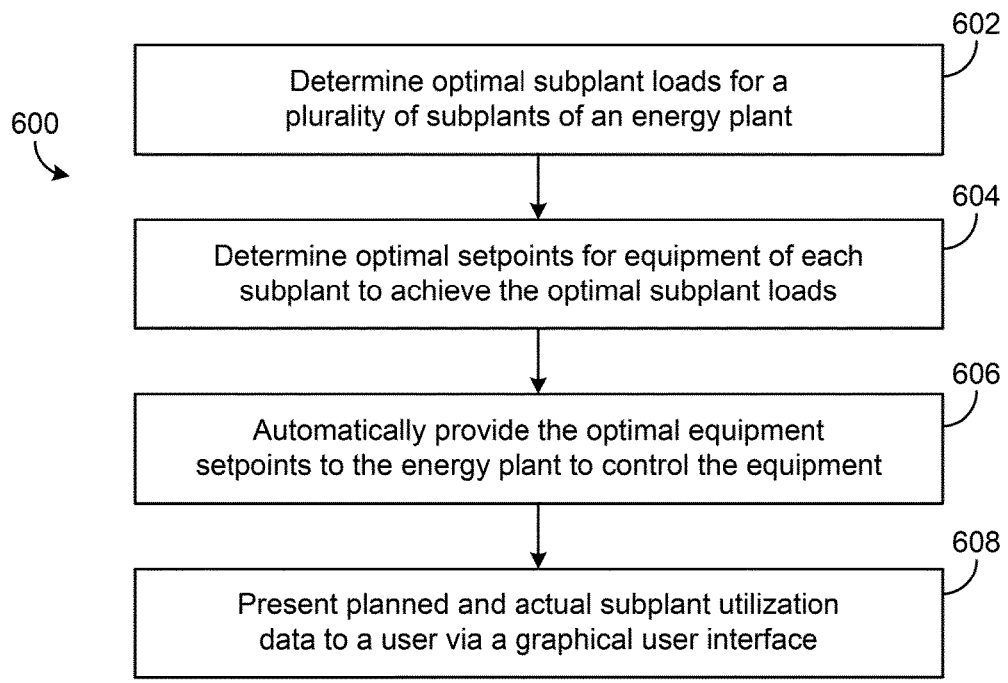
FIG. 6 is a flow diagram illustrating the operation of the EOS of FIG. 3 in the automatic operating mode, according to an exemplary embodiment.

Referring now to FIG. 6, a flow diagram illustrating a process 600 for monitoring and controlling an energy plant in the automatic operating mode is shown, according to an exemplary embodiment. Process 600 may be performed by one or more components of energy plant system 300 and/or system 500 as previously described. For example, process 600 may be performed by EOS 302, BAS 308, dispatch GUI generator 506, and/or other devices of energy plant system 300 or system 500.

Process 600 is shown to include determining optimal subplant loads for a plurality of subplants of an energy plant (step 602). Step 602 may be performed by high level optimizer 330. Step 602 may include determining the optimal subplant loads for a plurality of time steps between the current time and a future time horizon. Each of the time steps may have a defined or predetermined duration (e.g., fifteen minutes, one hour, etc.). The optimal subplant loads may be updated with each iteration of the high level optimization process. High level optimizer 330 may provide the optimal subplant loads to low level optimizer 332 and to subplant monitor 338. Subplant monitor 338 may store the optimal subplant loads as planned subplant utilization data in a subplant utilization database 502.

Process 600 is shown to include determining optimal setpoints for equipment of each subplant to achieve the optimal subplant loads (step 604). Step 604 may be performed by low level optimizer 332. The optimal equipment setpoints may include on/off states, operating setpoints, and/or other setpoints defining the utilization of individual devices of the subplants 202-210. The optimal equipment setpoints may include setpoints for individual devices of subplants 202-210 in order for each subplant to meet the optimal subplant load. Low level optimizer 332 may provide the optimal equipment setpoints to energy plant 200 and to subplant monitor 338. Subplant monitor 338 may store the optimal equipment setpoints as planned subplant utilization data in subplant utilization database 502.

Process 600 is shown to include automatically providing the optimal equipment setpoints to the energy plant to control the equipment (step 606). Step 606 may include providing the optimal equipment setpoints from low level optimizer 332 to energy plant 200. Energy plant 200 may use the optimal equipment setpoints as control inputs for individual devices within each subplant (e.g., individual chillers, individual hot water generators, individual thermal energy storage tanks, etc.). In other words, energy plant 200 may operate controllable devices within energy plant 200 (e.g., equipment 340) in accordance with the optimal equipment setpoints. For example, energy plant 200 may activate a device, deactivate a device, change a setpoint for a device, or otherwise control individual devices of the energy plant equipment 340 based on the optimal equipment setpoints. Energy plant 200 may provide actual subplant utilization data to subplant monitor 338. Subplant monitor 338 may store the actual subplant utilization data in subplant utilization database 502.

Process 600 is shown to include presenting planned and actual subplant utilization data to a user via a graphical user interface (step 608). Step 608 may be performed by dispatch GUI generator 506. In some embodiments, step 608 includes accessing the data stored in subplant utilization database 502 and using the stored data to generate a dispatch GUI. Dispatch GUI 902 may include various graphics (e.g., graphs, charts, flow diagrams, etc.) that illustrate the actual subplant utilization data (e.g., past and current subplant loads) and the planned subplant utilization data (e.g., future subplant loads) in a graphical format. Dispatch GUI generator 506 may provide dispatch GUI 902 to a user interface 504 for presentation to a user.

In the automatic operating mode, the optimal subplant loads and equipment setpoints are used to control energy plant 200. The optimal values determined by EOS 302 may be automatically provided as inputs to energy plant 200. For example, low level optimizer 332 is shown providing the optimal equipment setpoints directly to energy plant 200. In other embodiments, the optimal equipment setpoints may be provided to BAS 308, which may use the optimal equipment setpoints to generate control signals for the energy plant equipment 340. Advantageously, the automatic operating mode allows EOS 302 to control energy plant 200 without requiring user intervention by automatically providing the optimal equipment setpoints to energy plant 200.

Advisory Operating Mode

Figure 7:
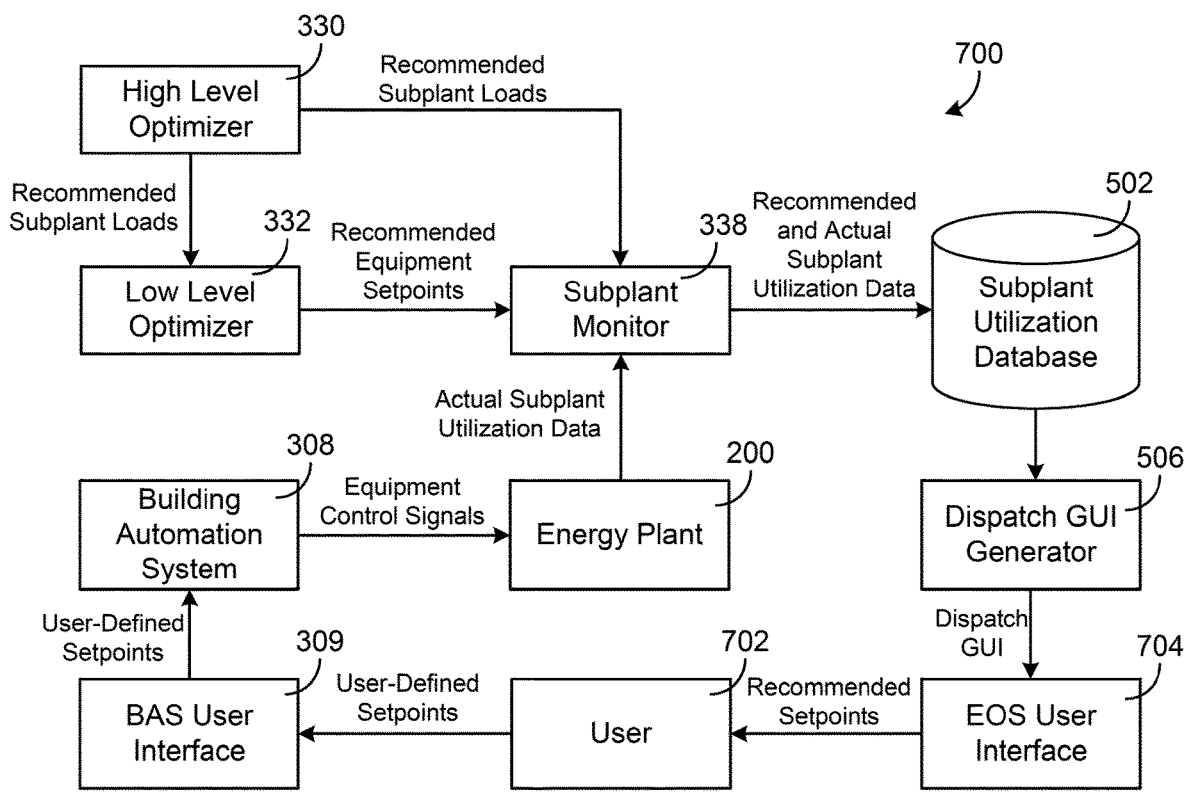
FIG. 7 is a block diagram illustrating the operation of the EOS of FIG. 3 in an advisory operating mode, according to an exemplary embodiment.

Referring now to FIG. 7, a block diagram illustrating a system 700 for monitoring and controlling an energy plant in an advisory operating mode is shown, according to an exemplary embodiment. In the advisory operating mode, EOS 302 determines recommended subplant loads for each of subplants 202-210 and recommended equipment setpoints for the energy plant equipment 340. The recommended subplant loads and recommended equipment setpoints may be the same or similar to the optimal subplant loads and optimal equipment setpoints as previously described. However, unlike the automatic operating mode, EOS 302 does not automatically provide the recommended equipment setpoints as control inputs to energy plant 200. Instead, energy plant 200 receives equipment control signals from BAS 308, which may generate the equipment control signals based in part on user-defined setpoints received from a user 702 via a BAS user interface 309.

System 700 is shown to include high level optimizer 330, low level optimizer 332, energy plant 200, subplant monitor 338, subplant utilization database 502, dispatch GUI generator 506, and BAS 308, which may be the same or similar as described with reference to FIGS. 2-6. For example, high level optimizer 330 may perform an optimization process to generate a set of recommended subplant loads for each of subplants 202-210. High level optimizer 330 may determine the recommended subplant loads for a plurality of time steps between the current time and a future time horizon. Each of the time steps may have a defined or predetermined duration (e.g., fifteen minutes, one hour, etc.). High level optimizer 330 may provide the recommended subplant loads to low level optimizer 332 and to subplant monitor 338. Subplant monitor 338 may store the recommended subplant loads as recommended subplant utilization data in a subplant utilization database 502.

Low level optimizer 332 may use the recommended subplant loads to generate a set of recommended equipment setpoints for the equipment of subplants 202-210. The recommended equipment setpoints may include on/off states, operating setpoints, and/or other setpoints defining the utilization of individual devices of subplants 202-210. The recommended equipment setpoints may include setpoints for individual devices of subplants 202-210 in order for each subplant to meet the recommended subplant load. In some embodiments, low level optimizer 332 performs an optimization process to generate the recommended equipment setpoints. Low level optimizer 332 may provide the recommended equipment setpoints to subplant monitor 338. Subplant monitor 338 may store the recommended equipment setpoints as recommended subplant utilization data in subplant utilization database 502.

Energy plant 200 may monitor the utilization of subplants 202-210 and generate a set of actual subplant utilization data. The actual subplant utilization data may include actual values (rather than recommended values) for each of the subplant loads produced by subplants 202-210. The actual subplant utilization data may also include actual equipment operating states (e.g., on/off states, load production, operating capacities, etc.) for individual devices of energy plant equipment 340. Energy plant 200 may report the actual subplant utilization data to subplant monitor 338. In some embodiments, energy plant 200 reports the actual subplant utilization data at regular intervals (e.g., once every fifteen minutes, once per hour, etc.) Subplant monitor 338 may store the actual subplant utilization data in subplant utilization database 502.

Dispatch GUI generator 506 may access the data stored in subplant utilization database 502 and use the stored data to generate a dispatch GUI. Dispatch GUI 902 may include various graphics (e.g., graphs, charts, flow diagrams, etc.) that illustrate the actual subplant utilization data (e.g., past and current subplant loads) and the recommended subplant utilization data (e.g., future subplant loads) in a graphical format. Dispatch GUI generator 506 may provide dispatch GUI 902 to EOS user interface 704 for presentation to a user 702.

In system 700, EOS 302 and energy plant 200 may be decoupled such that the output of EOS 302 (i.e., recommended subplant loads and equipment setpoints) is not automatically provided as an input to energy plant 200. User 702 can view the recommended setpoints (e.g., recommended subplant load setpoints, recommended equipment setpoints, etc.) and monitor actual subplant operation via EOS user interface 704. In some instances, user 702 may use the recommended setpoints to generate the user-defined setpoints provided to BAS 308; however, such use is not automatic or required when EOS 302 is operated in the advisory operating mode. Instead, EOS 302 may provide the recommended setpoints as suggestions or advice, which the user 702 can choose to accept or reject when generating the user-defined setpoints.

Figure 8:
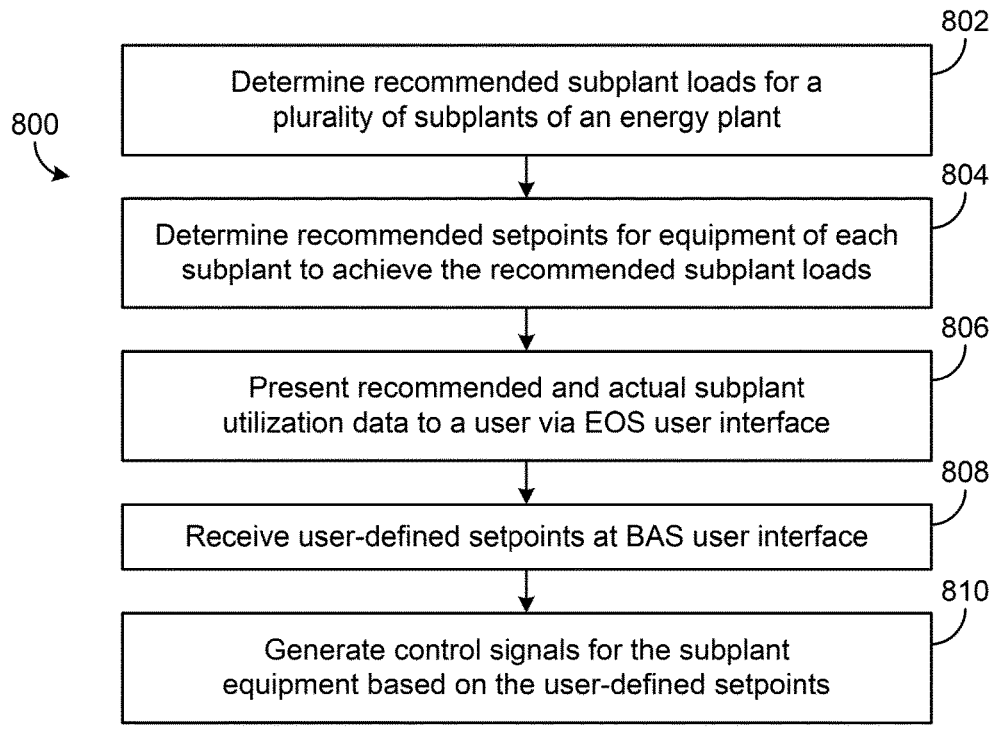
FIG. 8 is a flow diagram illustrating the operation of the EOS of FIG. 3 in the advisory operating mode, according to an exemplary embodiment.

Referring now to FIG. 8, a flow diagram illustrating a process 800 for monitoring and controlling an energy plant in the advisory operating mode is shown, according to an exemplary embodiment. Process 800 may be performed by one or more components of energy plant system 300 and/or system 700 as previously described. For example, process 800 may be performed by EOS 302, BAS 308, dispatch GUI generator 506, and/or other devices of energy plant system 300 or system 700.

Process 800 is shown to include determining recommended subplant loads for a plurality of subplants of an energy plant (step 802). Step 802 may be performed by high level optimizer 330. Step 802 may include determining the recommended subplant loads for a plurality of time steps between the current time and a future time horizon. Each of the time steps may have a defined or predetermined duration (e.g., fifteen minutes, one hour, etc.). The recommended subplant loads may be updated with each iteration of the high level optimization process. High level optimizer 330 may provide the recommended subplant loads to low level optimizer 332 and to subplant monitor 338. Subplant monitor 338 may store the recommended subplant loads as planned subplant utilization data in a subplant utilization database 502.

Process 800 is shown to include determining recommended setpoints for equipment of each subplant to achieve the recommended subplant loads (step 804). Step 804 may be performed by low level optimizer 332. The recommended equipment setpoints may include on/off states, operating setpoints, and/or other setpoints defining the utilization of individual devices of the subplants 202-210. The recommended equipment setpoints may include setpoints for individual devices of subplants 202-210 in order for each subplant to meet the recommended subplant load. Low level optimizer 332 may provide the recommended equipment setpoints to energy plant 200 and to subplant monitor 338. Subplant monitor 338 may store the recommended equipment setpoints as planned subplant utilization data in subplant utilization database 502.

Process 800 is shown to include presenting recommended and actual subplant utilization data to a user via an EOS user interface (e.g., EOS user interface 704) (step 806). Step 806 may be performed by dispatch GUI generator 506 and/or EOS user interface 704. The recommended subplant utilization data may include the recommended subplant loads generated by high level optimizer 330 and/or the recommended equipment setpoints generated by low level optimizer 332. The actual subplant utilization data may include data describing the actual operation of energy plant 200 (e.g., actual subplant loads, actual equipment setpoints, etc.), which may be collected by subplant monitor 338 and stored in subplant utilization database 502.

In some embodiments, step 806 includes accessing the data stored in subplant utilization database 502 and using the stored data to generate a dispatch GUI. Dispatch GUI 902 may include various graphics (e.g., graphs, charts, flow diagrams, etc.) that illustrate the actual subplant utilization data (e.g., past and current subplant loads) and the planned subplant utilization data (e.g., future subplant loads) in a graphical format. Dispatch GUI generator 506 may provide dispatch GUI 902 to EOS user interface 704 for presentation to a user 702.

Process 800 is shown to include receiving user-defined setpoints at a BAS user interface (e.g., BAS user interface 309) (step 808) and generating control signals for the subplant equipment based on the user-defined setpoints (step 810). In some embodiments, BAS user interface 309 is separate and distinct from EOS user interface 704. For example, EOS user interface 704 may be coupled to EOS 302 and configured to present information stored in subplant utilization database 502, whereas BAS user interface 309 may be coupled to BAS 308 and configured to allow user 702 to provide control inputs to BAS 308. In some embodiments, user 702 is the only link between EOS user interface 704 and BAS user interface 309.

In some instances, user 702 may view the recommended setpoints provided via EOS user interface 704 and generate the user-defined setpoints provided to BAS user interface 309 based on the recommended setpoints. In other instances, user 702 may generate the user-defined setpoints independent of the recommended setpoints. Advantageously, the advisory mode allows user 702 to exercise a greater level of control over energy plant 200 relative to the automatic mode by allowing user 702 to choose whether to use the recommended setpoints to control energy plant 200 or provide different user-defined setpoints.

Manual Operating Mode

Figure 9:
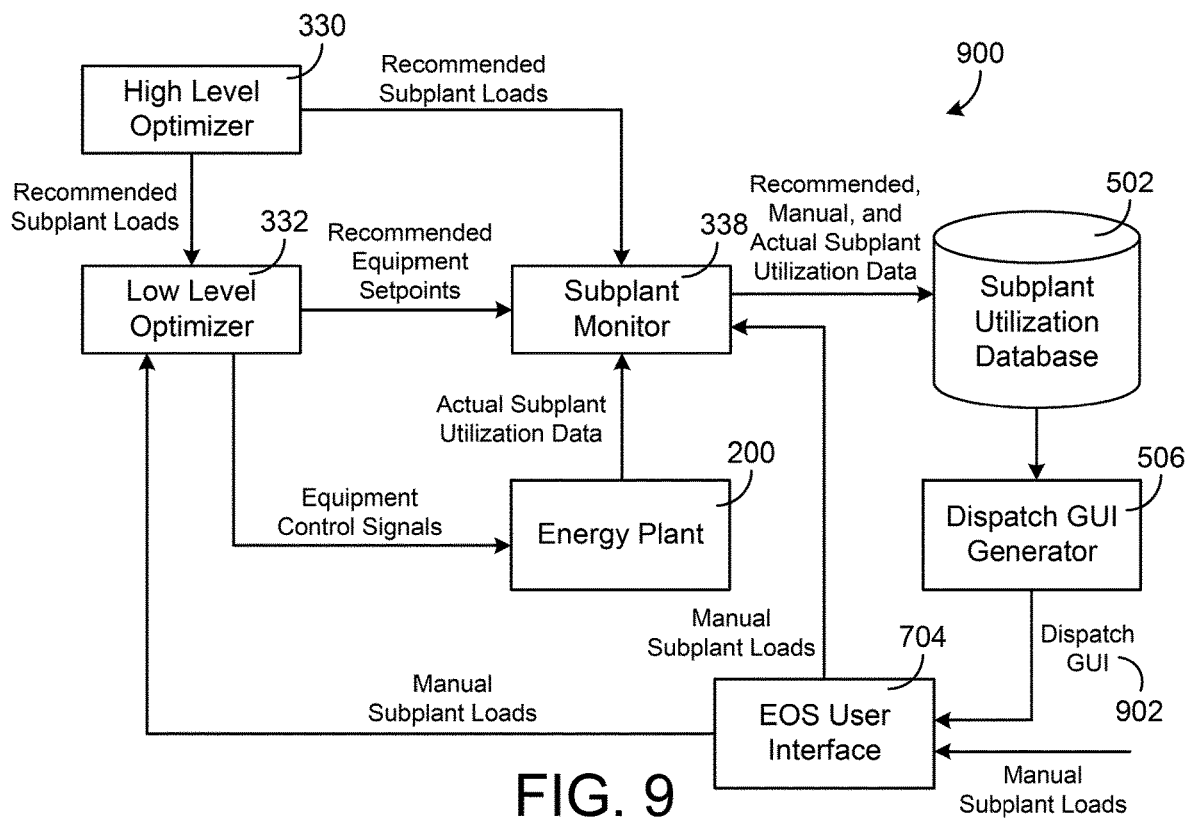
FIG. 9 is a block diagram illustrating the operation of the EOS of FIG. 3 in a manual operating mode, according to an exemplary embodiment.

Referring now to FIG. 9, a block diagram illustrating a system 900 for monitoring and controlling an energy plant in a manual operating mode is shown, according to an exemplary embodiment. In the manual operating mode, EOS 302 determines recommended subplant loads for each of subplants 202-210 and recommended equipment setpoints for the energy plant equipment 340. The recommended subplant loads and recommended equipment setpoints may be the same or similar to the optimal subplant loads and optimal equipment setpoints as previously described. However, EOS 302 does not automatically provide the recommended equipment setpoints as control inputs to energy plant 200 when operating in the manual mode. Instead, EOS 302 receives manual (i.e., user-defined) subplant loads from a user via EOS user interface 704. EOS 302 uses the manual subplant loads to determine recommended (e.g., optimal) equipment setpoints to achieve the manual subplant loads.

EOS 302 may generate equipment control signals for subplant equipment 340 based on the recommended equipment setpoints to achieve the manual subplant loads.

System 900 is shown to include high level optimizer 330, low level optimizer 332, energy plant 200, subplant monitor 338, subplant utilization database 502, dispatch GUI generator 506, EOS user interface 704, and BAS 308, which may be the same or similar as described with reference to FIGS. 2-8. For example, high level optimizer 330 may perform an optimization process to generate a set of recommended subplant loads for each of subplants 202-210. High level optimizer 330 may determine the recommended subplant loads for a plurality of time steps between the current time and a future time horizon. Each of the time steps may have a defined or predetermined duration (e.g., fifteen minutes, one hour, etc.). High level optimizer 330 may provide the recommended subplant loads to low level optimizer 332 and to subplant monitor 338. Subplant monitor 338 may store the recommended subplant loads as recommended subplant utilization data in a subplant utilization database 502.

Low level optimizer 332 may use the recommended subplant loads to generate a first set of recommended equipment setpoints for the equipment of subplants 202-210. The first set of recommended equipment setpoints may include on/off states, operating setpoints, and/or other setpoints defining the utilization of individual devices of subplants 202-210. The first set of recommended equipment setpoints may include setpoints for individual devices of subplants 202-210 in order for each subplant to meet the recommended subplant load. In some embodiments, low level optimizer 332 performs an optimization process to generate the first set of recommended equipment setpoints. Low level optimizer 332 may provide the first set of recommended equipment setpoints to subplant monitor 338. Subplant monitor 338 may store the first set of recommended equipment setpoints as recommended subplant utilization data in subplant utilization database 502.

Low level optimizer 332 may also receive manual subplant loads from EOS user interface 704. The manual subplant loads may include user-defined loads for each of subplants 202-210. A user can specify the manual subplant loads via EOS user interface 704 (e.g., by entering values for the manual subplant loads, by adjusting sliders or dials, etc.). The manual subplant loads may be provided from EOS user interface 704 to low level optimizer 332. The manual subplant loads may also be provided to subplant monitor 338. Subplant monitor 338 may store the manual subplant loads as manual subplant utilization data in subplant utilization database 502.

Low level optimizer 332 may use the manual subplant loads to generate a second set of recommended equipment setpoints for the equipment of subplants 202-210. The second set of recommended equipment setpoints may include setpoints for individual devices of subplants 202-210 in order for each subplant to meet the manual subplant load. In some embodiments, low level optimizer 332 performs an optimization process to generate the second set of recommended equipment setpoints. Low level optimizer 332 may provide the second set of recommended equipment setpoints to subplant monitor 338. Subplant monitor 338 may store the recommended equipment setpoints as manual subplant utilization data in subplant utilization database 502.

In some embodiments, low level optimizer 332 uses the second set of recommended equipment setpoints to generate equipment control signals for energy plant 200. The equipment control signals may include on/off signals, load production signals, power consumption signals, or other types of control signals which may be used to control individual devices of subplant equipment 340. The equipment control signals may cause each of subplants 202-210 to operate the individual devices of the subplant in a manner that achieves the manual subplant load for the subplant. For example, the equipment control signals for a chiller subplant may specify that a first chiller of the subplant operate at 75% capacity, a second chiller of the subplant operate at 40% capacity, and a third chiller of the subplant operate at 60% capacity. In some embodiments, the equipment control signals are provided directly from low level optimizer 332 to energy plant 200 (as shown in FIG. 9). In other embodiments, the equipment control signals may be provided to energy plant 200 via BAS 308 or generated by BAS 308 based on the second set of recommended equipment setpoints.

Energy plant 200 may monitor the utilization of subplants 202-210 and generate a set of actual subplant utilization data. The actual subplant utilization data may include actual values (rather than recommended values) for each of the subplant loads produced by subplants 202-210. The actual subplant utilization data may also include actual equipment operating states (e.g., on/off states, load production, operating capacities, etc.) for individual devices of energy plant equipment 340. Energy plant 200 may report the actual subplant utilization data to subplant monitor 338. In some embodiments, energy plant 200 reports the actual subplant utilization data at regular intervals (e.g., once every fifteen minutes, once per hour, etc.) Subplant monitor 338 may store the actual subplant utilization data in subplant utilization database 502.

Dispatch GUI generator 506 may access the data stored in subplant utilization database 502 and use the stored data to generate a dispatch GUI. Dispatch GUI 902 may include various graphics (e.g., graphs, charts, flow diagrams, etc.) that illustrate the recommended subplant utilization data (e.g., recommended subplant loads and the first set of recommended equipment setpoints, etc.) manual subplant utilization data (e.g., manual subplant loads and the second set of recommended equipment setpoints), and actual subplant utilization data (e.g., actual subplant loads and actual equipment setpoints) in a graphical format. Dispatch GUI generator 506 may provide dispatch GUI 902 to EOS user interface 704 for presentation to a user 702. A user can view dispatch GUI 902 and provide the manual subplant loads via EOS user interface 704.

In some embodiments, EOS user interface 704 is a comprehensive monitoring and control interface that allows the user to monitor the operation of energy plant 200 and provide control inputs (e.g., manual subplant loads) that affect the operation of energy plant 200. In addition to displaying dispatch GUI 902 generated by dispatch GUI generator 506, EOS user interface 704 may be configured to receive input from the user via dispatch GUI 902. For example, dispatch GUI 902 presented via user interface 504 may include interface options that allow a user to change the load setpoints for subplants 202-210, change the on/off states or operating setpoints for equipment 340, activate or deactivate entire subplants or individual devices of equipment 340, adjust the configuration of BAS 308 or energy plant 200, or otherwise monitor and control the operation of energy plant 200 and/or equipment 340. EOS 302 may control energy plant 200 and/or equipment 340 (e.g., via actuators, power relays, etc.) in accordance with the user input received via EOS user interface 704.

In some embodiments, the user input received via EOS user interface 704 overrides automated control decisions made by EOS 302. For example, the manual subplant loads provided via EOS user interface 704 may override the recommended subplant loads determined by high level optimizer 330. In some embodiments, EOS 302 determines whether the manual subplant loads would cause EOS 302 to violate an optimization constraint (e.g., building temperature out of range, thermal energy storage tank fully depleted or filled to capacity, etc.). If the manual subplant loads would not cause EOS 302 to violate an optimization constraint, EOS 302 may override the recommended subplant loads determined by high level optimizer 330 with the manual subplant loads. However, if the manual subplant loads would cause EOS 302 to violate an optimization constraint, EOS 302 may not override the recommended subplant loads determined by high level optimizer 330. In some embodiments, EOS 302 causes dispatch GUI 902 to display a warning for the user if the manual subplant loads would cause EOS 302 to violate an optimization constraint within a predetermined time window. The user can then choose to override the recommended subplant loads and violate the optimization constraint or use the recommended subplant loads and satisfy the optimization constraint.

In some embodiments, dispatch GUI generator 506 updates dispatch GUI 902 based on the manual subplant loads before the manual subplant loads are used to affect the operation of energy plant 200. For example, dispatch GUI generator 506 may display the second set of recommended equipment setpoints that would result from the manual subplant loads before the manual subplant loads are used to generate the equipment control signals. In some embodiments, EOS 302 uses the manual subplant loads to calculate an amount of time before the manual subplant loads would cause EOS 302 to violate an optimization constraint (e.g., time until thermal energy storage tanks are filled or depleted). Advantageously, this allows the user to view the predicted effects of the manual subplant loads before the manual subplant loads take effect.

Figure 10:
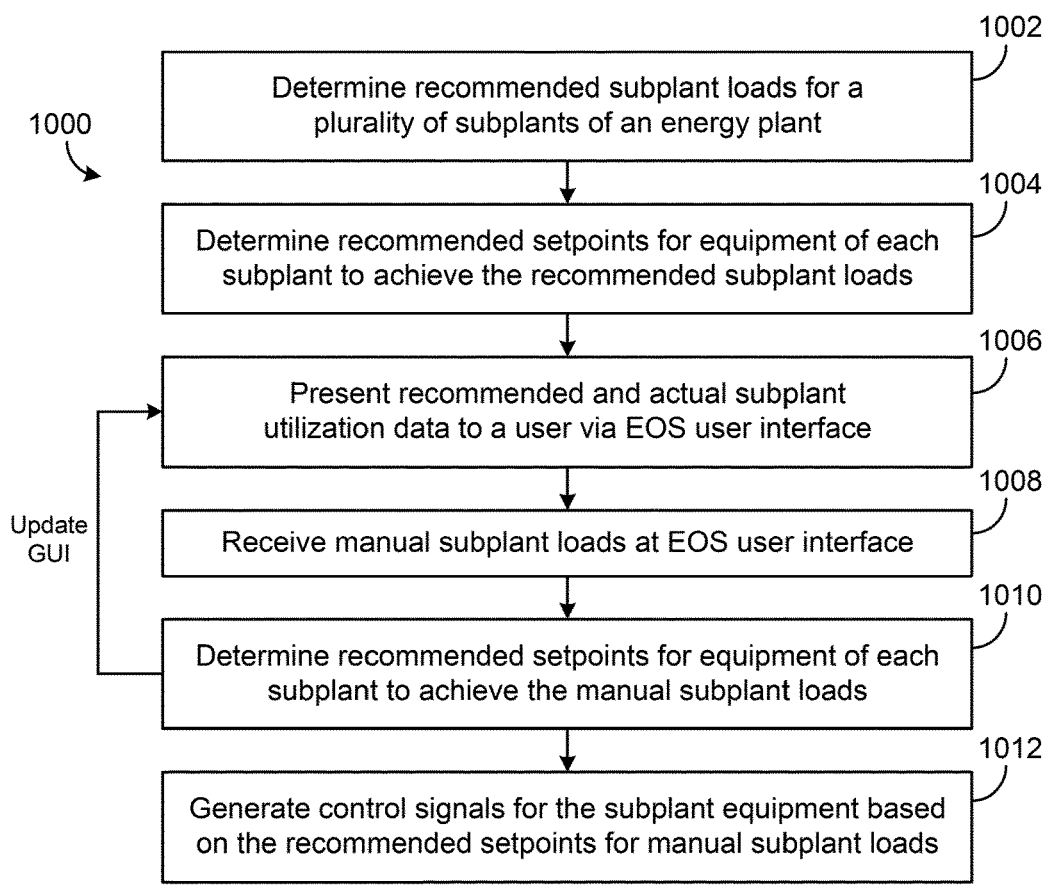
FIG. 10 is a flow diagram illustrating the operation of the EOS of FIG. 3 in the manual operating mode, according to an exemplary embodiment.

Referring now to FIG. 10, a flow diagram illustrating a process 1000 for monitoring and controlling an energy plant in the manual operating mode is shown, according to an exemplary embodiment. Process 1000 may be performed by one or more components of energy plant system 300 and/or system 900 as previously described. For example, process 1000 may be performed by EOS 302, BAS 308, dispatch GUI generator 506, and/or other devices of energy plant system 300 or system 900.

Process 1000 is shown to include determining recommended subplant loads for a plurality of subplants of an energy plant (step 1002). Step 1002 may be performed by high level optimizer 330. Step 802 may include determining the recommended subplant loads for a plurality of time steps between the current time and a future time horizon. Each of the time steps may have a defined or predetermined duration (e.g., fifteen minutes, one hour, etc.). The recommended subplant loads may be updated with each iteration of the high level optimization process. High level optimizer 330 may provide the recommended subplant loads to low level optimizer 332 and to subplant monitor 338. Subplant monitor 338 may store the recommended subplant loads as planned subplant utilization data in a subplant utilization database 502.

Process 1000 is shown to include determining recommended setpoints for equipment of each subplant to achieve the recommended subplant loads (step 1004). Step 1004 may be performed by low level optimizer 332. The recommended equipment setpoints may include on/off states, operating setpoints, and/or other setpoints defining the utilization of individual devices of the subplants 202-210. The recommended equipment setpoints may include setpoints for individual devices of subplants 202-210 in order for each subplant to meet the recommended subplant load. Low level optimizer 332 may provide the recommended equipment setpoints to energy plant 200 and to subplant monitor 338. Subplant monitor 338 may store the recommended equipment setpoints as planned subplant utilization data in subplant utilization database 502.

Process 1000 is shown to include presenting recommended and actual subplant utilization data to a user via an EOS user interface (e.g., EOS user interface 704) (step 1006). Step 1006 may be performed by dispatch GUI generator 506 and/or EOS user interface 704. The recommended subplant utilization data may include the recommended subplant loads generated by high level optimizer 330 and/or the first set of recommended equipment setpoints generated by low level optimizer 332. The actual subplant utilization data may include data describing the actual operation of energy plant 200 (e.g., actual subplant loads, actual equipment setpoints, etc.), which may be collected by subplant monitor 338 and stored in subplant utilization database 502.

In some embodiments, step 1006 includes accessing the data stored in subplant utilization database 502 and using the stored data to generate a dispatch GUI. Dispatch GUI 902 may include various graphics (e.g., graphs, charts, flow diagrams, etc.) that illustrate the actual subplant utilization data and the recommended subplant utilization data in a graphical format. Dispatch GUI generator 506 may provide dispatch GUI 902 to EOS user interface 704 for presentation to a user 702.

Process 1000 is shown to include receiving manual subplant loads at the EOS user interface (step 1008) and determining recommended setpoints for equipment of each subplant to achieve the manual subplant loads (step 1010). The manual subplant loads may be user-specified subplant loads and may override the recommended subplant loads determined by high level optimizer 330. Step 1010 may be the same or similar to step 1004, with the exception that the manual subplant loads are used instead of the recommended subplant loads to determine the recommended setpoints for the subplant equipment. In some embodiments, dispatch GUI 902 is updated to include the manual subplant loads and the set of recommended setpoints that result from the manual load setpoints.

Process 1000 is shown to include generating control signals for the subplant equipment based on the recommended setpoints to achieve the manual subplant loads (step 1012). The equipment control signals may include on/off signals, load production signals, power consumption signals, or other types of control signals which may be used to control individual devices of subplant equipment 340. The equipment control signals may cause each of subplants 202-210 to operate the individual devices of the subplant in a manner that achieves the manual subplant load for the subplant. In some embodiments, the equipment control signals are provided directly from low level optimizer 332 to energy plant 200. In other embodiments, the equipment control signals may be provided to energy plant 200 via BAS 308 or generated by BAS 308 based on the recommended equipment setpoints determined in step 1010.

Dispatch GUIs

Referring now to FIGS. 11-37 several drawings of a dispatch GUI 902 which may be generated by dispatch GUI generator 506 are shown, according to an exemplary embodiment. Dispatch GUI 902 may present the recommended (i.e., optimal) subplant loads, manual subplant loads, and actual subplant loads in a variety of visual formats (e.g., diagrams, charts, graphs, etc.) that illustrate the operation of energy plant 200. Dispatch GUI 902 may also present the first set of recommended equipment setpoints (i.e., the setpoints that result from the recommended subplant loads), the second set of recommended equipment setpoints (i.e., the setpoints that result from the manual subplant loads), and the actual equipment setpoints to provide details regarding the operation of each subplant. Dispatch GUI 902 may include past dispatch data (e.g., past subplant loads, past equipment setpoints) and current dispatch data (e.g., current subplant loads, current equipment setpoints) to allow a user to view a history of energy plant operations. Dispatch GUI 902 may also include future dispatch data (e.g., planned subplant loads, planned equipment setpoints) to allow the user to view planned energy plant operations into the future.

Plant and Subplant Summary Interfaces

Figure 11:
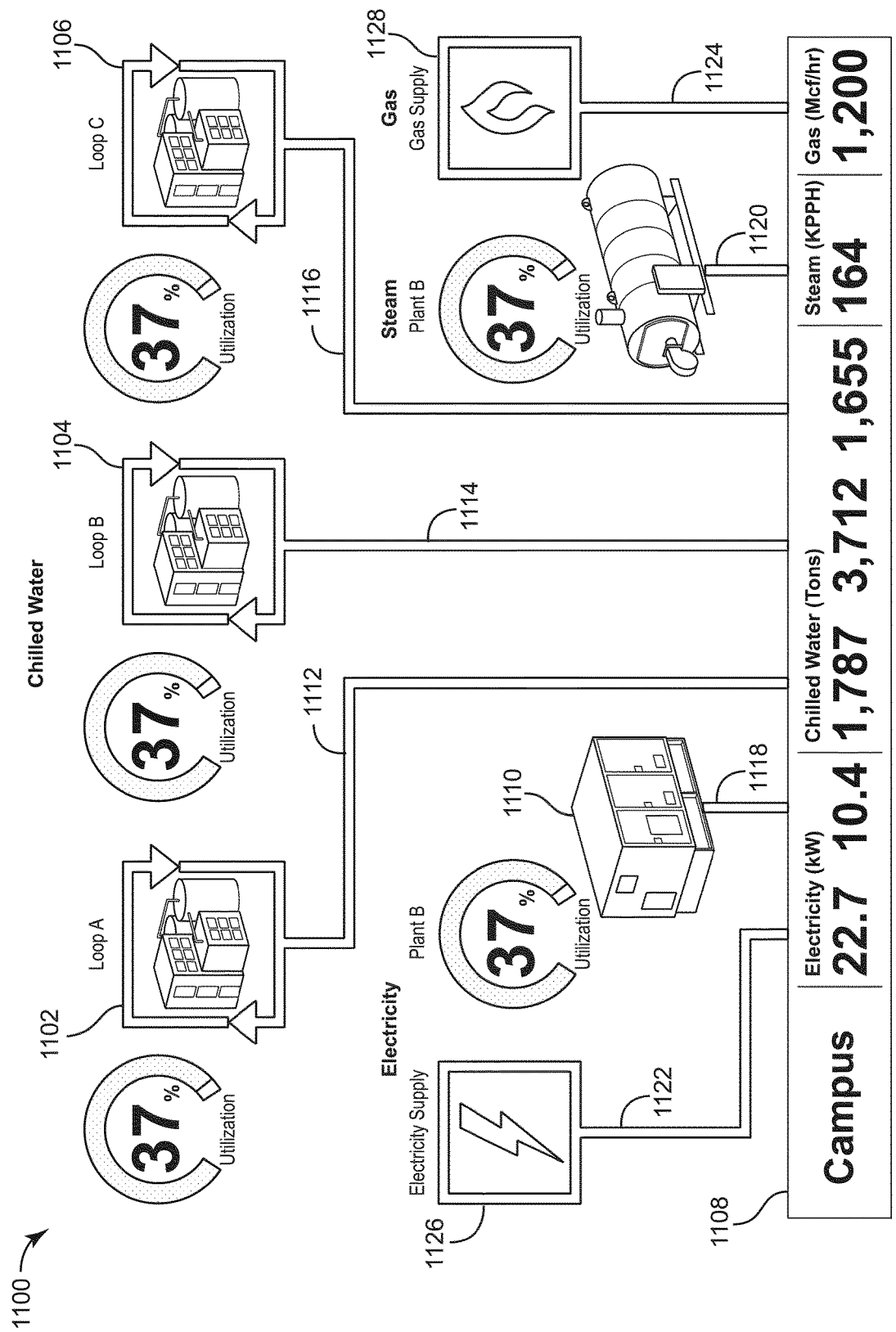
FIG. 11 is a drawing of a site summary interface which may be generated by the EOS of FIG. 3, according to an exemplary embodiment.

Referring particularly to FIG. 11, a plant summary interface 1100 is shown, according to an exemplary embodiment. Plant summary interface 1100 may include graphics depicting each of the subplants within energy plant 200. For example, plant summary interface 1100 is shown to include a plurality of chilled water loops 1102-1106 (i.e., Loop A 1102, Loop B 1104, and Loop C 1106). Chilled water loops 1102-1106 are configured to provide cold thermal energy (e.g., measured in tons) to satisfy the cooling load of campus 1108. Similarly, the steam subplant 1111 within plant B is configured to provide steam (measured in KPPH) to satisfy the heating load of campus 1108. The cogeneration subplant 1110 within plant B can be configured to provide electricity (measured in MW) to satisfy the electric load of campus 1108.

Plant summary interface 1100 is shown to include paths 1112-1120 connecting each of the chilled water loops 1102-1106 and subplants 1110-1111 to campus 1108. If a subplant or chilled water loop is currently providing energy to campus 1108, the path connecting the subplant or chilled water loop to campus 1108 may be highlighted or otherwise marked to indicate the flow of energy along the path. For example, path 1120 may be colored red to indicate the flow of steam along path 1120, whereas paths 1112-1116 may be colored blue to indicate the flow of cold thermal energy along paths 1112-1116, path 1118 may be colored orange to indicate the flow of electricity along path 1118, or a path may be colored green to indicate the flow of gas along the path. In some embodiments, paths 1112-1120 are animated to indicate the flow of thermal energy. For example, the arrows along each of paths 1112-1120 may move along each path 1112-1120 to indicate the flow of thermal energy. Similarly, plant summary interface 1100 is shown to include paths 1122-1124 connecting electricity supply 1126 and gas supply 1128 to campus 1108. Like paths 1112-1120 connecting the subplants to campus 1108, paths 1122-1124 may be highlighted or otherwise marked to indicate the flow of electricity or gas energy along each path. The values below each of paths 1112-1124 within campus 1108 indicate the amount of each resource (i.e., electricity, chilled water, steam, and gas) being provided to campus 1108 by the corresponding subplant or supply.

Percentage indicators next to subplants 1110-1111 and chilled water loops 1102-1106 indicate the percentage of utilization for each subplant 1110-1111 or chilled water loop 1102-1106 (i.e., the percentage of the total subplant or chilled water loop capacity being utilized). For example, FIG. 11 is shown to include a 37% indicator next to Loop A 1102, a 37% indicator next to Loop B 1104, a 37% indicator next to the Loop C 1106, a 37% indicator next to the plant B cogeneration subplant 1110, and a 37% indicator next to the plant B steam subplant 1111. This indicates that each subplant and chilled water loop is being utilized at 37% of its maximum capacity. The utilization rings associated with each subplant and chilled water loop may be filled to visually indicate the utilization percentage.

Figure 12:
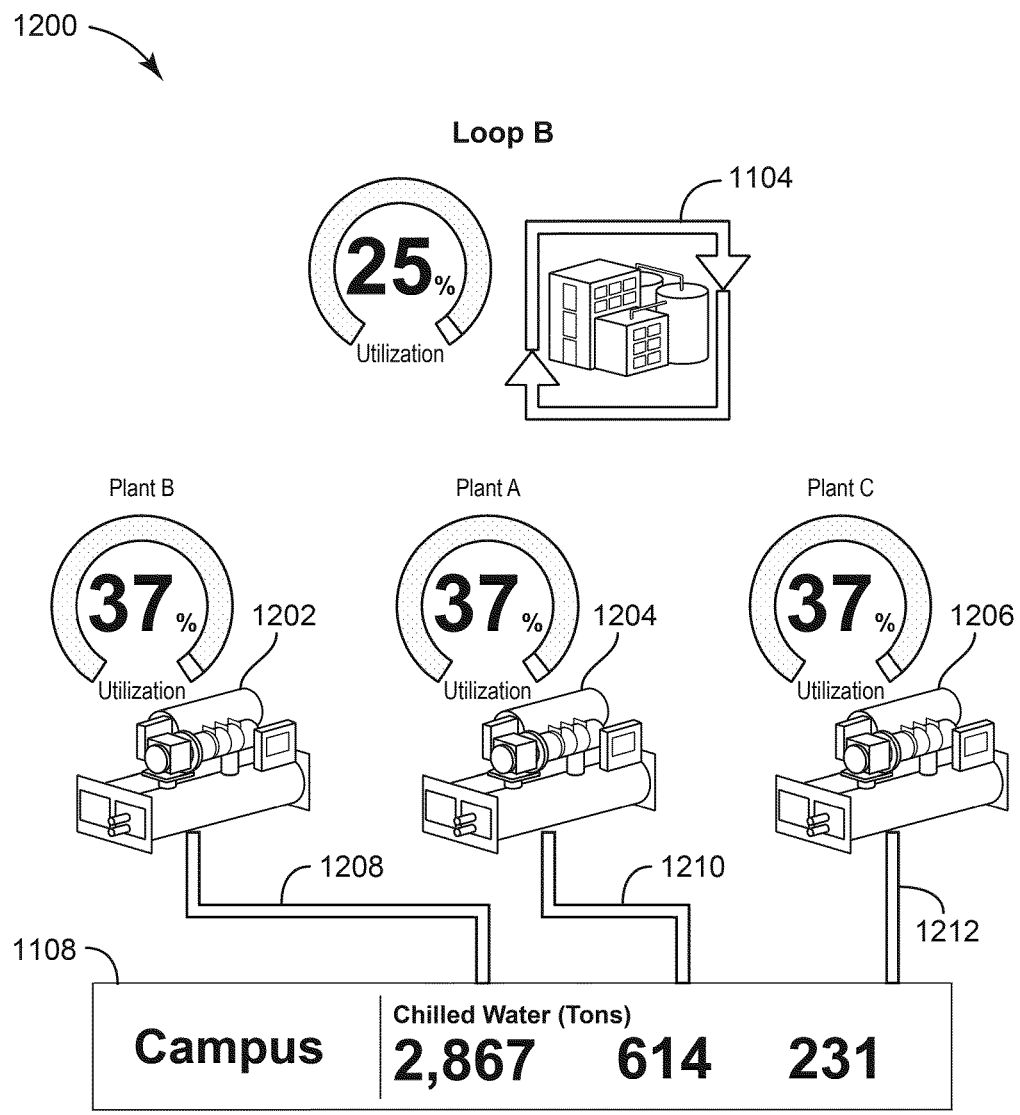
FIG. 12 is a drawing of a chilled water loop summary interface which may be generated by the EOS of FIG. 3, according to an exemplary embodiment.

Referring now to FIG. 12, a chilled water loop summary interface 1200 for Loop B 1104 is shown, according to an exemplary embodiment. Interface 1200 illustrates the percent utilization of each chilled water subplant within Loop B (e.g., chilled water subplant 1202, chilled water subplant 1204, and chilled water subplant 1206) as well as the utilized capacity for the entire Loop B 1104. The values below each of the paths 1208, 1210, and 1212 connecting chilled water subplants 1202-1206 to campus 1108 indicate the chilled water production of each chilled water subplant 1202-1206.

Figure 13:
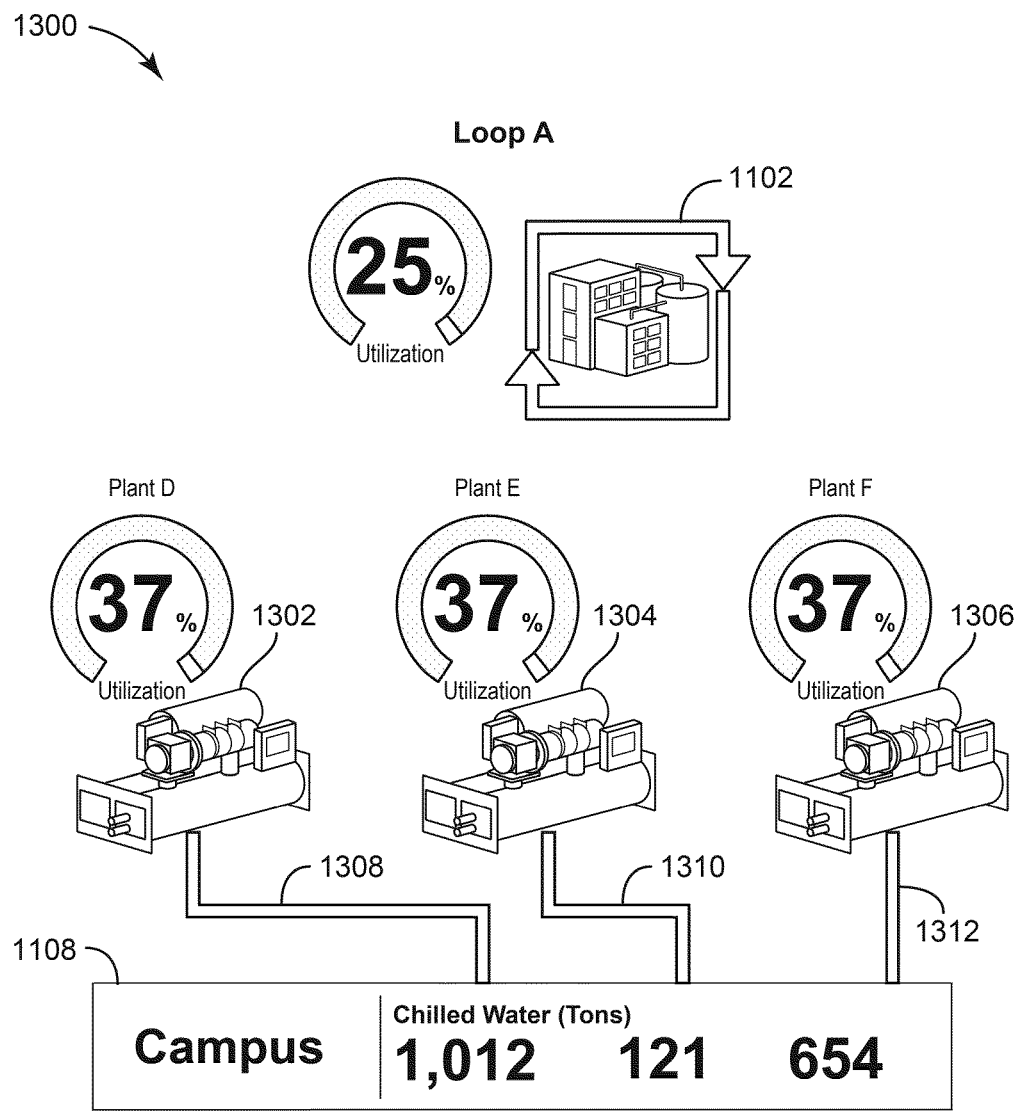
FIG. 13 is a drawing of another chilled water loop summary interface which may be generated by the EOS of FIG. 3, according to an exemplary embodiment.

Referring now to FIG. 13, a chilled water loop summary interface 1300 for Loop A 1102 is shown, according to an exemplary embodiment. Interface 1300 illustrates the percent utilization of each chilled water subplant within Loop A (e.g., chilled water subplant 1302, chilled water subplant 1304, and chilled water subplant 1306) as well as the utilized capacity for the entire Loop A 1102. The values below each of the paths 1308, 1310, and 1312 connecting chilled water subplants 1302-1306 to campus 1108 indicate the chilled water production of each chilled water subplant 1302-1306.

Figure 14:
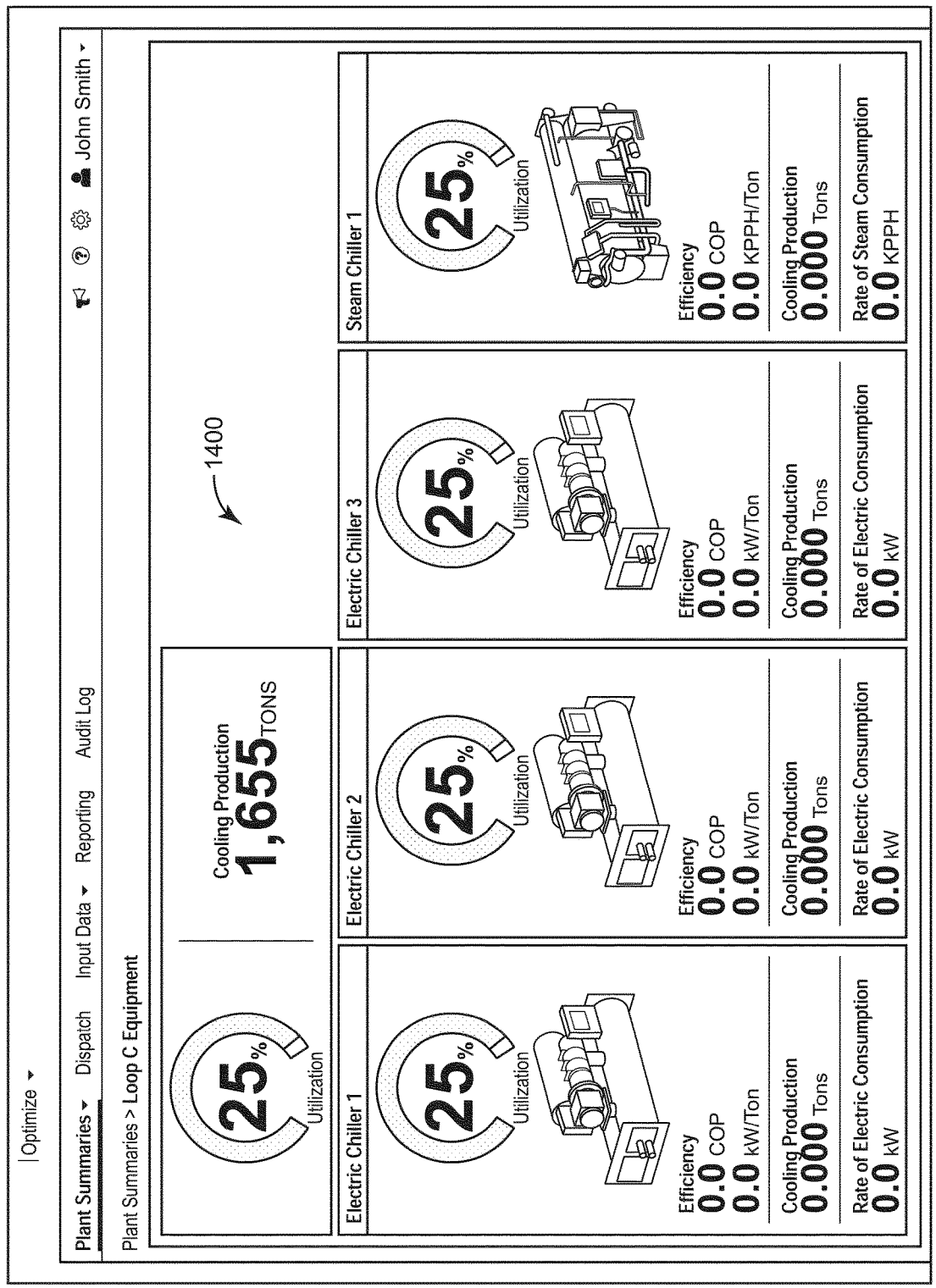
FIG. 14 is a drawing of an equipment summary interface which may be generated by the EOS of FIG. 3, according to an exemplary embodiment.

Referring now to FIG. 14, a plant summary interface 1400 for Loop C 1106 is shown, according to an exemplary embodiment. Interface 1400 illustrates the equipment within Loop C 1106 and provides key performance indicators (KPIs) for each of the equipment. For example, interface 1400 is shown to include a plurality of electric chillers (i.e., electric chiller 1, electric chiller 2, electric chiller 3, and steam chiller 1). The KPIs may include efficiency (e.g., COP, kW/ton, etc.), cooling production (tons), and rate of electric consumption (kW). Interface 1400 may display the percent utilization and cooling production of each device within Loop C 1106 as well as the overall percent utilization and cooling production of Loop C 1106. In some embodiments, the equipment images will appear dimmed if the equipment is out of service.

Figure 15:
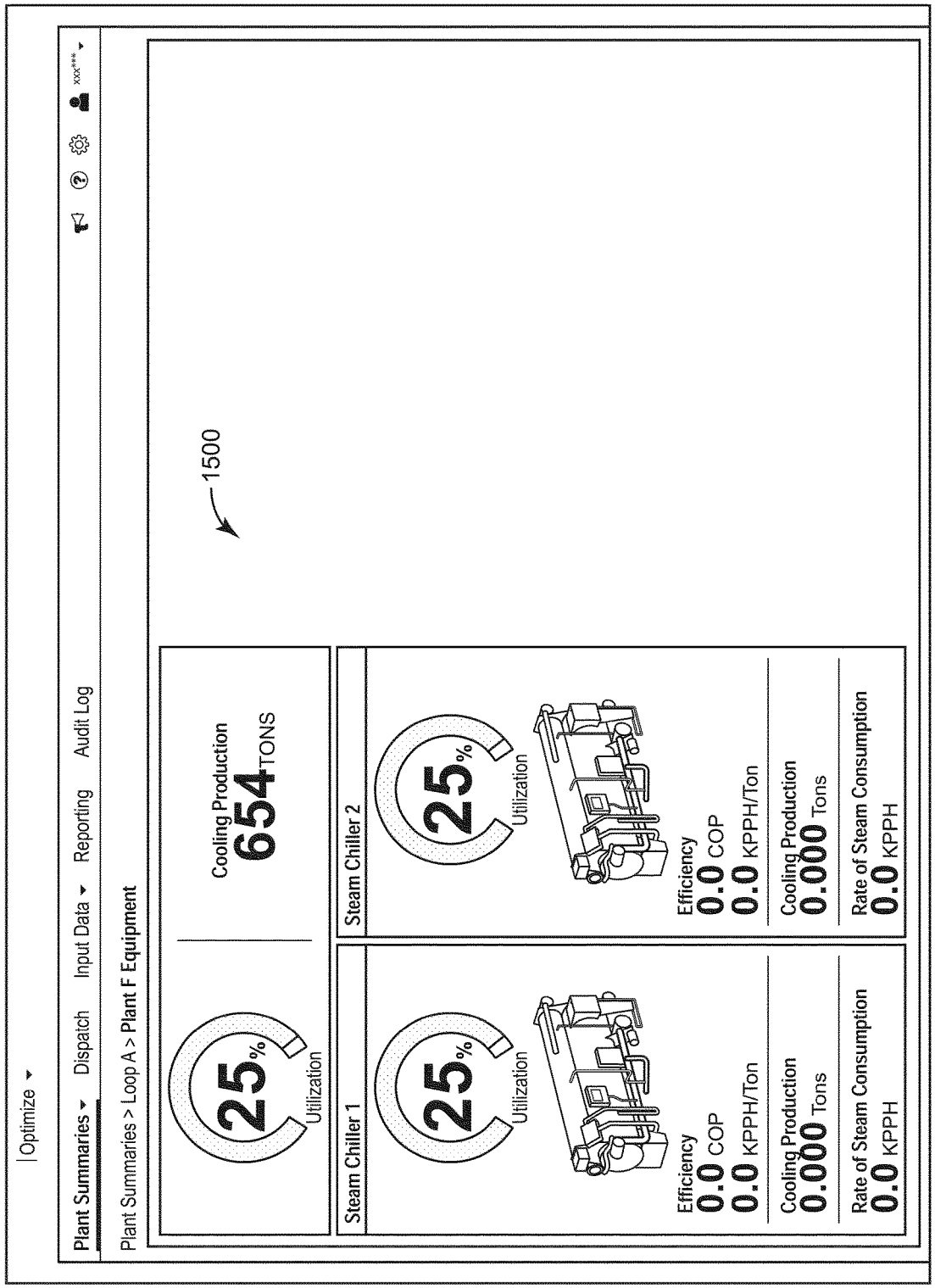
FIG. 15 is a drawing of another equipment summary interface which may be generated by the EOS of FIG. 3, according to an exemplary embodiment.

Referring now to FIG. 15, an equipment information page 1500 for the equipment of Plant F within Loop A 1102 is shown, according to an exemplary embodiment. Interface 1500 illustrates the equipment within Plant F and provides KPIs for each of the equipment. For example, interface 1500 is shown to include a plurality of steam chillers (i.e., steam chiller 1 and steam chiller 2). The KPIs may include efficiency (e.g., COP, KPPH/ton, etc.), cooling production (tons), and rate of steam consumption (KPPH). Interface 1500 may display the percent utilization and cooling production of each device within Plant F as well as the overall percent utilization and cooling production of Plant F. In some embodiments, the equipment images will appear dimmed if the equipment is out of service.

Figure 16:
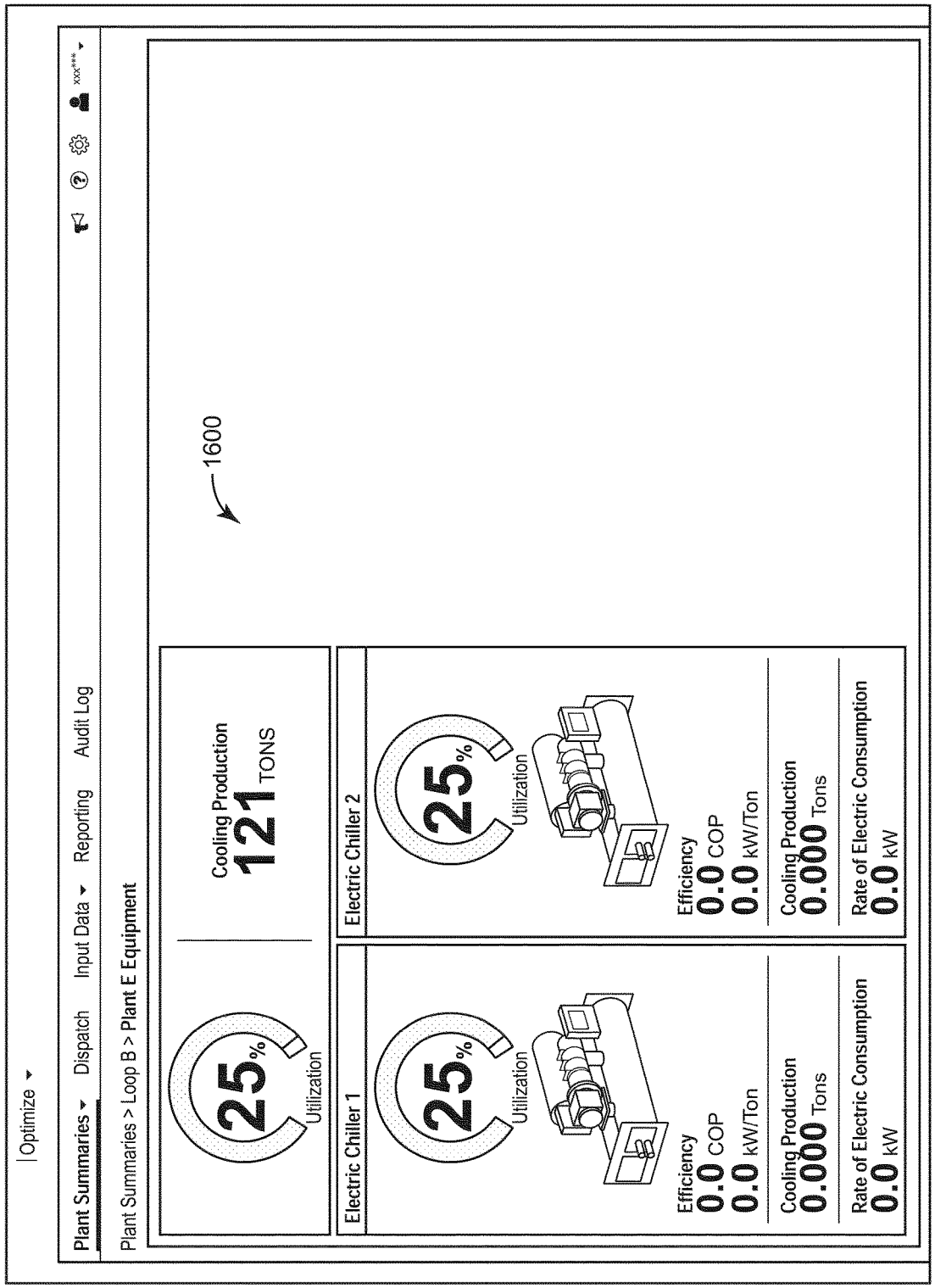
FIG. 16 is a drawing of another equipment summary interface which may be generated by the EOS of FIG. 3, according to an exemplary embodiment.

Referring now to FIG. 16, an equipment information page 1600 for the equipment of Plant E within Loop B 1104 is shown, according to an exemplary embodiment. Interface 1600 illustrates the equipment within Plant E and provides KPIs for each of the equipment. For example, interface 1600 is shown to include a plurality of electric chillers (i.e., electric chiller 1 and electric chiller 2). The KPIs may include efficiency (e.g., COP, kW/ton, etc.), cooling production (tons), and rate of electric consumption (kW). Interface may display the percent utilization and cooling production of each device within Plant E as well as the overall percent utilization and cooling production of Plant E. In some embodiments, the equipment images will appear dimmed if the equipment is out of service.

Figure 17:
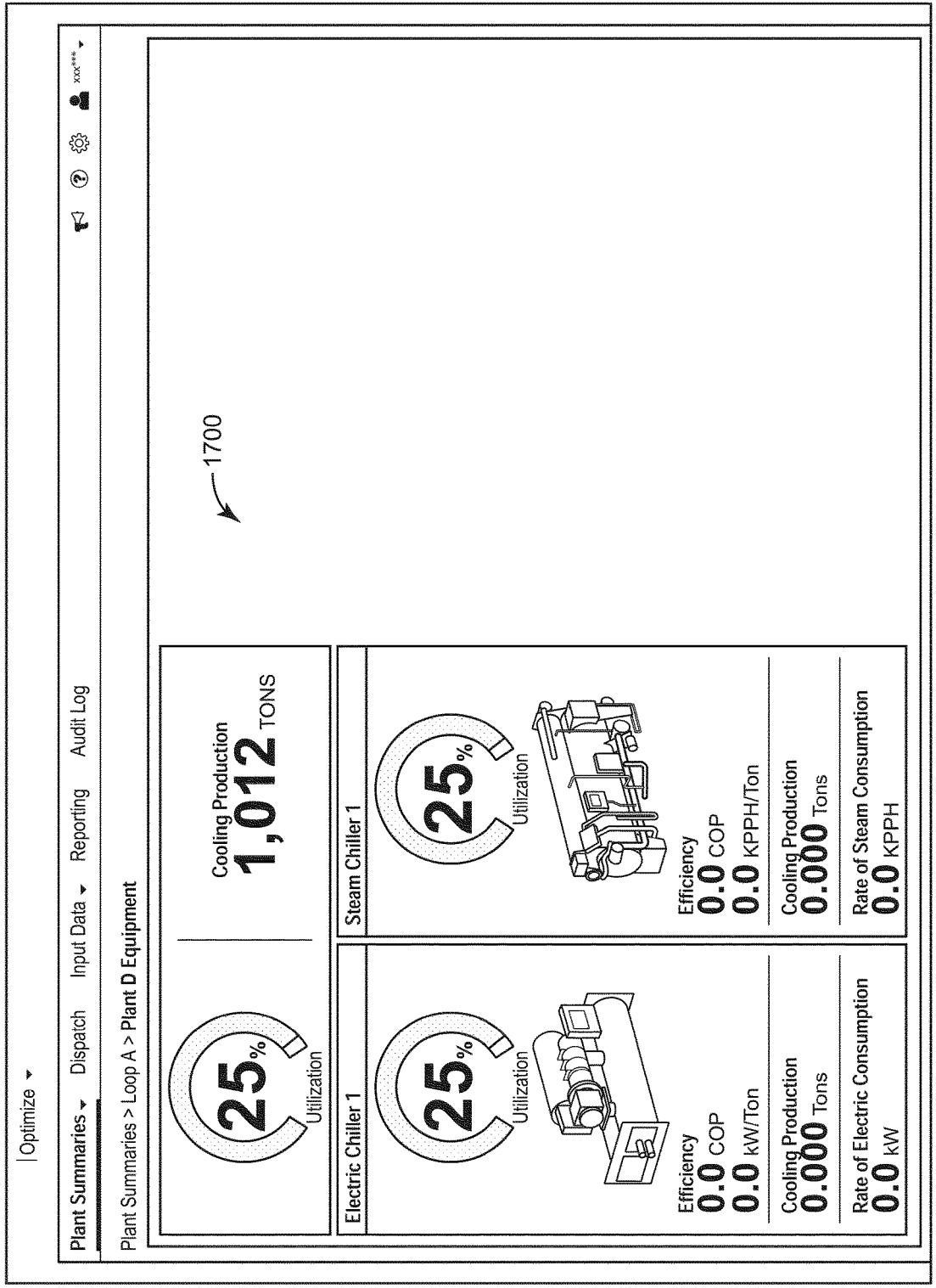
FIG. 17 is a drawing of another equipment summary interface which may be generated by the EOS of FIG. 3, according to an exemplary embodiment.

Referring now to FIG. 17, an equipment information page 1700 for the equipment of Plant D within Loop A 1102 is shown, according to an exemplary embodiment. Interface 1700 illustrates the equipment within Plant D and provides KPIs for each of the equipment. For example, interface 1700 is shown to include a plurality of chillers (i.e., electric chiller 1 and steam chiller 1). The KPIs may include efficiency (e.g., COP, kW/ton, KPPH/ton, etc.), cooling production (tons), rate of electric consumption (kW), and rate of steam consumption (KPPH). Interface 1700 may display the percent utilization and cooling production of each device within Plant D as well as the overall percent utilization and cooling production of Plant D. In some embodiments, the equipment images will appear dimmed if the equipment is out of service.

Figure 18:
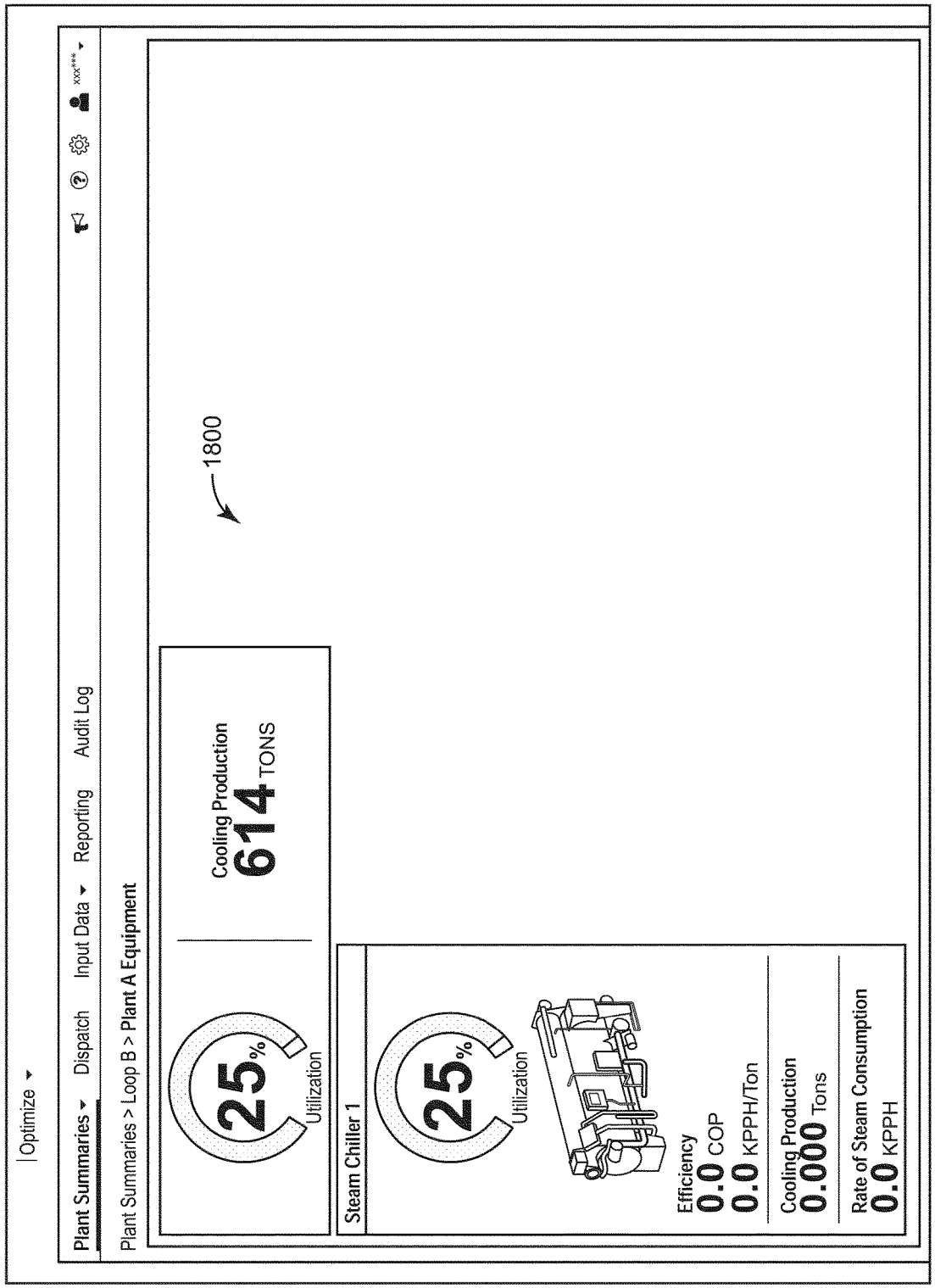
FIG. 18 is a drawing of another equipment summary interface which may be generated by the EOS of FIG. 3, according to an exemplary embodiment.

Referring now to FIG. 18, an equipment information page 1800 for the equipment of Plant A within Loop B 1104 is shown, according to an exemplary embodiment. Interface 1800 illustrates the equipment within Plant A and provides KPIs for each of the equipment. For example, interface 1800 is shown to include a steam chiller (i.e., steam chiller 1). The KPIs may include efficiency (e.g., COP, KPPH/ton, etc.), cooling production (tons), and rate of steam consumption (KPPH). Interface 1800 may display the percent utilization and cooling production of each device within Plant A as well as the overall percent utilization and cooling production of Plant A. In some embodiments, the equipment images will appear dimmed if the equipment is out of service.

Figure 19:
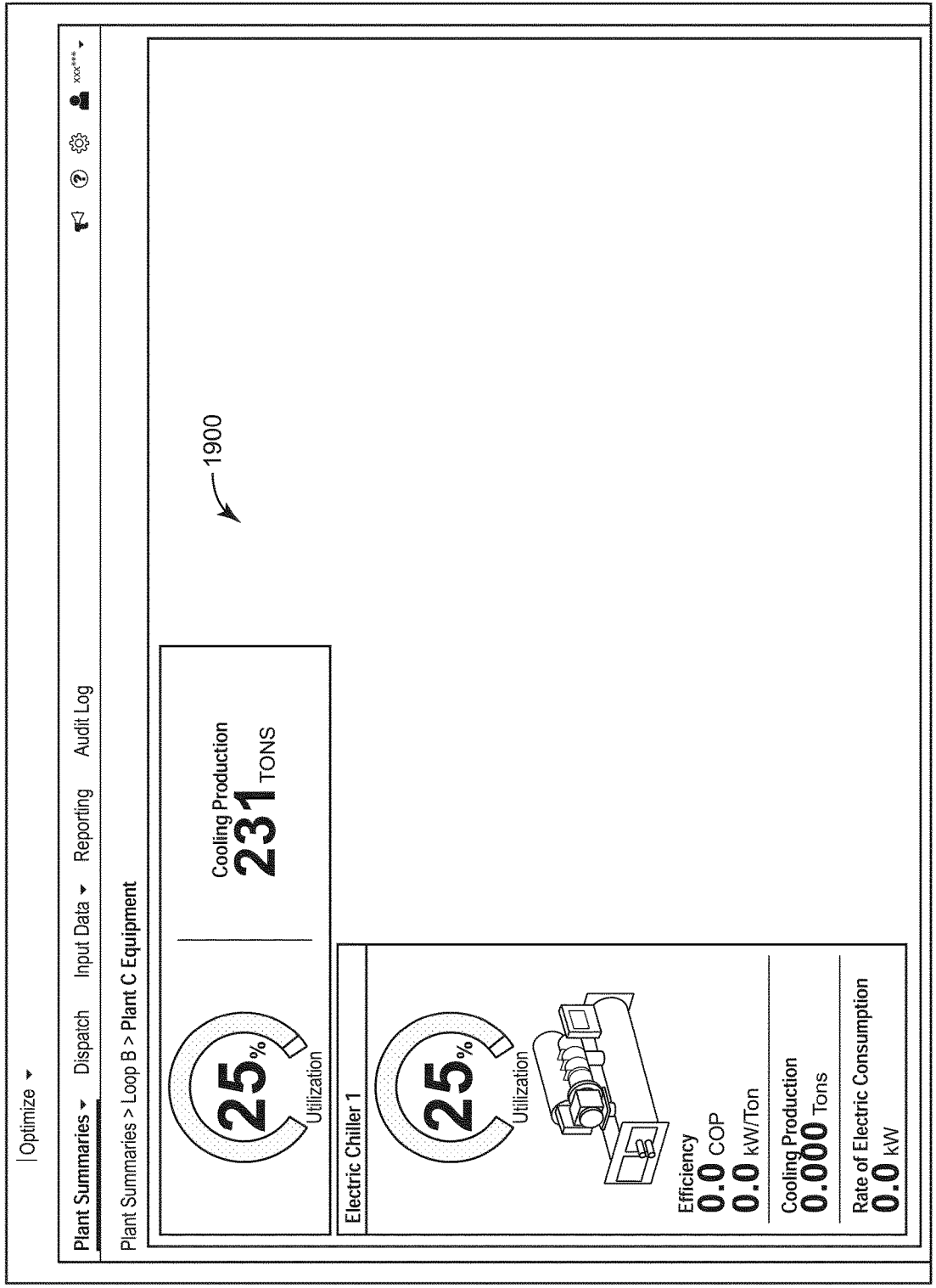
FIG. 19 is a drawing of another equipment summary interface which may be generated by the EOS of FIG. 3, according to an exemplary embodiment.

Referring now to FIG. 19, an equipment information page 1900 for the equipment of Plant C within Loop B 1104 is shown, according to an exemplary embodiment. Interface 1900 illustrates the equipment within Plant C and provides KPIs for each of the equipment. For example, interface 1900 is shown to include an electric chiller (i.e., electric chiller 1). The KPIs may include efficiency (e.g., COP, kW/ton, etc.), cooling production (tons), and rate of electric consumption (kW). Interface 1900 may display the percent utilization and cooling production of each device within Plant C as well as the overall percent utilization and cooling production of Plant C. In some embodiments, the equipment images will appear dimmed if the equipment is out of service.

Figure 20:
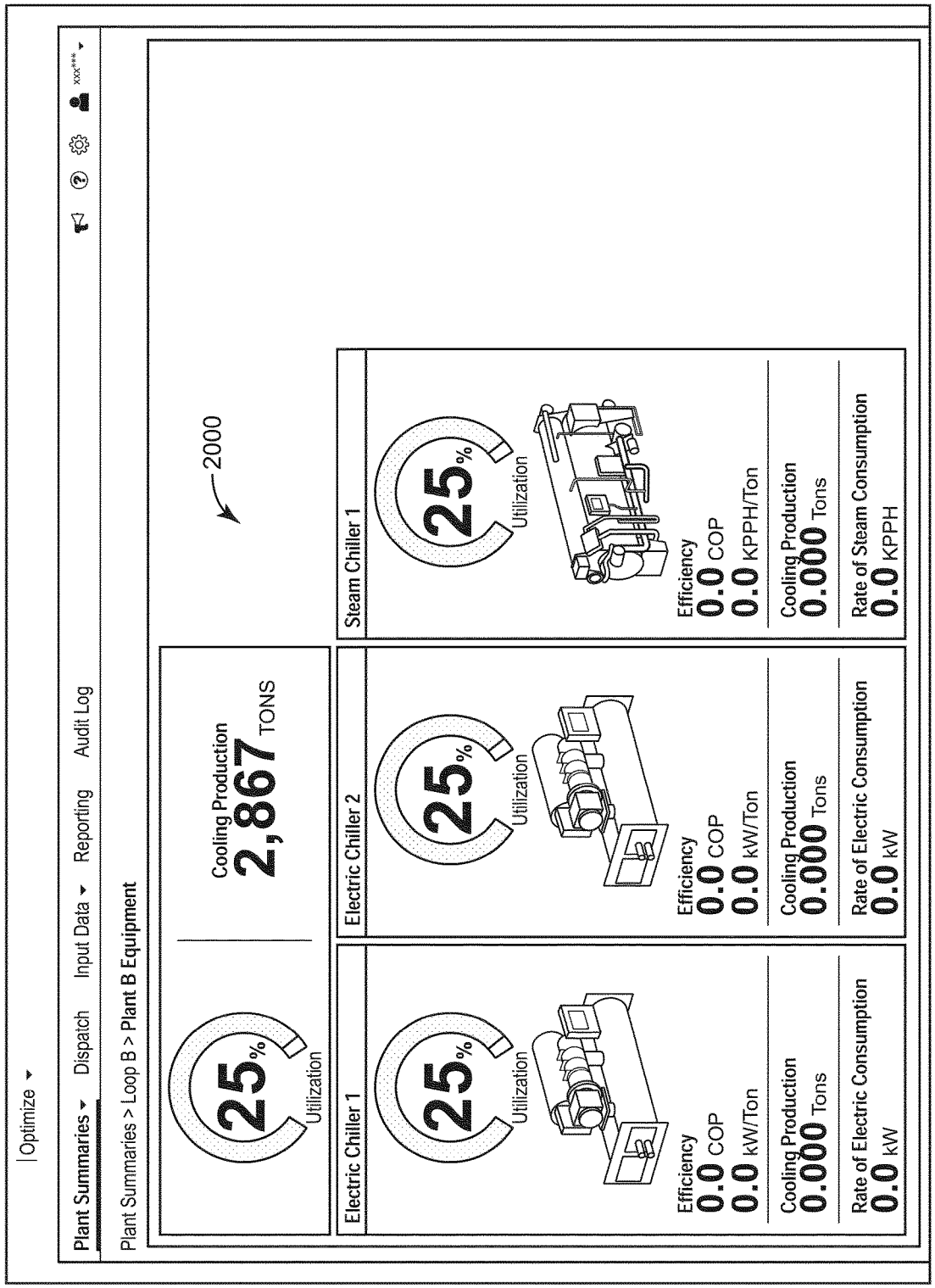
FIG. 20 is a drawing of another equipment summary interface which may be generated by the EOS of FIG. 3, according to an exemplary embodiment.

Referring now to FIG. 20, an equipment information page 2000 for the equipment of Plant B within Loop B 1104 is shown, according to an exemplary embodiment. Interface 2000 illustrates the equipment within Plant B and provides KPIs for each of the equipment. For example, interface 2000 is shown to include a plurality of chillers (i.e., electric chiller 1, electric chiller 2, and steam chiller 1). The KPIs may include efficiency (e.g., COP, kW/ton, KPPH/ton, etc.), cooling production (tons), rate of electric consumption (kW), and rate of steam consumption (KPPH). Interface 2000 may display the percent utilization and cooling production of each device within Plant B as well as the overall percent utilization and cooling production of Plant B. In some embodiments, the equipment images will appear dimmed if the equipment is out of service.

Figure 21:
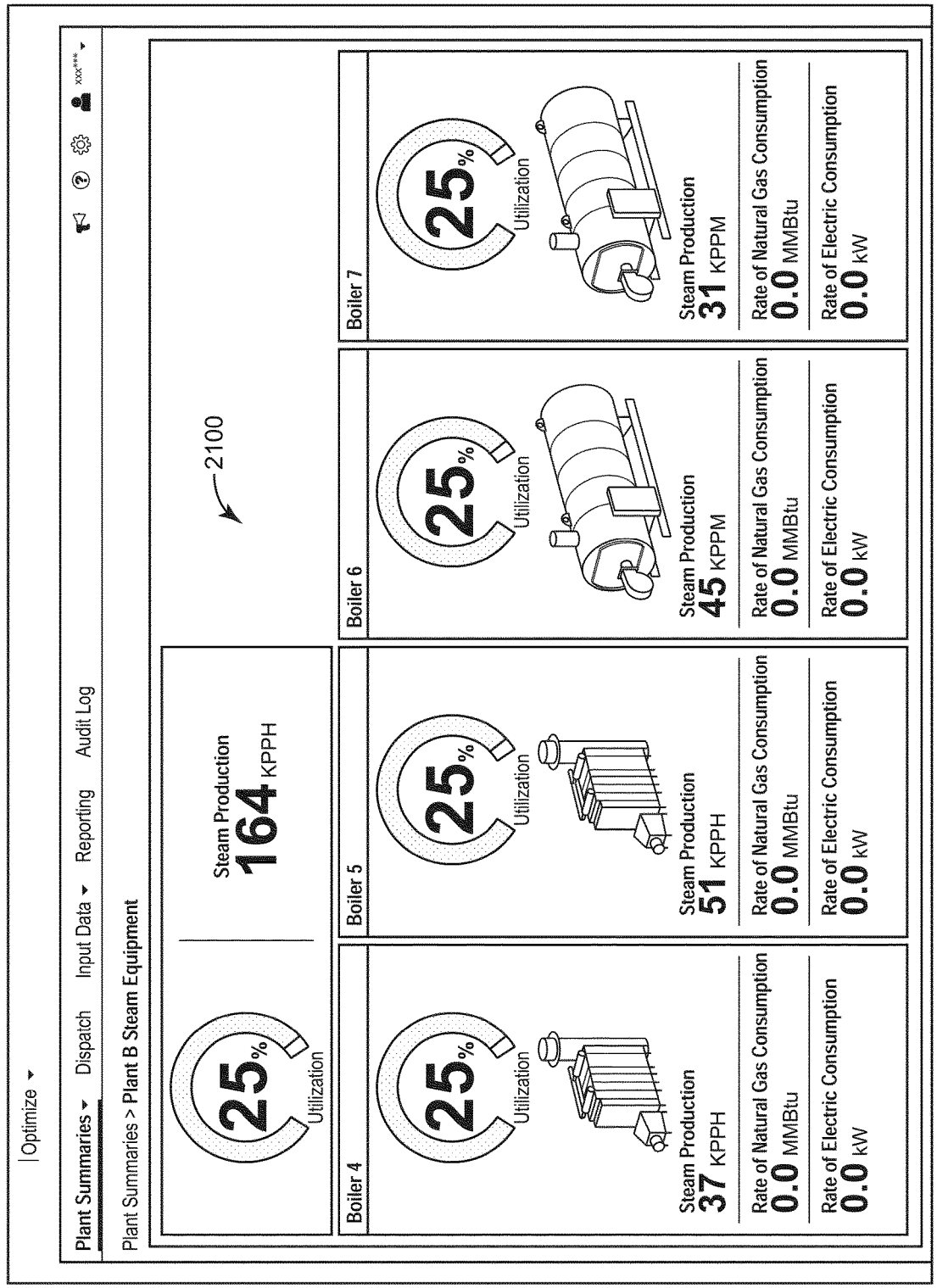
FIG. 21 is a drawing of another equipment summary interface which may be generated by the EOS of FIG. 3, according to an exemplary embodiment.

Referring now to FIG. 21, an equipment information page 2100 for the steam equipment of Plant B is shown, according to an exemplary embodiment. Interface 2100 illustrates the steam equipment within Plant B and provides KPIs for each of the equipment. For example, interface 2100 is shown to include a plurality of boilers (i.e., boiler 4, boiler 5, boiler 6, and boiler 7). The KPIs may include steam production (KPPH), rate of natural gas consumption (MMBtu), and rate of electric consumption (kW). Interface 2100 may display the percent utilization and steam production of each steam production device within Plant B as well as the overall percent utilization and steam production of Plant B. In some embodiments, the equipment images will appear dimmed if the equipment is out of service.

Figure 22A:
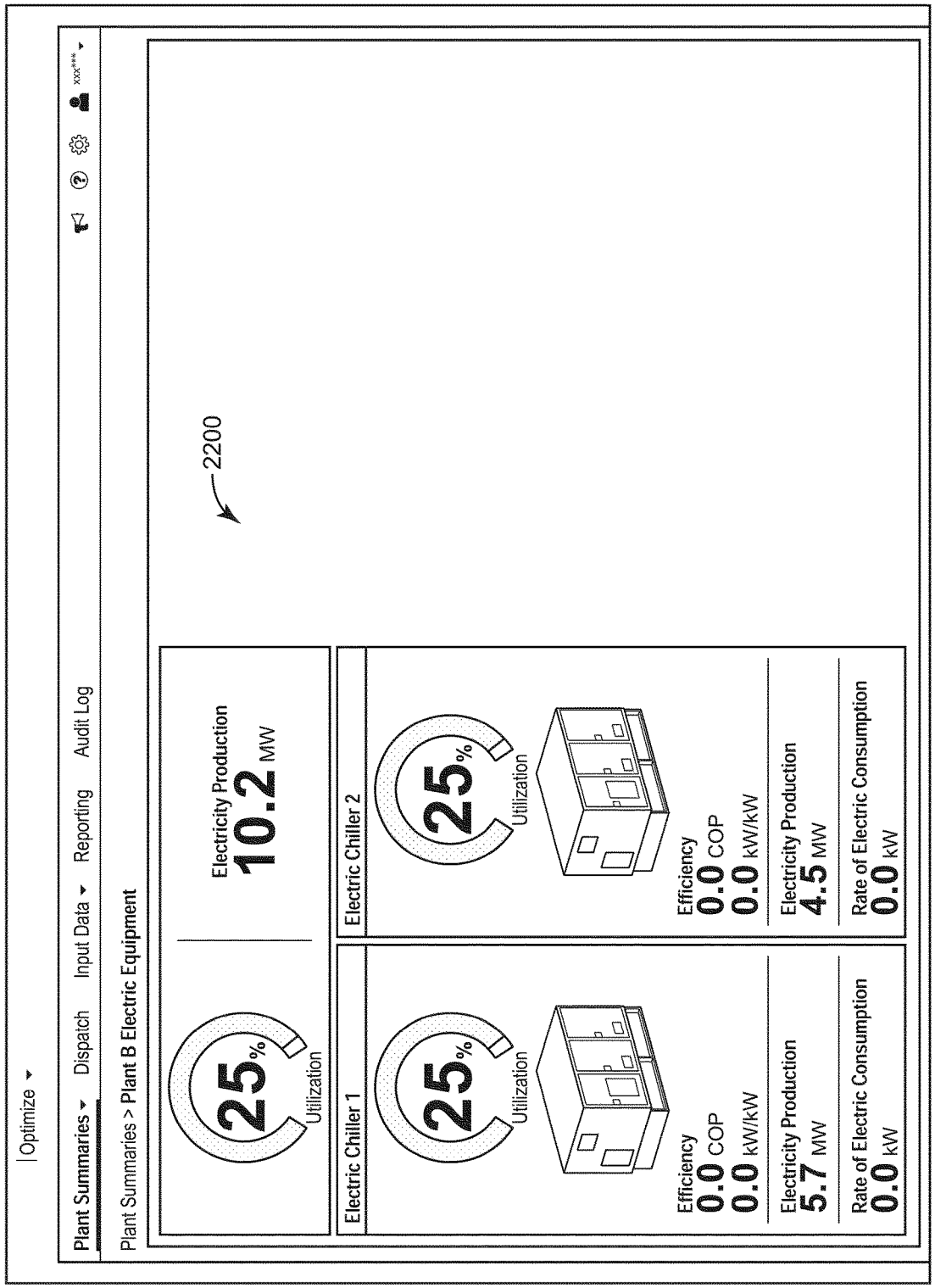
FIG. 22A is a drawing of another equipment summary interface which may be generated by the EOS of FIG. 3, according to an exemplary embodiment.

Referring now to FIG. 22A, an equipment information page 2200 for the electric equipment of Plant B is shown, according to an exemplary embodiment. Interface 2200 illustrates the electric equipment within Plant B and provides KPIs for each of the equipment. For example, interface 2200 is shown to include a plurality of combustion turbines (i.e., combustion turbine 1 and combustion turbine 2). The KPIs may include efficiency (e.g., COP, kW/kW), electric production (MW), and rate of electric consumption (kW). Interface 2200 may display the percent utilization and electricity production of each electricity production device within Plant B as well as the overall percent utilization and electricity production of Plant B. In some embodiments, the equipment images will appear dimmed if the equipment is out of service.

Figure 22B:
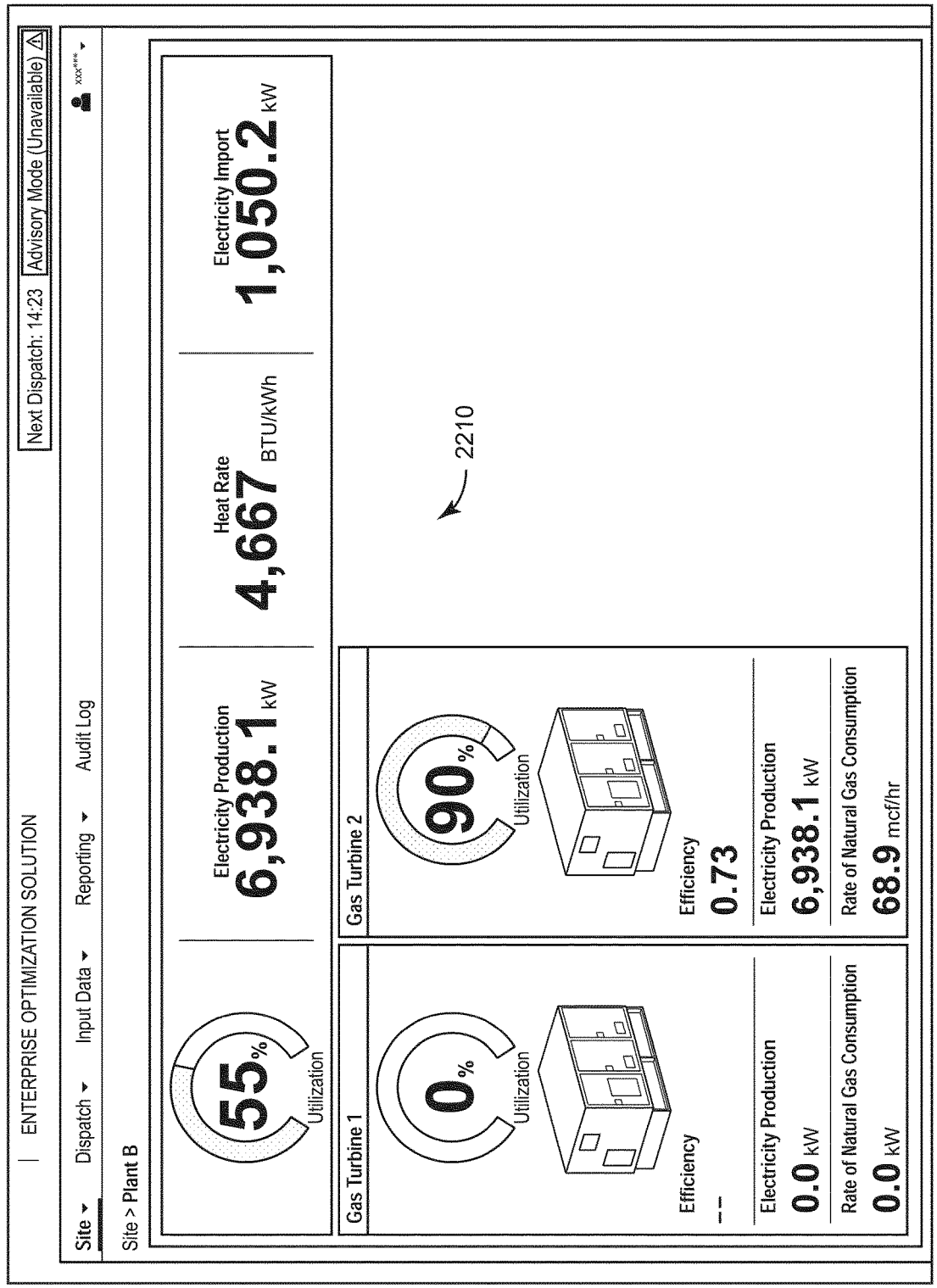
FIG. 22B is a drawing of another equipment summary interface which may be generated by the EOS of FIG. 3, according to an exemplary embodiment.

Referring now to FIG. 22B, another equipment information page 2210 for the electric equipment of Plant B is shown, according to an exemplary embodiment. Interface 2210 illustrates the electric equipment within Plant B and provides KPIs for each of the equipment. For example, interface 2210 is shown to include a plurality of gas turbines (i.e., gas turbine 1 and gas turbine 2). The KPIs may include efficiency (e.g., COP, kW/kW), electric production (MW), and rate of natural gas consumption (mcf/hr). Interface 2210 may display the percent utilization and electricity production of each electricity production device within Plant B as well as the overall percent utilization, electricity production, heat rate, and electricity import of Plant B. In some embodiments, the equipment images will appear dimmed if the equipment is out of service.

Figure 22C:
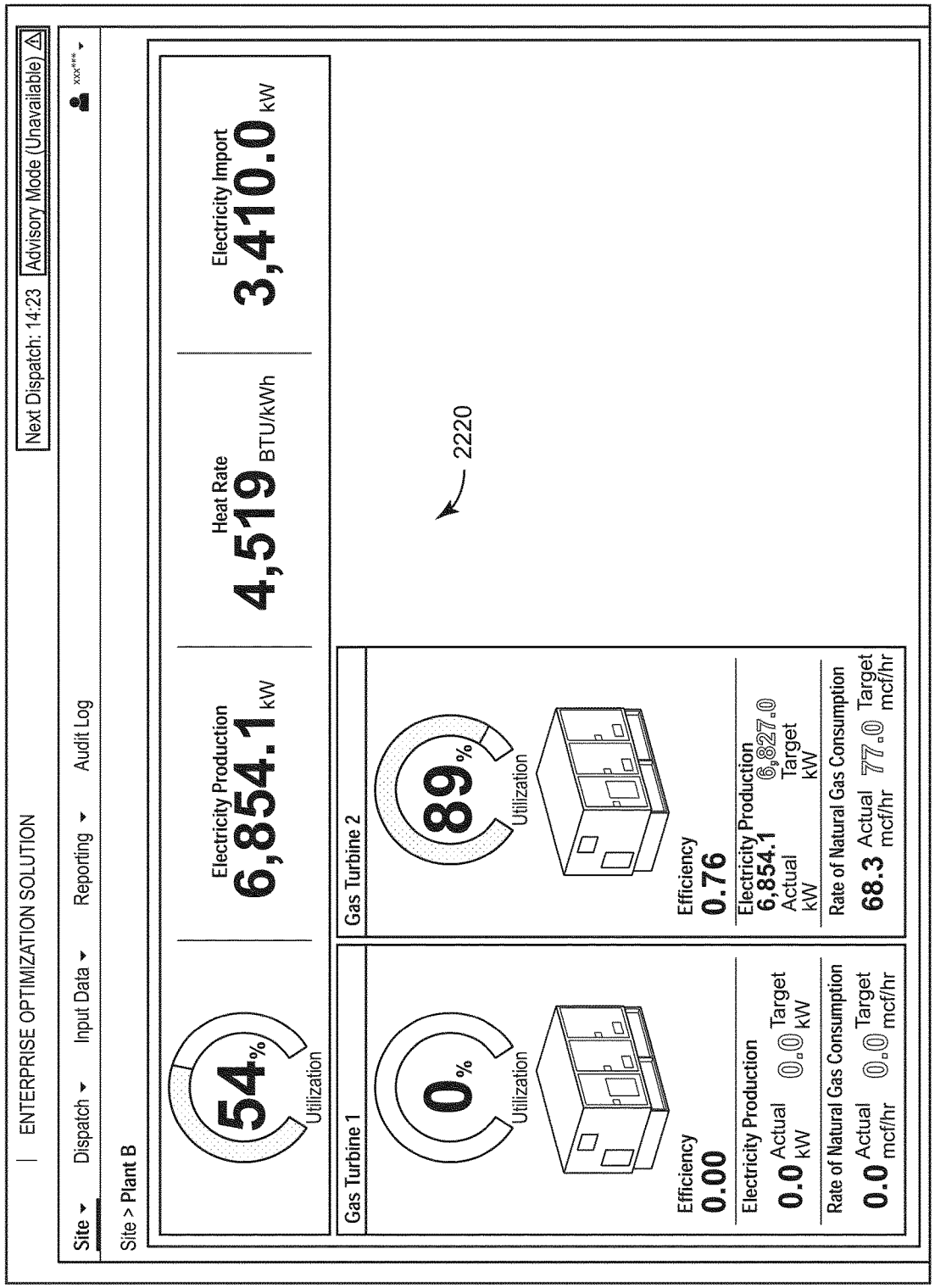
FIG. 22C is a drawing of another equipment summary interface which may be generated by the EOS of FIG. 3, according to an exemplary embodiment.

Referring now to FIG. 22C, another equipment information page 2220 for the electric equipment of Plant B is shown, according to an exemplary embodiment. Interface 2220 illustrates the electric equipment within Plant B and provides KPIs for each of the equipment. For example, interface 2220 is shown to include a plurality of gas turbines (i.e., gas turbine 1 and gas turbine 2). The KPIs may include efficiency (e.g., COP, kW/kW), electric production (MW), and rate of natural gas consumption (mcf/hr). Both the actual and target values of the electricity production and rate of natural gas consumption may be indicated when operating in the automatic mode. Interface 2220 may display the percent utilization and electricity production of each electricity production device within Plant B as well as the overall percent utilization, electricity production, heat rate, and electricity import of Plant B. In some embodiments, the equipment images will appear dimmed if the equipment is out of service.

Dispatch Schedule Interface

Figure 23A:
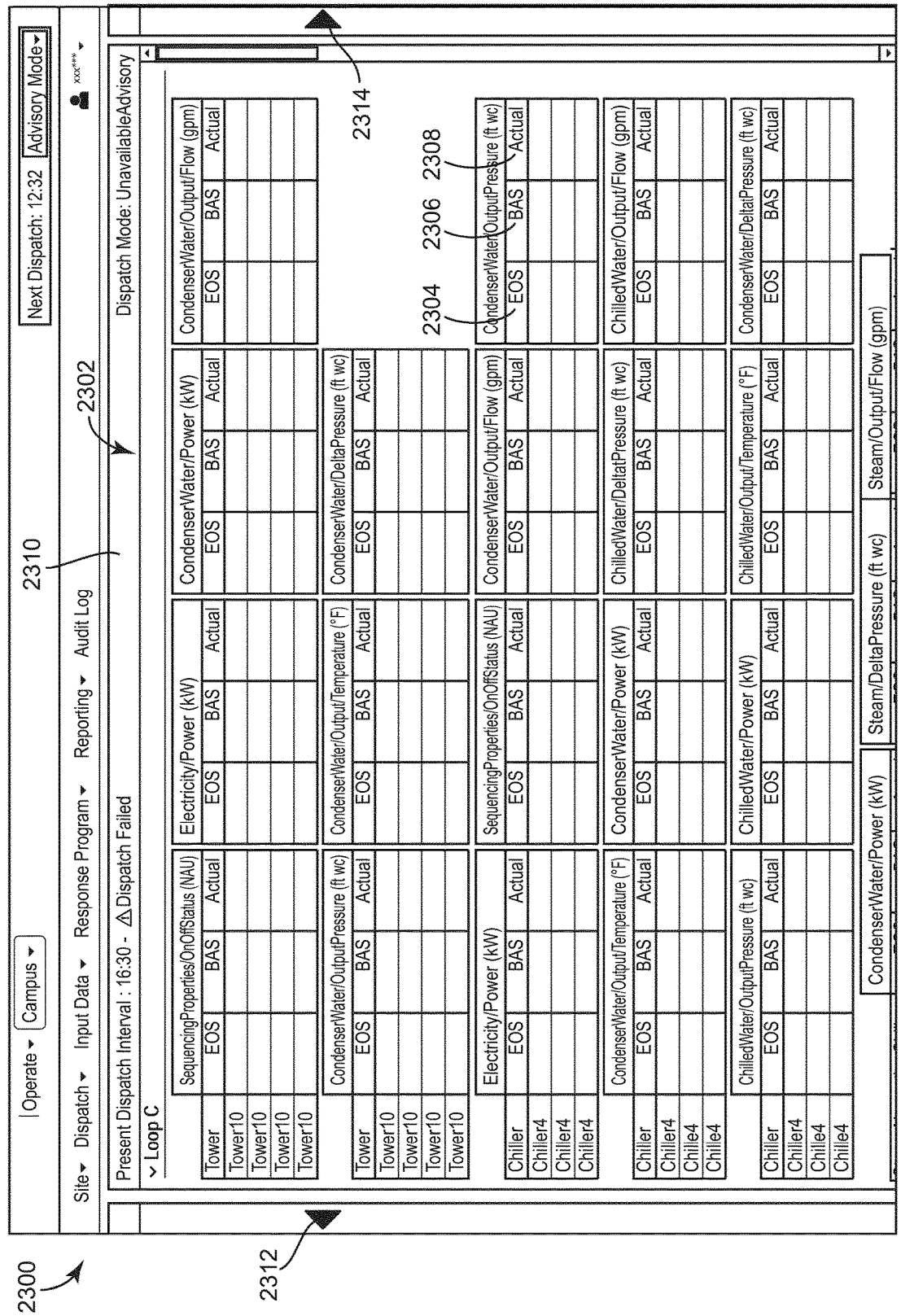
FIG. 23A is a drawing of a dispatch schedule interface which may be generated by the EOS of FIG. 3, according to an exemplary embodiment.
Figure 23B:
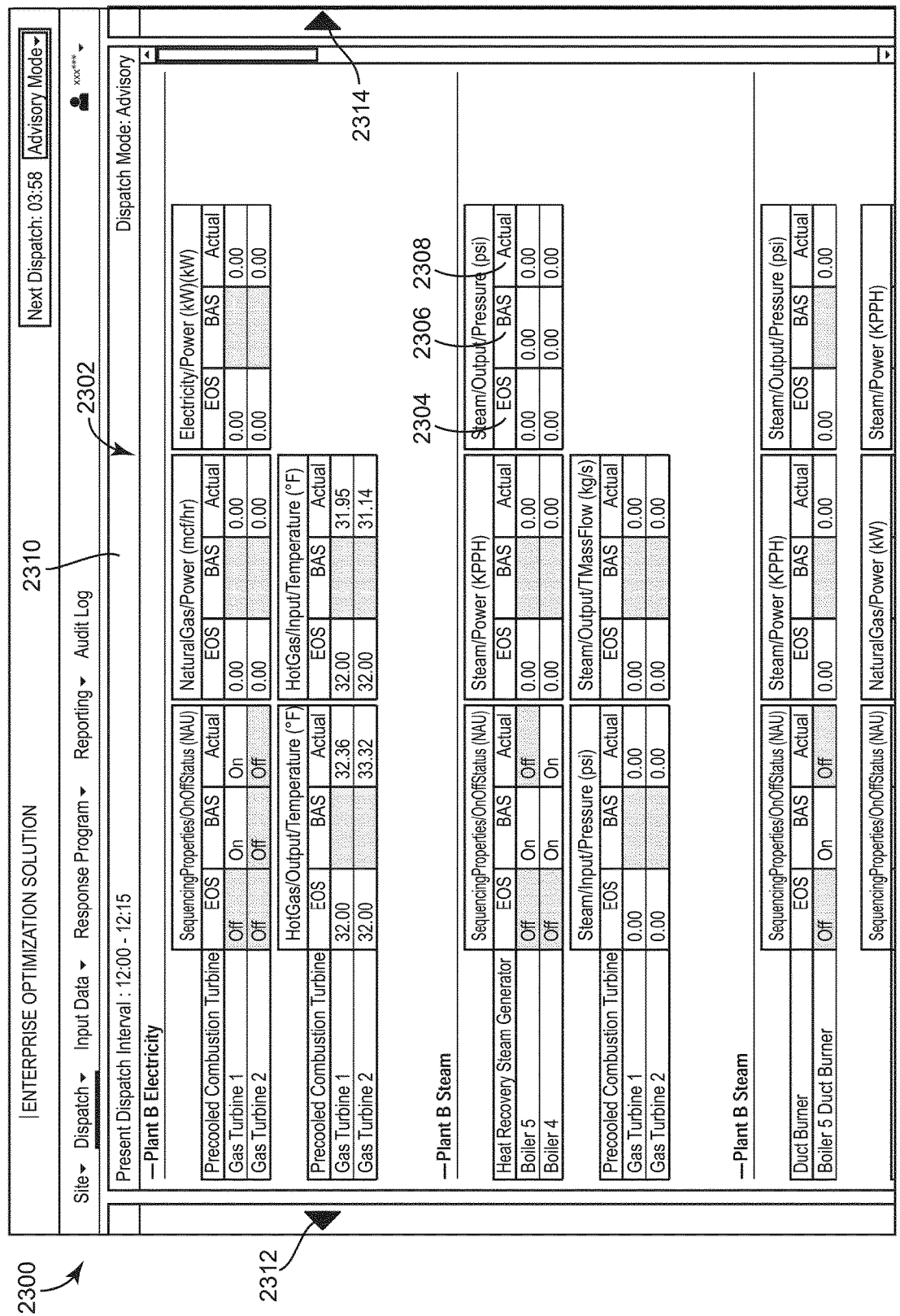
FIG. 23B is a drawing of another dispatch schedule interface which may be generated by the EOS of FIG. 3, according to an exemplary embodiment.

Referring now to FIGS. 23A-23B, a dispatch schedule interface 2300 which may be generated by dispatch GUI generator 506 is shown, according to an exemplary embodiment. Dispatch schedule interface 2300 may include detailed dispatch information for each of the subplants within energy plant 200. For example, dispatch schedule interface 2300 may include detailed dispatch information for each chiller subplant 202-206, steam subplant 208, and cogeneration subplant 210. Dispatch schedule interface 2300 may also include detailed dispatch information for each of the individual devices within each subplant 202-210. For example, dispatch schedule interface 2300 may include detailed dispatch information 2302 for each of chillers 218-228 within each chiller subplant 202-206, each of boilers 232 within steam subplant 208, and each of combustion turbines 230 within cogeneration subplant 210.

Detailed dispatch information 2302 for each chiller may include the chiller's status (e.g., on or off), the amount of cooling energy (i.e., "Cooling Q") produced by the chiller (measured in tons), the power consumption of each chiller (measured in kW), the temperature of the cold water produced by each chiller, the flow rate of the cold water produced by each chiller, and the dispatched condenser flow setpoint for each chiller. Detailed dispatch information 2302 for each boiler may include the boiler's status (e.g., on or off), the amount of heating energy (i.e., "Heating Q") produced by the boiler (measured in mmBTU/h), the amount of fuel usage of each boiler (measured in mmBTU/h), the power consumption of each boiler (measured in kW), and the temperature of the hot water or steam produced by each boiler. Detailed dispatch information 2302 for the cogeneration subplant may include the amount of electricity produced by each of the combustion turbines.

In some embodiments, dispatch schedule interface 2300 includes multiple values for each of the variables included in detailed dispatch information 2302. For example, dispatch schedule interface 2300 may include an optimal value 2304 for each variable (i.e., the "EOS" value), a building automation system (BAS) value 2306 for each variable (i.e., the "BAS" value), and an actual value 2308 for each variable. Optimal values 2304 may be determined by EOS 302 as previously described. In some instances, optimal values 2304 are based on the optimal or recommended subplant loads determined by high level optimizer 330. In other instances, optimal values 2304 may be based on the manual subplant loads received via EOS user interface 704. When EOS 302 is operated in the automatic mode, optimal values 2304 may be the same as the BAS values 2306 since optimal values 2304 are automatically provided as inputs to the BAS. However, when EOS 302 is operated in the advisory mode, optimal values 2304 may be different from BAS values 2306 since optimal values 2304 are provided as recommendations but not automatically applied as inputs to the BAS. Actual values 2308 may represent measured or observed values of the variables obtained from energy plant 200, as indicated by the actual subplant utilization data collected by subplant monitor 338.

In some embodiments, dispatch schedule interface 2300 presents snapshots of detailed dispatch information 2302 for multiple different dispatch intervals. For example, FIG. 23A shows a snapshot of detailed dispatch information 2302 for the present dispatch interval 2310. Other pages of dispatch schedule interface 2300 may show snapshots of detailed dispatch information 2302 for a past dispatch interval or a future dispatch interval. A user can navigate between the past, present, and future dispatch intervals by selecting arrows 2312-2314 located on the sides of each window. For example, clicking arrow 2312 may cause dispatch schedule interface 2300 to transition from displaying the snapshot for the present dispatch interval 2310 to the snapshot for the past dispatch interval. Similarly, clicking arrow 2314 may cause dispatch schedule interface 2300 to transition from displaying the snapshot for the present dispatch interval 2310 to the snapshot for the future dispatch interval. Advantageously, this allows a user to navigate between past, present, and future snapshots of detailed dispatch information 2302 to view subplant loads and equipment setpoints for a series of dispatch intervals.

Figure 23C:
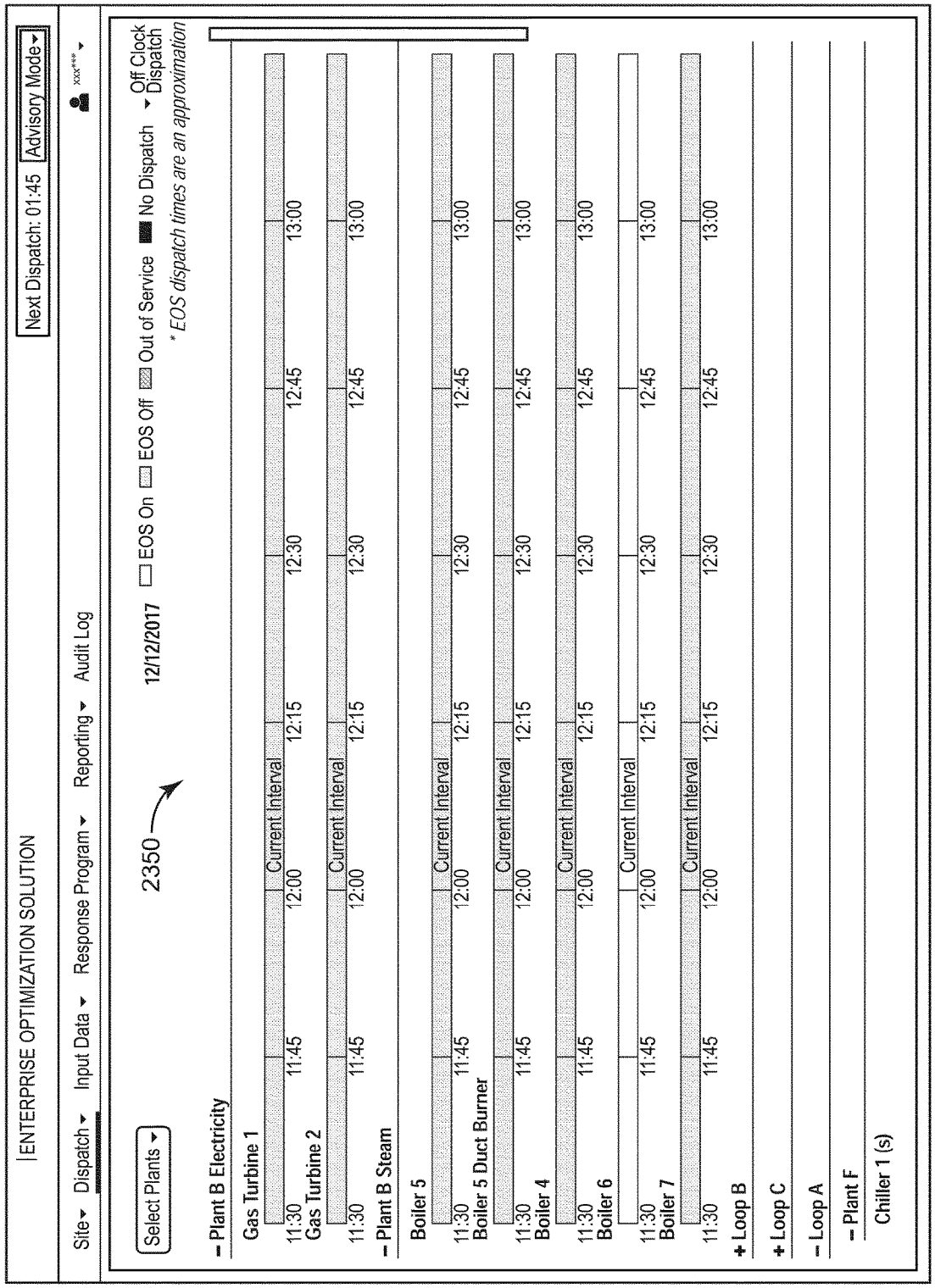
FIG. 23C is a drawing of another dispatch schedule interface which may be generated by the EOS of FIG. 3, according to an exemplary embodiment.

Referring now to FIG. 23C, another dispatch schedule interface 2350 which may be generated by dispatch GUI generator 506 is shown, according to an exemplary embodiment. Dispatch schedule interface 2350 is shown displaying dispatch information for several devices of equipment. In some embodiments, the equipment are grouped into corresponding plants and/or loops in dispatch schedule interface 2350. A user can expand or collapse various sections of dispatch schedule interface 2350 to show or hide information for equipment of each plant and/or loop. For each device of equipment, dispatch schedule interface 2350 may indicate whether EOS 302 is on or off, whether the device is out of service, and whether no dispatch is provided for each time interval. These status indications may be provided in the form of colored bars, where each color represents a different status indication.

Dispatch Chart Interfaces

Referring now to FIGS. 24-28B, several dispatch chart interfaces 2400-2850 which may be generated by dispatch GUI generator 506 is shown, according to an exemplary embodiment. Dispatch chart interfaces 2400-2850 show high-level energy flows for past, present and future dispatch schedules in stacked bar charts 2410, 2510, 2610, 2660, 2710, 2760, 2810, and 2860. The lines 2402, 2502, 2602, 2652, 2702, 2752, 2802, and 2852 that span vertically across each chart 2410, 2510, 2610, 2660, 2710, 2760, 2810, and 2860 represent the last dispatch time. When a new dispatch schedule is generated, each chart 2410, 2510, 2610, 2660, 2710, 2760, 2810, and 2860 is updated and shifted to the left.

To hide or unhide specific data on each chart 2410, 2510, 2610, 2660, 2710, 2760, 2810, and 2860, a user can click the checkboxes 2404, 2504, 2604, 2654, 2704, 2754, 2804, and 2854 in the legends 2406, 2506, 2606, 2656, 2706, 2756, 2806, and 2856. To focus on a specific area of data, a user can click a point on charts 2410, 2510, 2610, 2660, 2710, 2760, 2810, and 2860 and drag to the right. The chart 2410, 2510, 2610, 2660, 2710, 2760, 2810, and 2860 then zooms in on the selected range. The user can continue zooming in until the desired area of focus is reached. To pan, the user can use chart controls 2408, 2508, 2608, 2658, 2708, 2758, 2808, and 2858 below each chart. To return to the original view, the user can select Reset zoom. The user can point to any point of data for more information about the date, time, and energy output flows.

In some embodiments, dispatch chart interfaces 2400-2850 include some or all of the features described in U.S. patent application Ser. No. 14/815,845 filed Jul. 31, 2015, and titled "Systems and Methods for Visualizing Equipment Utilization in an energy plant." The entire disclosure of U.S. patent application Ser. No. 14/815,845 is incorporated by reference herein.

Figure 24:
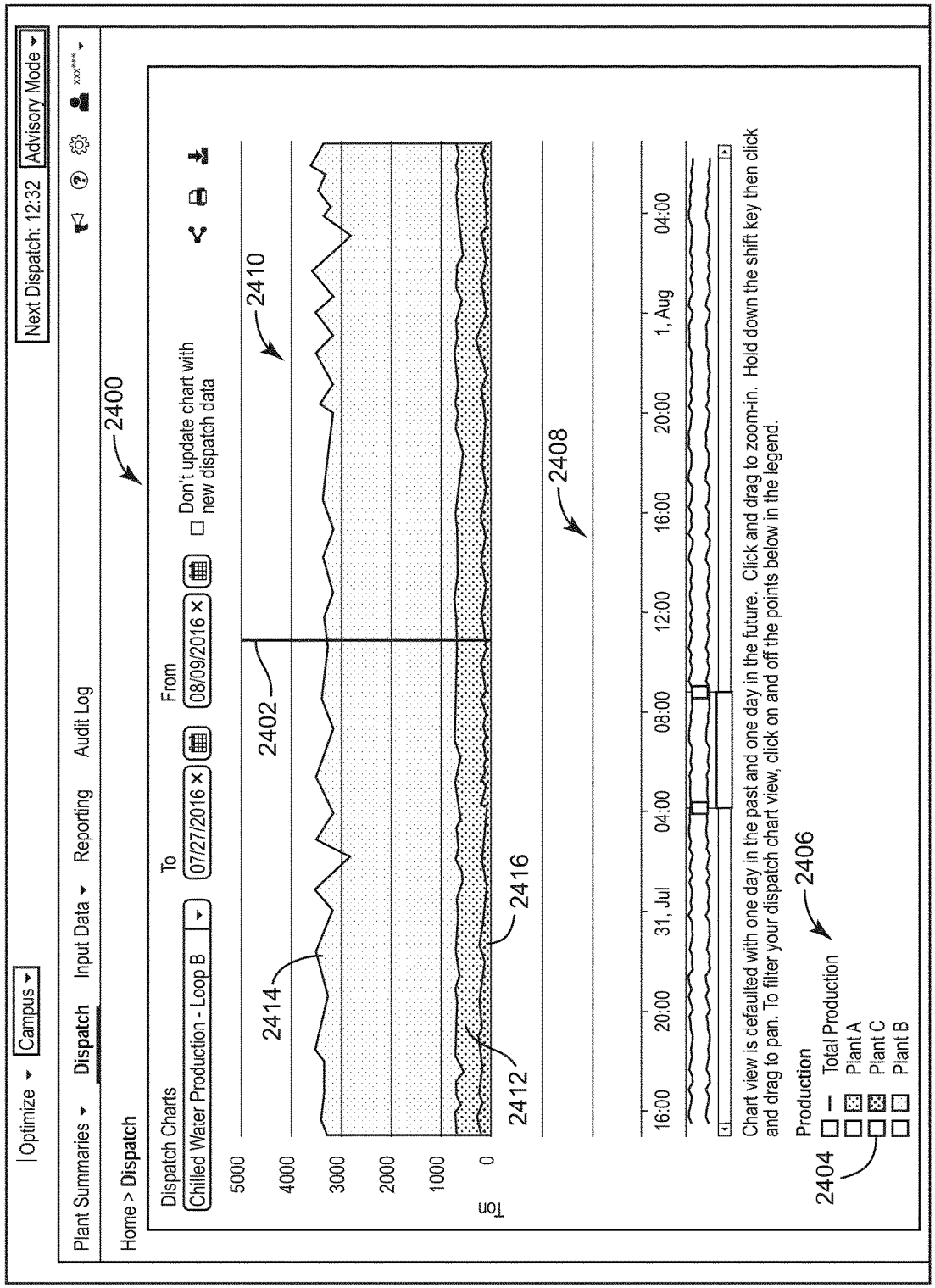
FIG. 24 is a drawing of a dispatch chart interface which may be generated by the EOS of FIG. 3, according to an exemplary embodiment.

Referring particularly to FIG. 24, dispatch chart interface 2400 is shown displaying the chilled water production for Loop B. The total chilled water production of Loop B consists of the production 2412 of the Plant A, the production 2414 of Plant B, and the production 2416 of Plant C. The chilled water production of each plant at each time step is indicated by the height of the corresponding stacked bar in stacked bar chart 2410. The total height of the stacked bars at each time step indicate the total chilled water production of Loop B at that time step.

Figure 25:
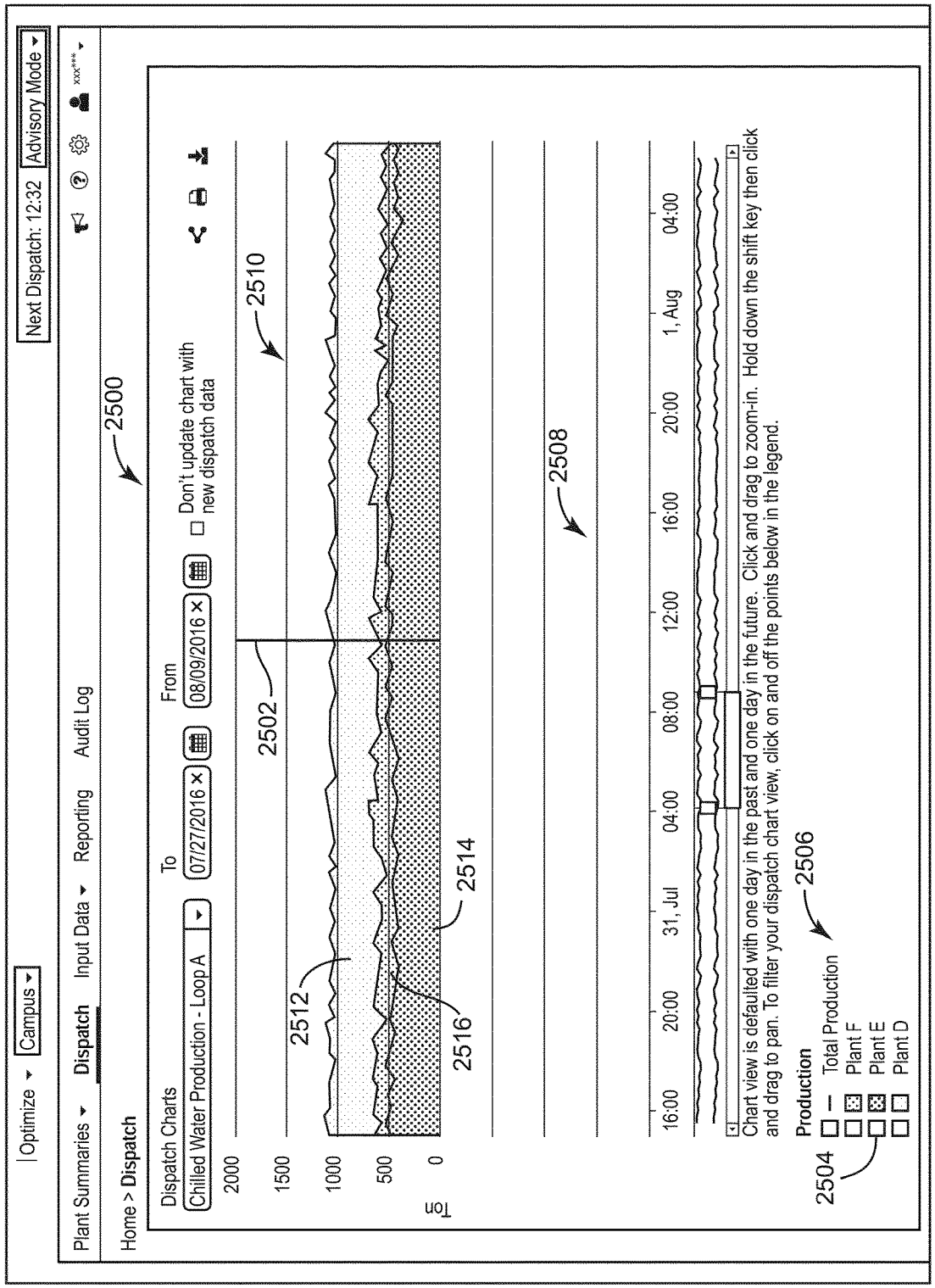
FIG. 25 is a drawing of another dispatch chart interface which may be generated by the EOS of FIG. 3, according to an exemplary embodiment.

Referring now to FIG. 25, dispatch chart interface 2500 is shown displaying the chilled water production for Loop A. The total chilled water production of Loop A consists of the production 2512 of Plant D, the production 2514 of Plant E, and the production 2516 of Plant F. The chilled water production of each plant at each time step is indicated by the height of the corresponding stacked bar in stacked bar chart 2510. The total height of the stacked bars at each time step indicate the total chilled water production of Loop A at that time step.

Figure 26A:
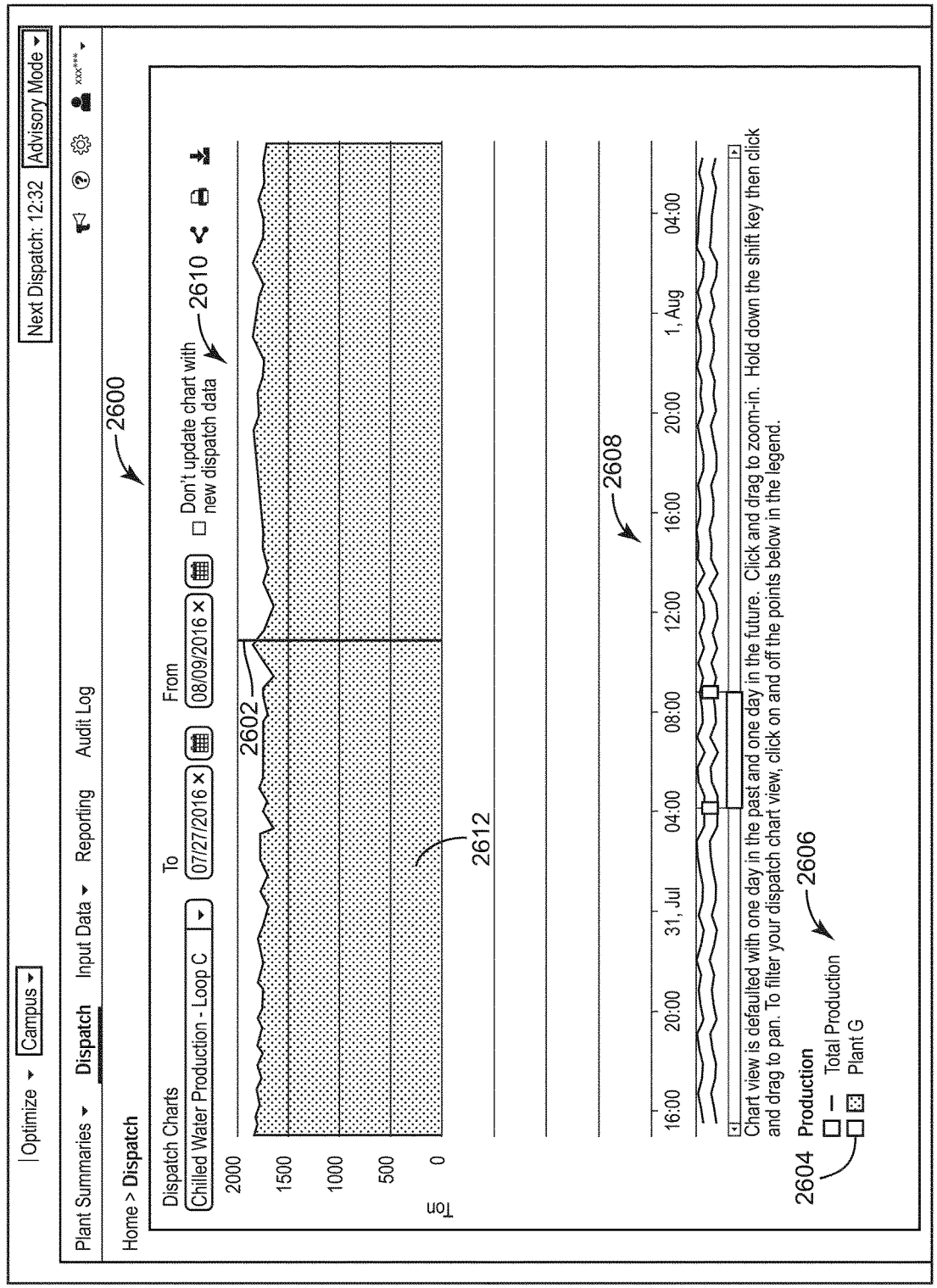
FIG. 26A is a drawing of another dispatch chart interface which may be generated by the EOS of FIG. 3, according to an exemplary embodiment.

Referring now to FIG. 26A, dispatch chart interface 2600 is shown displaying the chilled water production for Loop C. The total chilled water production of Loop C consists of only the production 2612 of Plant G. The chilled water production of Plant G at each time step is indicated by the height of the stacked bar in stacked bar chart 2610, which is equal to the total chilled water production of Loop A at that time step.

Figure 26B:
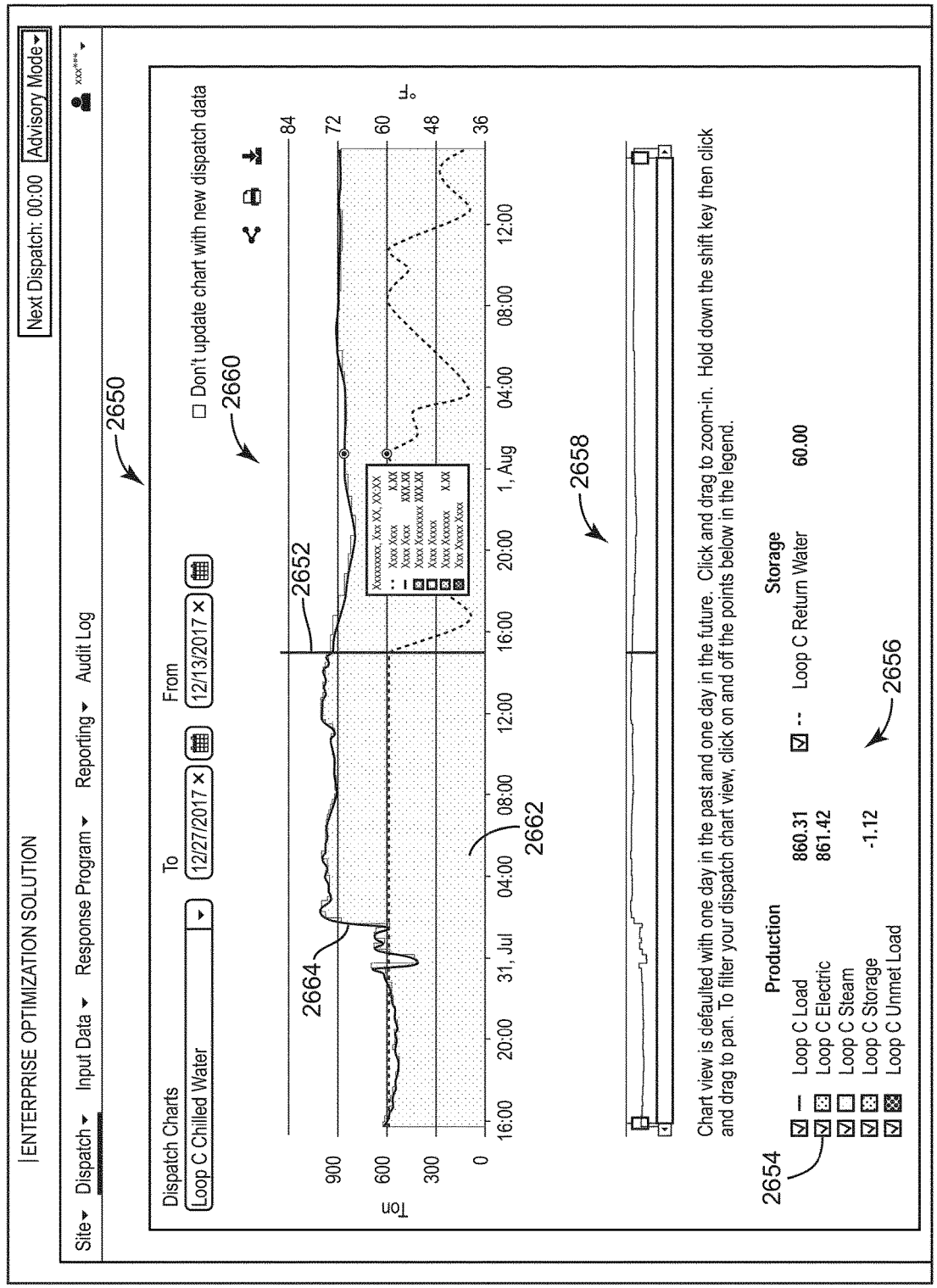
FIG. 26B is a drawing of another dispatch chart interface which may be generated by the EOS of FIG. 3, according to an exemplary embodiment.

Referring now to FIG. 26B, dispatch chart interface 2650 is shown displaying the production and storage of Loop C at each time step. The total production of Loop C consists of the production 2662 of electricity and steam within Loop C and the amount of electricity and steam discharged from storage within Loop C. Line 2664 indicates the load on Loop C. The difference between the total production of Loop C and the load on Loop C signifies the unmet load. The storage of Loop C consists of the amount of return water stored within Loop C at each time step, designated by line 2666.

Figure 27A:
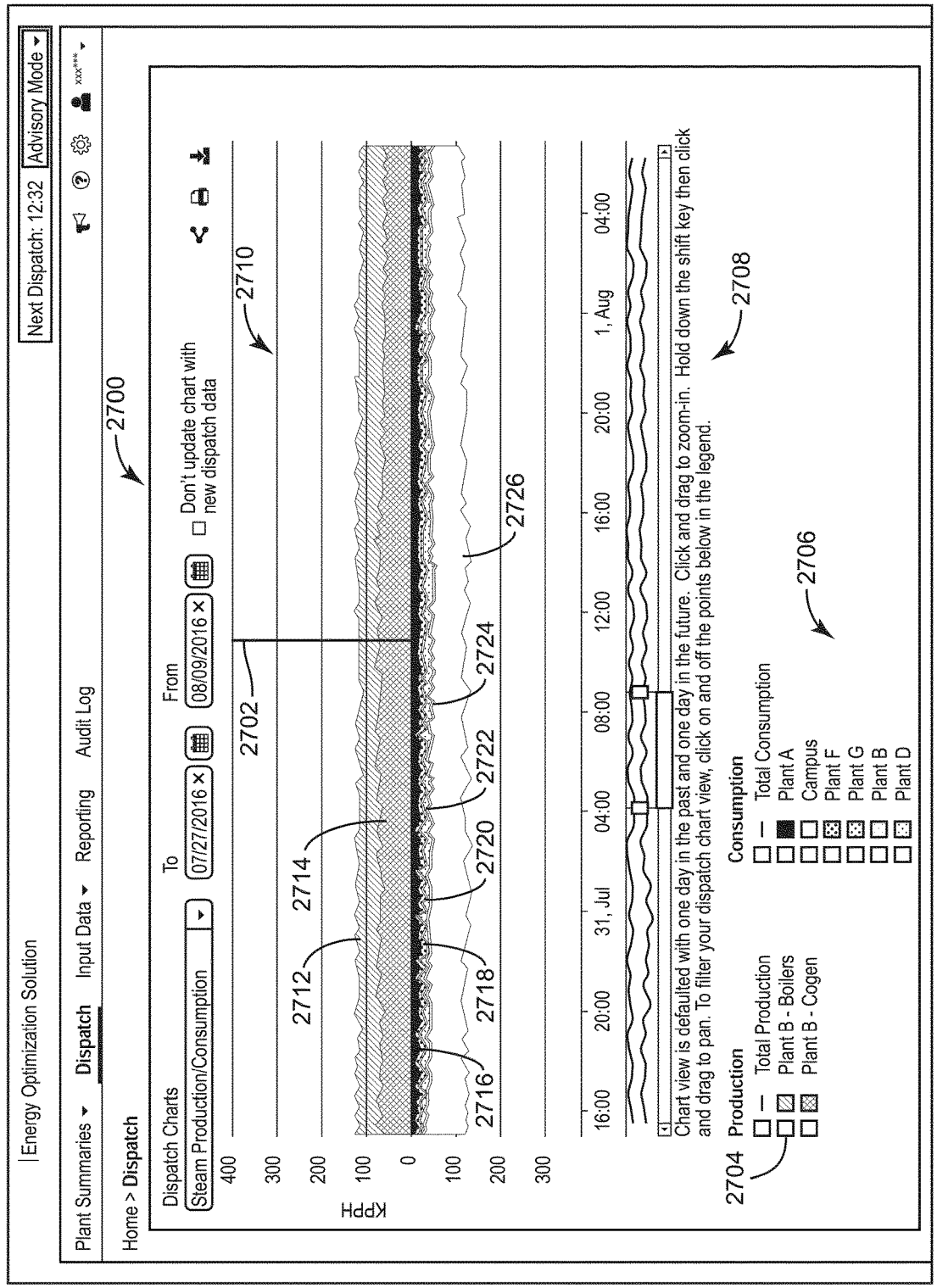
FIG. 27A is a drawing of another dispatch chart interface which may be generated by the EOS of FIG. 3, according to an exemplary embodiment.

Referring now to FIG. 27A, dispatch chart interface 2700 is shown displaying the total steam production and consumption for energy plant 200. The total steam production of energy plant 200 consists of the production 2712 of the boilers of Plant B and the production 2714 of the cogenerators of Plant B. The steam production of each of the boilers and the cogenerators at each time step is indicated by the height of the corresponding stacked bars 2712 and 2714 above the horizontal axis (i.e., KPPH=0) in stacked bar chart 2710. The total height of the stacked bars 2712 and 2714 above the horizontal axis at each time step indicate the total steam production at that time step.

The total steam consumption of energy plant 200 consists of the consumption of Plant A, campus 1108, Plant F, Plant G, Plant B, and Plant D. The steam consumption of each of the plants at each time step is indicated by the height of the corresponding stacked bars 2716, 2718, 2720, 2722, 2724, and 2726 below the horizontal axis (i.e., KPPH=0) in the stacked bar chart. The total height of the stacked bars 2716-2726 below the horizontal axis at each time step indicate the total steam consumption at that time step.

Figure 27B:
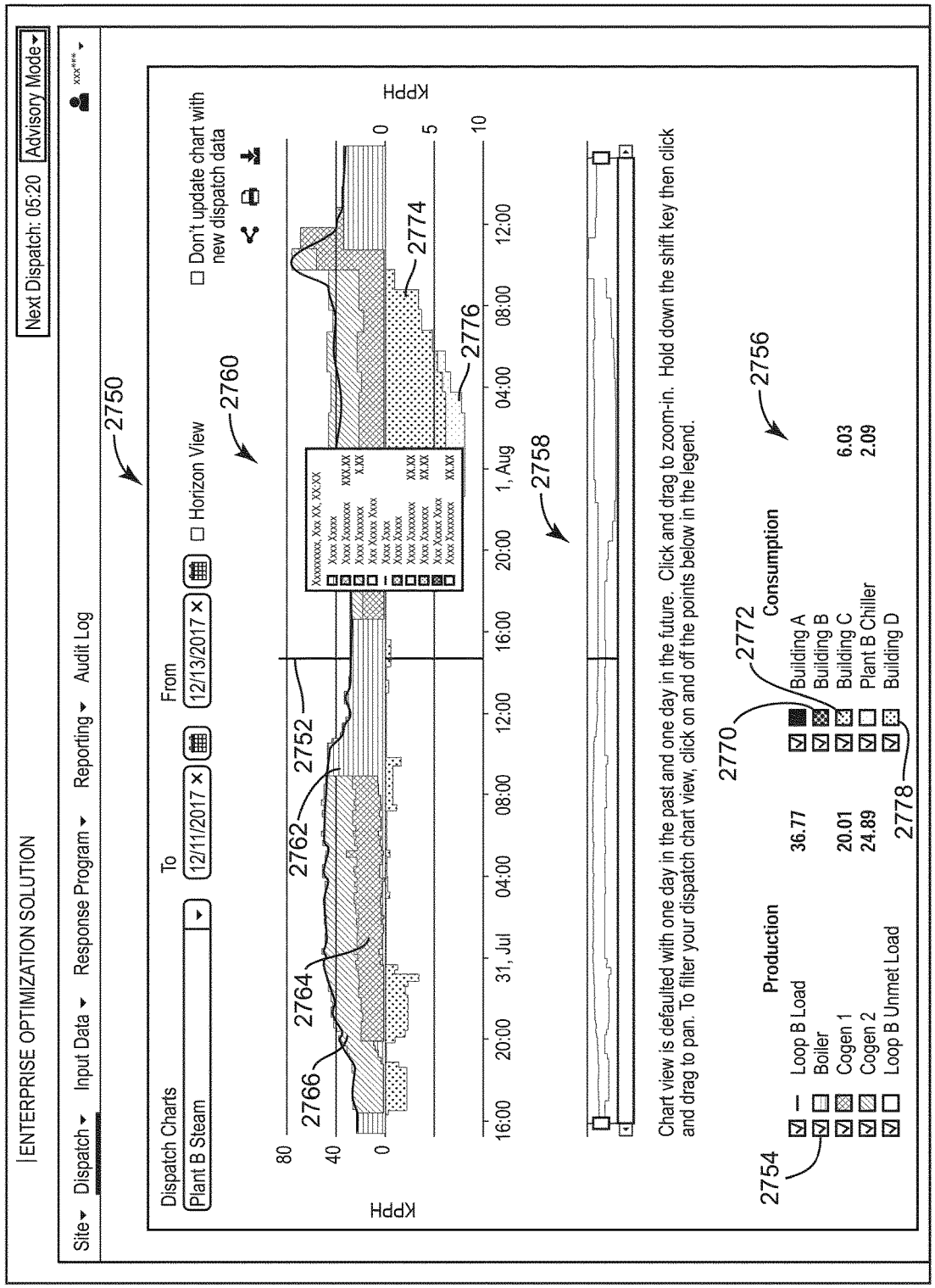
FIG. 27B is a drawing of another dispatch chart interface which may be generated by the EOS of FIG. 3, according to an exemplary embodiment.

Referring now to FIG. 27B, dispatch chart interface 2750 is shown displaying the total steam production and consumption of Plant B at each time step within a selected time period. The total steam production of Plant B consists of the production 2762 of the boilers of Plant B, the production 2764 of a first set of cogenerators of Plant B, and the production 2766 of a second set of cogenerators of Plant B. The steam production of each of the boilers and the cogenerators at each time step is indicated by the height of the corresponding stacked bars 2762-2766 above the horizontal axis in stacked bar chart 2760. The total height of the stacked bars 2762-2766 above the horizontal axis at each time step indicate the total steam production at that time step. Line 2768 represents the total load on Plant B. The difference between the total load on Plant B and the total production of Plant B represents the unmet load.

The total steam consumption of Plant B consists of the consumption 2770 of Building A, the consumption 2772 of Building B, the consumption 2774 of Building C, the consumption 2776 of the chillers within Plant B, and the consumption 2778 of Building D. The steam consumption of each of the buildings and chillers at each time step is indicated by the height of the corresponding stacked bars 2770-2778 below the horizontal axis in stacked bar chart 2760. The total height of the stacked bars 2770-2770 below the horizontal axis at each time step indicate the total steam consumption at that time step.

Figure 28A:
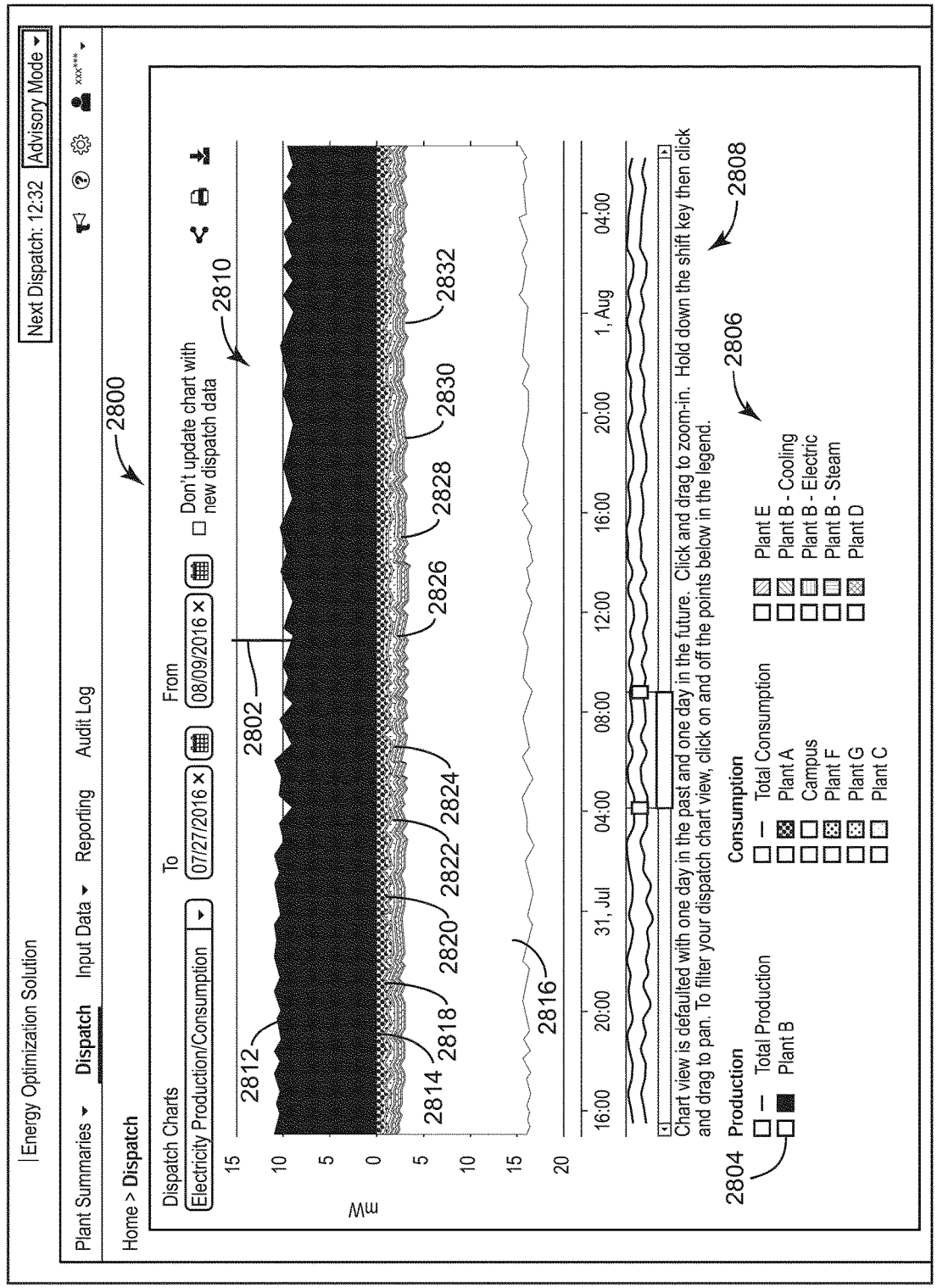
FIG. 28A is a drawing of another dispatch chart interface which may be generated by the EOS of FIG. 3, according to an exemplary embodiment.

Referring now to FIG. 28A, dispatch chart interface 2800 is shown displaying the total electricity production and consumption for energy plant 200. The total electricity production of energy plant 200 consists of the production 2812 of Plant B. The electricity production at each time step is indicated by the height of the corresponding stacked bar 2812 above the horizontal axis (i.e., KPPH=0) in stacked bar chart 2810.

The total electricity consumption of energy plant 200 consists of the consumption 2814 of Plant A, the consumption 2816 of campus 1108, the consumption 2818 of Plant F, the consumption 2820 of Plant G, the consumption 2822 of Plant C, the consumption 2824 of Plant E, the consumption 2826 of the cooling equipment of Plant B, the consumption 2828 of the electric equipment of Plant B, the consumption 2830 of the steam equipment of Plant B, and the consumption 2832 of Plant D. The electricity consumption of each of the plants at each time step is indicated by the height of the corresponding stacked bars 2814-2832 below the horizontal axis (i.e., KPPH=0) in stacked bar chart 2810. The total height of stacked bars 2814-2832 below the horizontal axis at each time step indicate the total electricity consumption at that time step.

Figure 28B:
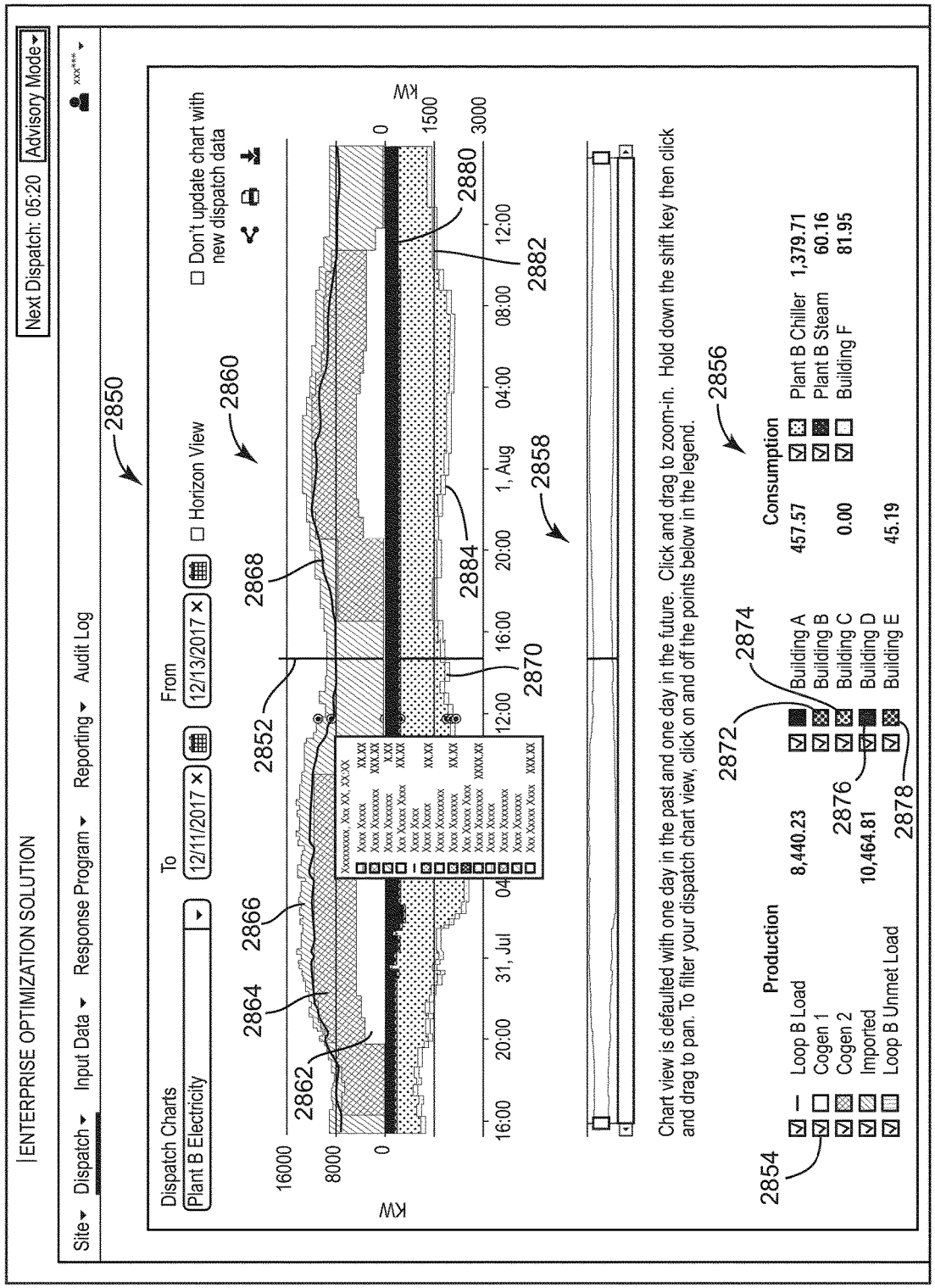
FIG. 28B is a drawing of another dispatch chart interface which may be generated by the EOS of FIG. 3, according to an exemplary embodiment.

Referring now to FIG. 28B, dispatch chart interface 2850 is shown displaying the total electricity production and consumption of Plant B at each time step within a selected time period. The total electricity production of Plant B consists of the production 2862 of a first set of cogenerators of Plant B, the production 2864 of a second set of cogenerators of Plant B, and amount 2866 of electricity imported by Plant B. The electricity production of each of the cogenerators and the amount of electricity imported at each time step is indicated by the height of the corresponding stacked bars 2862-2866 above the horizontal axis in stacked bar chart 2860. The total height of the stacked bars 2862-2866 above the horizontal axis at each time step indicate the total electricity production at that time step. Line 2768 represents the total load on Plant B. Line 2868 represents the total electric load on Plant B. The difference between the total electric load on Plant B and the total production of Plant B represents the unmet load.

The total electric consumption of Plant B consists of the consumption 2870 of Building A, the consumption 2872 of Building B, the consumption 2874 of Building C, the consumption 2876 of Building D, the consumption 2878 of Building E, the consumption 2880 of the chillers within Plant B, the consumption 2882 of the steam generators within Plant B, and the consumption 2884 of Building F. The electric consumption of each of the buildings, chillers, and steam generators at each time step is indicated by the height of the corresponding stacked bars 2870-2884 below the horizontal axis in stacked bar chart 2760. The total height of the stacked bars 2870-2884 below the horizontal axis at each time step indicate the total electric consumption at that time step.

Input Data Interfaces

Referring now to FIGS. 29-34, several input data interfaces 2900-3400 which may be generated by dispatch GUI generator 506 is shown, according to an exemplary embodiment. In some embodiments, input data interfaces 2900-3400 allow a user to manage inputs used by high level optimizer 330. Such inputs can include, for example, campus electric and thermal energy load forecasts, utility pricing forecasts, weather forecasts, campus schedules, equipment out-of-service schedules, and manual utility pricing. Manual inputs can be maintained solely by the user, whereas forecast inputs give the user the ability to override weather, pricing, loads, etc. forecasted by EOS 302.

Figure 29:
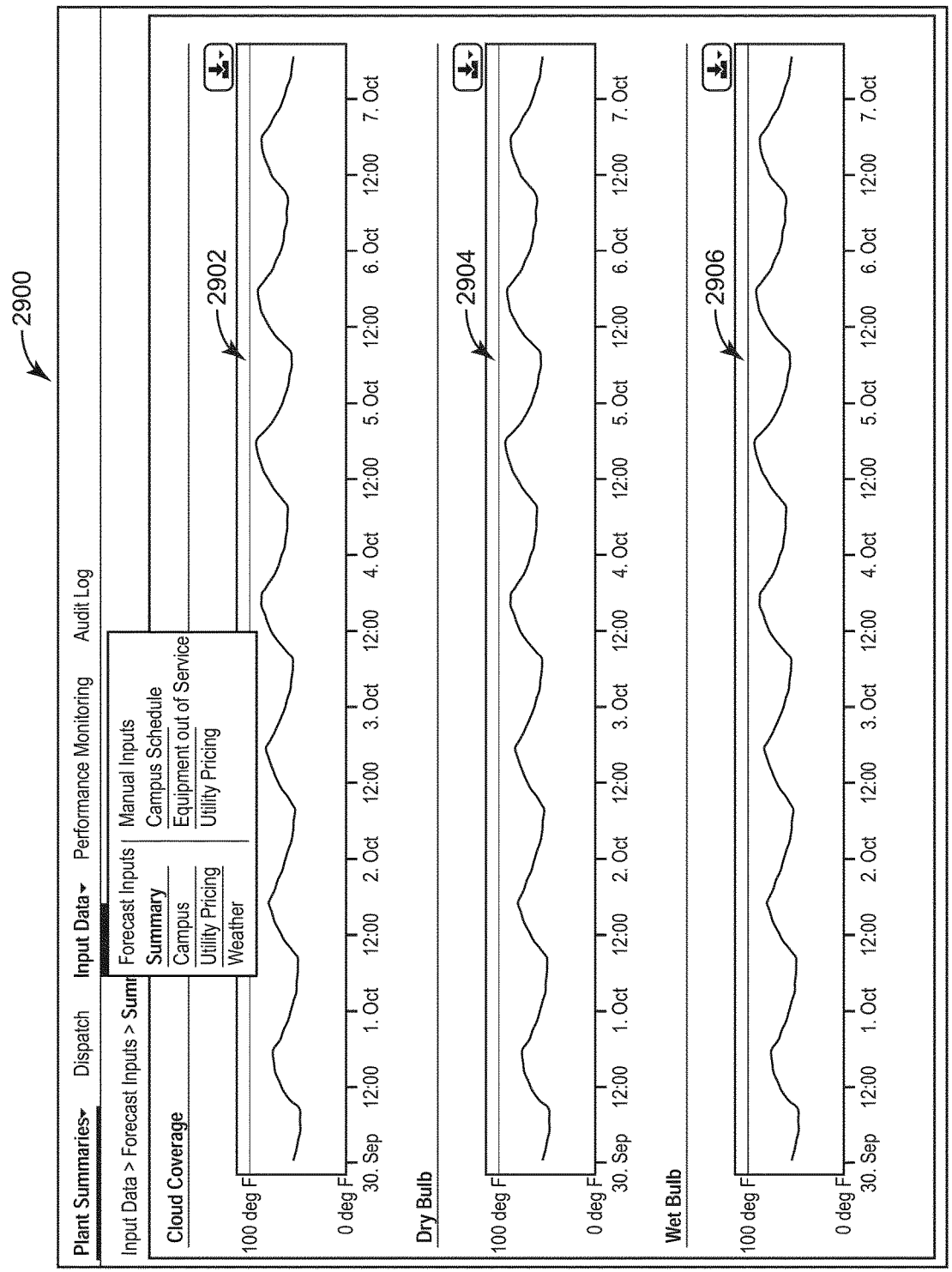
FIG. 29 is a drawing of a weather forecast input interface which may be generated by the EOS of FIG. 3, according to an exemplary embodiment.

Referring particularly to FIG. 29, a weather forecast input interface 2900 is shown, according to an exemplary embodiment. The weather forecast inputs may predict the weather in the geographic region in which the building or campus 1108 is located for each of the plurality of time steps. Weather forecasts may include, for example, cloud coverage, dry bulb temperature, wet bulb temperature, humidity, precipitation, wind, or any other type of weather forecast. In some embodiments, weather forecast input interface 2900 includes a graph 2902, 2904, and 2906 for each of the weather variables. Each graph 2902-2906 may illustrate the predicted values for the corresponding weather variable over time. Weather forecasts can be predicted for the duration of the optimization period. In some embodiments, EOS 302 uses the weather forecasts to predict the thermal and electric energy loads of campus 1108.

Figure 30:
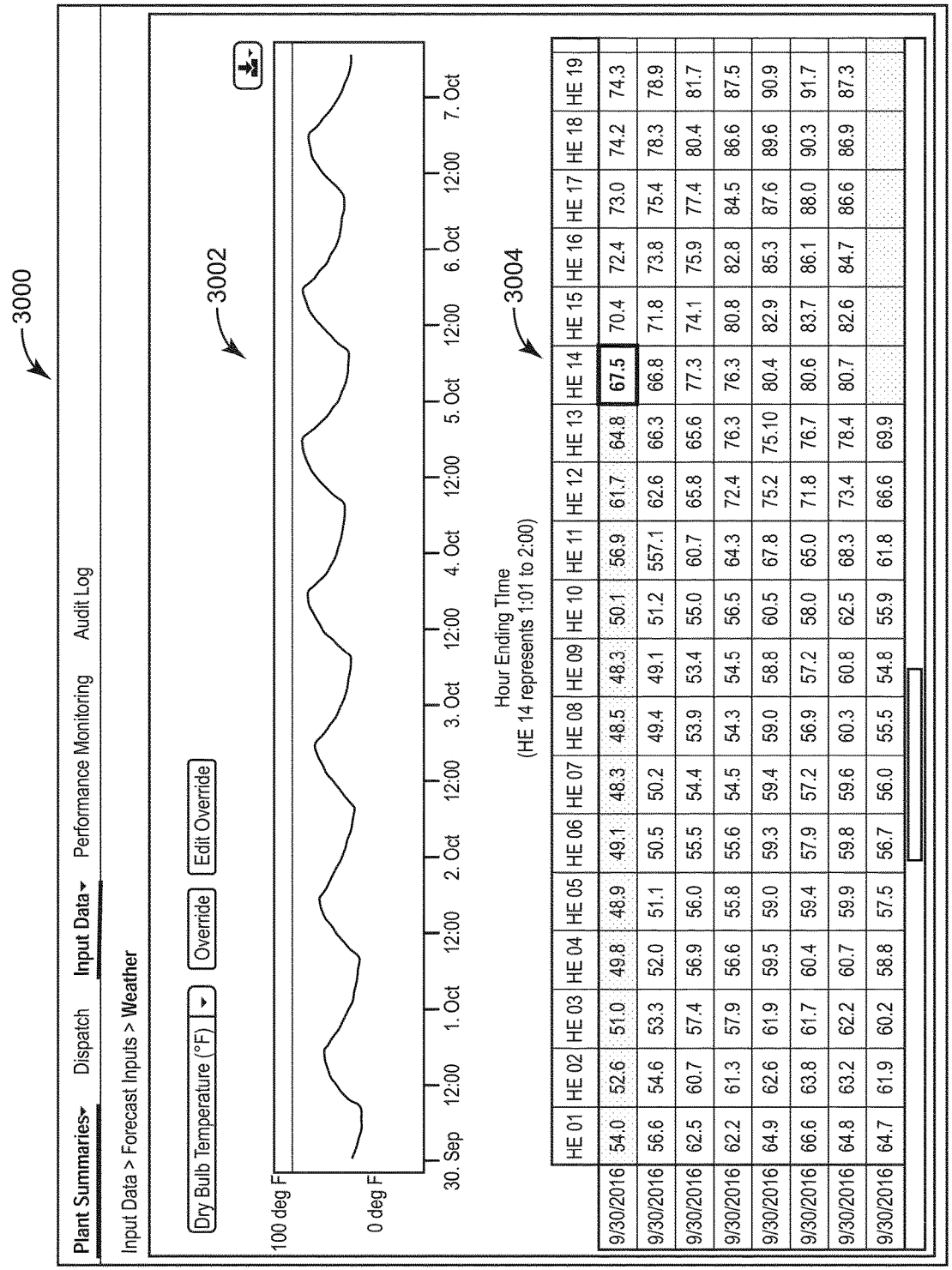
FIG. 30 is a drawing of a dry bulb temperature forecast input interface which may be generated by the EOS of FIG. 3, according to an exemplary embodiment.

Referring now to FIG. 30, a dry bulb temperature forecast input interface 3000 is shown, according to an exemplary embodiment. Dry bulb temperature forecast input interface 3000 is shown to include a graph 3002 of the predicted dry bulb temperature as a function of time. Interface 3000 is also shown to include a table 3004 of the predicted dry bulb temperature values. Table 3004 may include a cell for each hour of the optimization period. For example, table 3004 is shown to include a row for each day and a column for each hour. The cells at the intersections of the rows and columns contain the predicted dry bulb temperature values for the corresponding days and hours.

Figure 31:
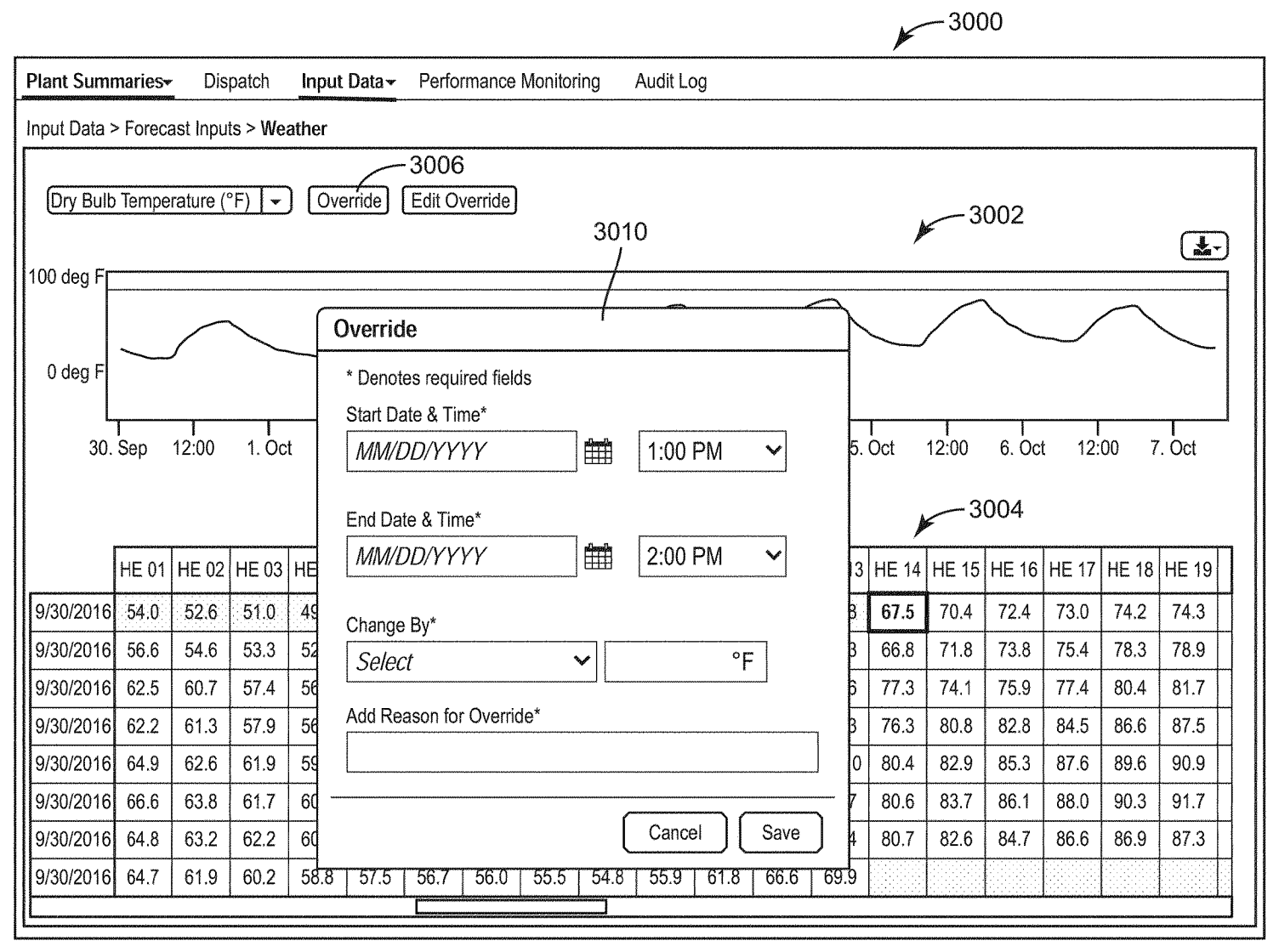

Referring now to FIG. 31, an override interface 3100 is shown, according to an exemplary embodiment. Override interface 3100 may be displayed in response to a user clicking override button 3006 in forecast input interface 3000. In some embodiments, a user can override the predicted values by selecting override button 3006 and entering a manual value for the corresponding variable. The manual override can be applied to a user-defined time period beginning at a start time/date and ending at an end time/date. The forecasted values can be changed by a user defined offset (e.g., increased or decrease by a user-defined amount) or set to a specific user-defined value. In some embodiments, override interface 3100 prompts the user to specify a reason for the override.

Figure 32:
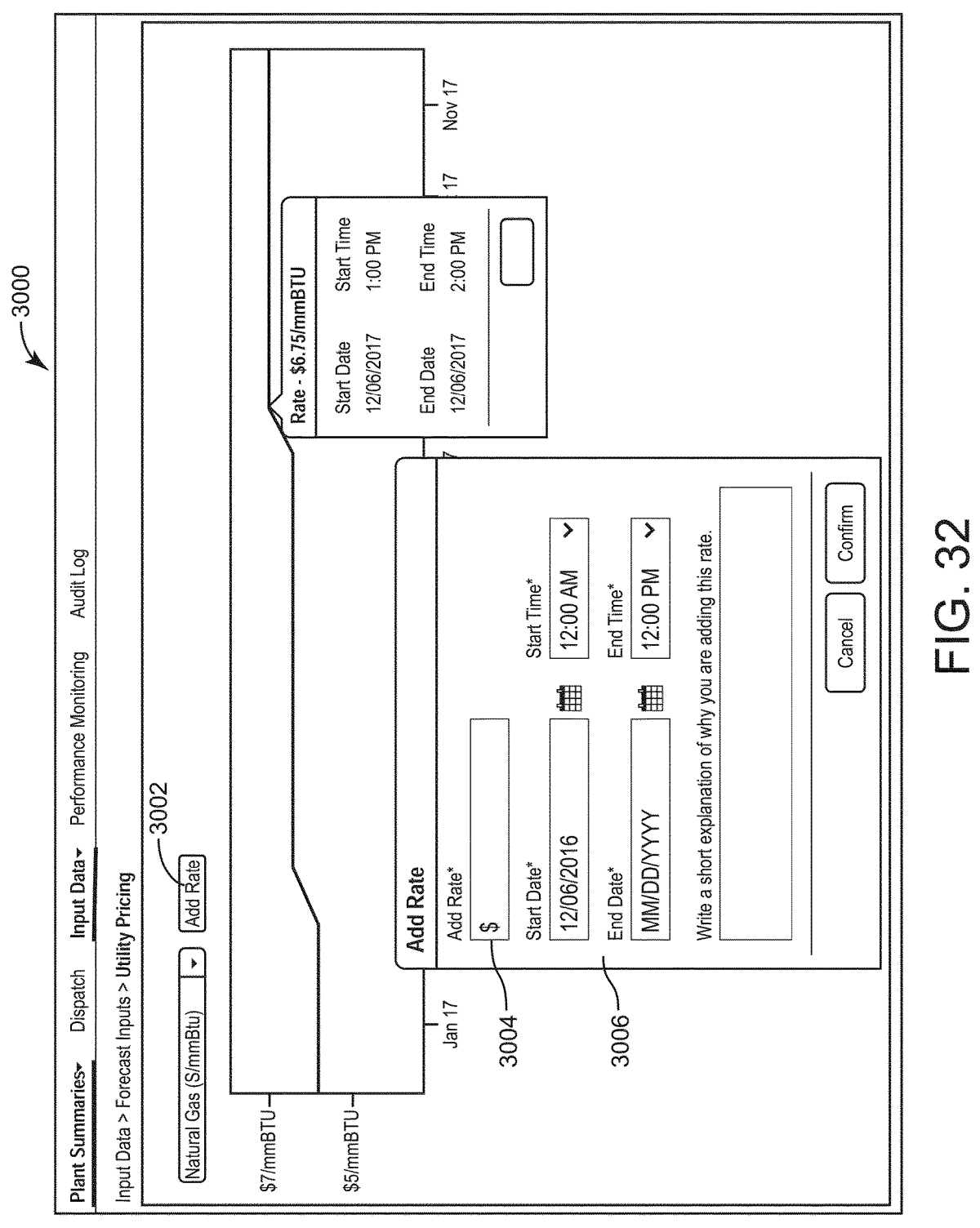

Referring now to FIG. 32, a utility pricing forecast input interface 3200 is shown, according to an exemplary embodiment. Utility pricing forecast input interface 3200 may include a forecast of utility prices for each time step of the optimization period. The forecasted utility prices can be defined for electricity (e.g., $/kWh), natural gas ($/mmBtu), water ($/L), or any other resource consumed by energy plant 200. In some embodiments, utility pricing forecast input interface 3200 allows a user to define one or more utility pricing rates by selecting add rate button 3202 and specifying the rate 3204 and time period 3206 during which the rate 3202 applies. In some embodiments, EOS 302 uses the utility pricing forecasts to predict the cost associated with resource purchases over the optimization period.

Figure 33:
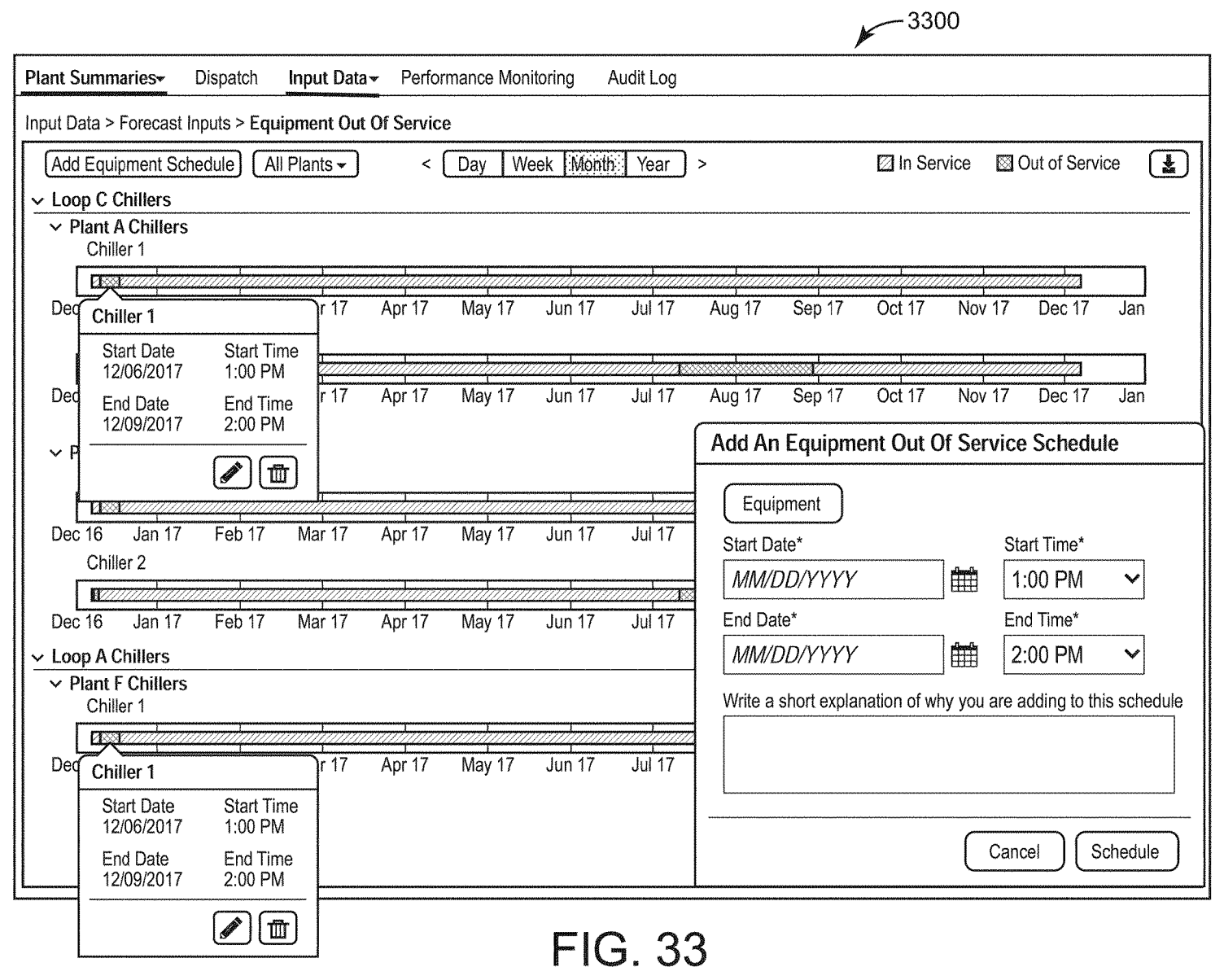

Referring now to FIG. 33, an equipment out-of-service interface 3300 is shown, according to an exemplary embodiment. Equipment out-of-service interface 3300 allows a user to define the time periods during which each of the subplants and/or the pieces of equipment within each subplant will be out-of-service. When a subplant or piece equipment is out-of-service, EOS 302 may exclude that subplant/equipment from the dispatches.

Figure 34:
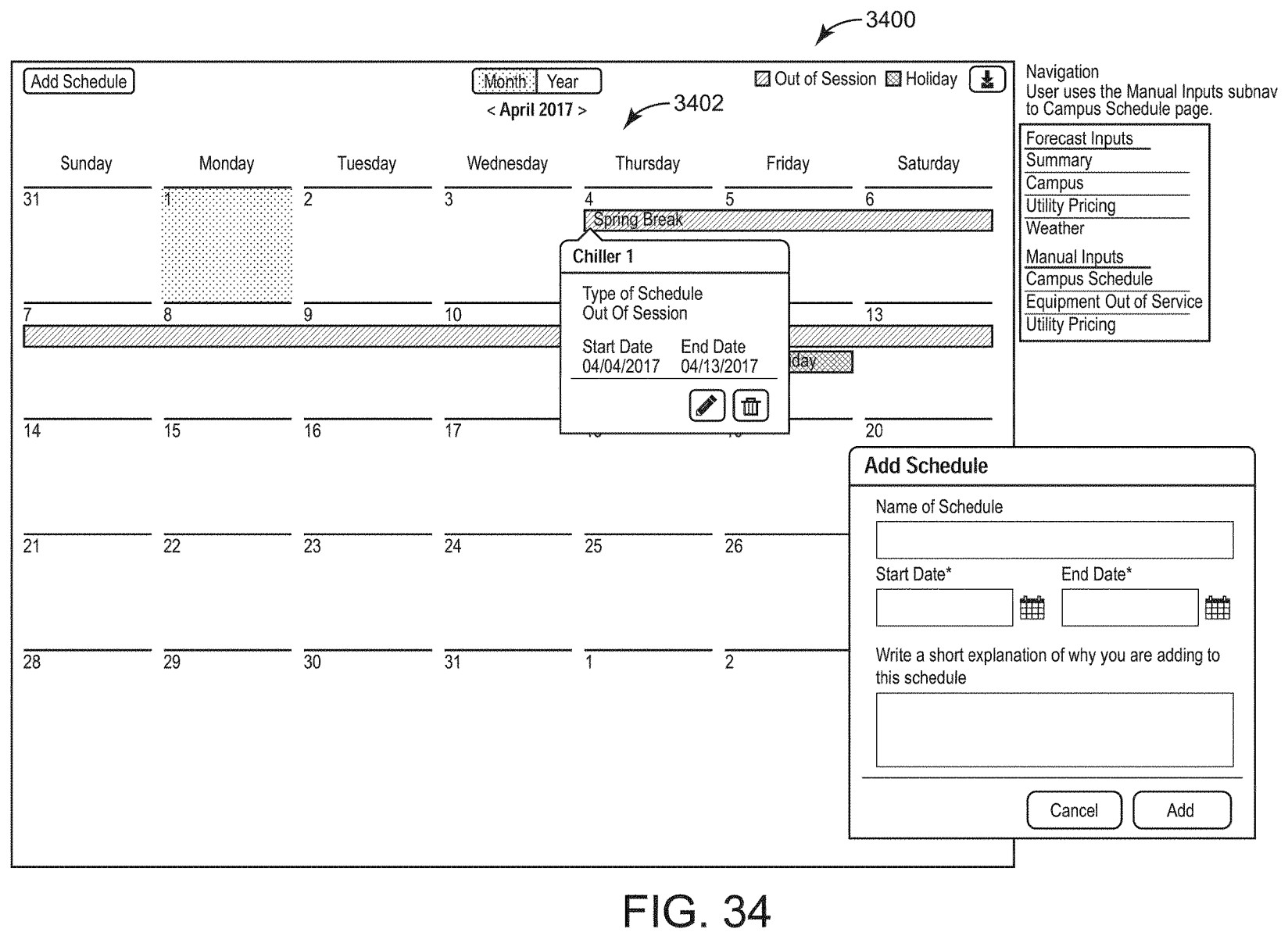

Referring now to FIG. 34, a campus schedule interface 3400 is shown, according to an exemplary embodiment. Campus schedule interface 3400 allows a user to define the holiday and out-of-season calendar 3402 for campus 1108. During holidays, the occupancy of campus 1108 may be lower than usual, which can affect the load forecast. In some embodiments, EOS 302 uses the campus schedule to generate the load forecasts.

Reporting Interfaces

Referring now to FIGS. 35A-36B, several reporting interfaces which may be generated by dispatch GUI generator 506 is shown, according to an exemplary embodiment. FIG. 35A is a drawing of a reporting landing page 3500. Reporting landing page 3500 shows high level KPIs 3502-3510 to provide the most relevant performance data to the user. For example, reporting landing page 3500 is shown to include the total utility cost 3502, the peak demand 3504, the performance 3506, the unmet chilled water load 3508, and the system efficiency 3510. KPIs 3502-3510 can include the data for the current week, day, month, or any other time period. In some embodiments, KPIs 3502-3510 indicate a percent change relative to the previous time period (e.g., 14% decrease this week, 9% increase this week) for each of KPIs 3502-3510. In some embodiments, reporting landing page 3500 allows a user to generate and/or view detailed reports for various dispatch schedules, performance monitoring, and a site summary.

Figure 35B:
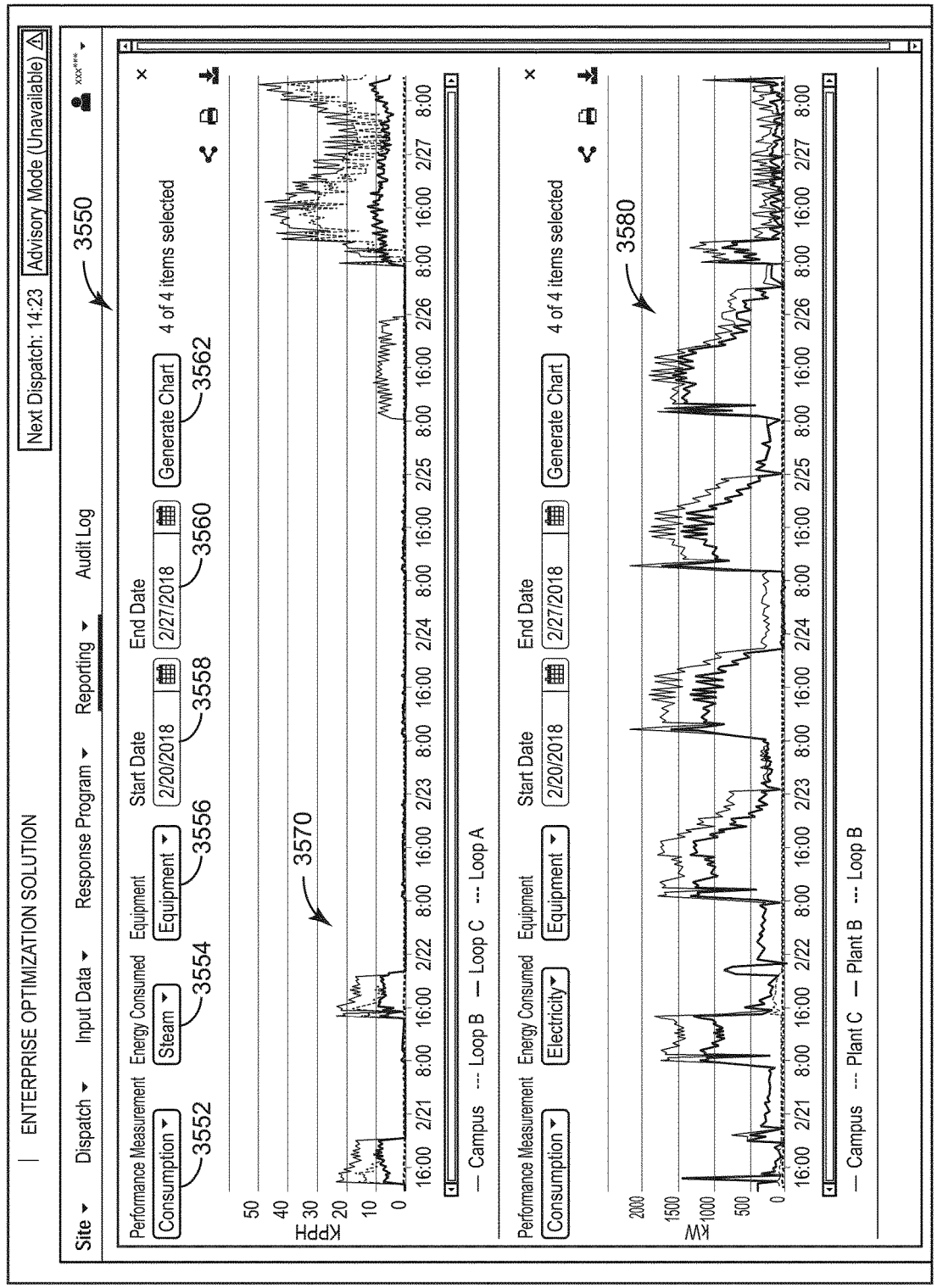
FIG. 35B is a drawing of another reporting interface which may be generated by the EOS of FIG. 3, according to an exemplary embodiment.

FIG. 35B is a drawing of a performance monitoring interface 3550. Performance monitoring interface 3550 allows a user to visualize various performance measurements over time. The user can select a performance measurement via dropdown menu 3552 (e.g., consumption, production, etc.), a type of energy via dropdown 3554 (e.g., steam, electricity, hot water, cold water, etc.), and a type of equipment via dropdown 3556. The user can specify a start date 3558 and an end date 3560 and click the "Generate Chart" button 3562 to create a chart 3570 or 3580 that plots the selected performance metric for the selected energy type and equipment for the specified date range. Each of the lines in chart 3570 represents the value of the steam consumption performance metric for the equipment of campus 1108, Loop A 1102, Loop B 1104, or Loop C 1106. Each of the lines in chart 3580 represents the value of the electricity consumption performance metric for the equipment of campus 108, Plant C, Plant B, or Loop B 1104.

Referring now to FIGS. 36A-36B, an example of a site summary report 3600 which can be accessed via the reporting interfaces is shown. Site summary report 3600 may provide information such as utility cost; economic load demand response (ELDR) revenue; production by site, loop, plant, or equipment; and consumption by site, loop, plant, or equipment. Such information can be provided for a user-defined time period.

Audit Log Interface

Referring now to FIG. 37, an audit log interface 3700 which may be generated by dispatch GUI generator 506 is shown, according to an exemplary embodiment. The audit log is a running list of user edits and changes to operating mode used by EOS 302. User edits can include, for example, overrides to forecasted inputs, manual input entries, schedule changes, and other manual overrides. Changes to the operating mode used by EOS 302 can include manually switching among the advisory mode, the automatic mode, and the manual mode. In some embodiments, each edit requires the user to log a reason for their change. Each of these edits and the reason for the edit can be displayed in the audit report.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An energy plant comprising:
a plurality of subplants configured to serve energy loads of a campus, the plurality of subplants comprising:
a cogeneration subplant configured to generate steam and electricity; and
a chiller subplant electrically coupled to the cogeneration subplant and configured to consume the electricity generated by the cogeneration subplant;
a user interface configured to receive user requests to selectively activate or deactivate devices of equipment of the plurality of subplants;
a high level optimizer configured to determine recommended subplant loads for each of the plurality of subplants in accordance with the user requests to selectively activate or deactivate the devices of equipment of the plurality of subplants, the recommended subplant loads comprising a rate of steam production and a rate of electricity production of the cogeneration subplant and a rate of electricity consumption of the chiller subplant;
a low level optimizer configured to determine recommended equipment setpoints for equipment of the plurality of subplants based on the recommended subplant loads; and
a controller configured to operate the equipment of the plurality of subplants based on the recommended equipment setpoints.

2. The energy plant of claim 1, wherein:
the chiller subplant is fluidly coupled to the cogeneration subplant and configured to chill the steam generated by the cogeneration subplant; and
the recommended subplant loads comprise a rate of steam consumption and a rate of chilled steam production of the chiller subplant.

3. The energy plant of claim 1, wherein the user interface is configured to receive manual subplant loads specified by a user;
wherein the low level optimizer is further configured to determine the recommended equipment setpoints for the equipment of the plurality of subplants based on the manual subplant loads in response to receiving the manual subplant loads.

4. The energy plant of claim 3, further comprising a dispatch graphical user interface (GUI) generator configured to generate a dispatch GUI and present the dispatch GUI via the user interface, the dispatch GUI comprising the recommended subplant loads and the manual subplant loads.

5. The energy plant of claim 4, wherein the dispatch GUI comprises an operating mode selector configured to display a plurality of operating modes and to receive a user selection of one of the operating modes;
the plurality of operating modes comprising an automatic operating mode, an advisory operating mode, and a manual operating mode.

6. The energy plant of claim 3, wherein the low level optimizer is configured to operate in:
an automatic operating mode in which the low level optimizer determines a first set of recommended equipment setpoints to achieve the recommended subplant loads; and
a manual operating mode in which the low level optimizer determines a second set of recommended equipment setpoints to achieve the manual subplant loads.

7. The energy plant of claim 3, wherein the high level optimizer is configured to determine an amount of overproduction or underproduction resulting from the manual subplant loads by comparing the manual subplant loads to a campus energy load.

8. The energy plant of claim 7, wherein:
the plurality of subplants comprise an energy storage subplant; and
the user interface comprises an indication of an amount of time until the energy storage subplant is (1) fully depleted based on the amount of underproduction or (2) filled to capacity based on the amount of overproduction.

9. The energy plant of claim 1, further comprising a subplant monitor configured to monitor the energy plant and identify actual subplant loads for each of the plurality of subplants.

10. The energy plant of claim 9, further comprising a dispatch graphical user interface (GUI) generator configured to generate a dispatch GUI comprising the recommended subplant loads and the actual subplant loads.

11. A method for monitoring and controlling an energy plant comprising a plurality of subplants that operate to serve energy loads of a campus, the method comprising:
operating a cogeneration subplant of the plurality of subplants to generate steam and electricity; and
operating a chiller subplant of the plurality of subplants to consume the electricity generated by the cogeneration subplant;
receiving, via a user interface, user requests to selectively activate or deactivate devices of equipment of the plurality of subplants;
determining recommended subplant loads for each of the plurality of subplants based in part on the user requests to selectively activate or deactivate the devices of equipment of the plurality of subplants, the recommended subplant loads comprising a rate of steam production and a rate of electricity production of the cogeneration subplant and a rate of electricity consumption of the chiller subplant;
determining recommended equipment setpoints for equipment of the plurality of subplants based on the recommended subplant loads; and
operating the equipment of the plurality of subplants based on the recommended equipment setpoints.

12. The method of claim 11, further comprising operating the chiller subplant to chill the steam generated by the cogeneration subplant;
wherein the recommended subplant loads comprise a rate of steam consumption and a rate of chilled steam production of the chiller subplant.

13. The method of claim 11, further comprising:
receiving manual subplant loads specified by a user via the user interface; and
determining the recommended equipment setpoints for the equipment of the plurality of subplants based on the manual subplant loads in response to receiving the manual subplant loads.

14. The method of claim 13, further comprising generating a dispatch GUI and presenting the dispatch GUI via the user interface, the dispatch GUI comprising the recommended subplant loads and the manual subplant loads.

15. The method of claim 14, further comprising receiving a user selection of one of a plurality of operating modes via an operating mode selector of the dispatch GUI, the plurality of operating modes comprising an automatic operating mode, an advisory operating mode, and a manual operating mode.

16. The method of claim 13, further comprising:
operating in an automatic operating mode to determine a first set of recommended equipment setpoints to achieve the recommended subplant loads; and
operating in a manual operating mode to determine a second set of recommended equipment setpoints to achieve the manual subplant loads.

17. The method of claim 13, further comprising determining an amount of overproduction or underproduction resulting from the manual subplant loads by comparing the manual subplant loads to a campus energy load.

18. The method of claim 17, wherein:
the plurality of subplants comprise an energy storage subplant; and
the user interface comprises an indication of an amount of time until the energy storage subplant is (1) fully depleted based on the amount of underproduction or (2) filled to capacity based on the amount of overproduction.

19. The method of claim 11, further comprising monitoring the energy plant to identify actual subplant loads for each of the plurality of subplants.

20. The method of claim 19, further comprising generating a dispatch GUI comprising the recommended subplant loads and the actual subplant loads.

* * * * *